United States Patent [19]
Schlect et al.

[11] Patent Number: 6,035,285
[45] Date of Patent: *Mar. 7, 2000

[54] ELECTRONIC BILL PRESENTING METHODS AND BILL CONSOLIDATING METHODS

[75] Inventors: Ed Schlect; Gerry Crooks; Janna Genzberger; Rick Kurtz; Mark Feichtner, all of Spokane; Larry Kippenhan, Greenacres; Jody Gordon; Thada Ziegler, both of Spokane, all of Wash.

[73] Assignee: Avista Advantage, Inc., Spokane, Wash.

[ * ] Notice: This patent is subject to a terminal disclaimer.

[21] Appl. No.: 09/263,467

[22] Filed: Mar. 5, 1999

Related U.S. Application Data

[63] Continuation of application No. 08/992,678, Dec. 17, 1997, Pat. No. 5,930,773, and application No. 08/984,708, Dec. 3, 1997, Pat. No. 5,943,656.

[51] Int. Cl.$^7$ ..................................................... G06F 17/60
[52] U.S. Cl. .................................. 705/30; 705/7; 705/32; 705/34; 705/40; 705/400
[58] Field of Search ..................................... 235/375, 376, 235/379; 340/870.01, 870.07; 395/20.3, 200.31, 200.33, 200.47, 200.48, 200.49; 705/1, 7, 11, 30, 32, 34, 40, 400; 709/200, 201, 203, 217, 218, 219

[56] References Cited

U.S. PATENT DOCUMENTS

| | | | |
|---|---|---|---|
| 3,852,571 | 12/1974 | Hall et al. | 235/61.7 B |
| 4,485,300 | 11/1984 | Peirce | 235/380 |
| 4,701,601 | 10/1987 | Francini et al. | 235/449 |
| 4,803,632 | 2/1989 | Frew et al. | 705/412 |
| 4,819,162 | 4/1989 | Webb, Jr. et al. | 705/32 |
| 4,839,504 | 6/1989 | Nakano | 235/379 |

(List continued on next page.)

FOREIGN PATENT DOCUMENTS

| | | |
|---|---|---|
| WO 97/20278 | 6/1997 | WIPO . |
| WO 97/24688 | 7/1997 | WIPO . |
| WO 97/48161 | 12/1997 | WIPO . |
| WO 98/13797 | 4/1998 | WIPO . |
| WO 98/4440 | 8/1998 | WIPO . |
| WO 98/38590 | 9/1998 | WIPO . |
| WO 98/58339 | 12/1998 | WIPO . |

*Primary Examiner*—Edward R. Cosimano
*Attorney, Agent, or Firm*—Wells, St. John, Roberts, Gregory & Matkin, P.S.

[57] ABSTRACT

Electronic bill-presenting methods and bill consolidation methods are described. In one embodiment billing information pertaining to a labor-dependent service which has been rendered to a consumer is received into a host computer which preferably includes a processor. With the processor, the billing information is processed by auditing the billing information against at least one tolerance parameter to determine whether said billing information satisfies the one tolerance parameter. Processed billing information is provided into a computer-viewable format, wherein the consumer can view the processed billing information and authorize payment thereof. In another embodiment, a bill consolidation method comprises receiving into a host computer billing information pertaining to a plurality of at least one of a service or material which has been rendered or provided, respectively, to a consumer. The host computer has a processor and an interface device. With the processor, the billing information is processed to provide processed billing information which includes a consolidated amount which is owed by the consumer. The processed billing information is provided into a computer-viewable format, and the consumer is provided with remote access to the processed billing information in the computer-viewable format via the interface device. The consumer can view the processed billing information which includes the consolidated amount. Other embodiments are described.

77 Claims, 81 Drawing Sheets

U.S. PATENT DOCUMENTS

| | | | |
|---|---|---|---|
| 4,893,248 | 1/1990 | Pitts et al. | 364/464.01 |
| 4,949,272 | 8/1990 | Vanourek et al. | 364/464.02 |
| 5,206,488 | 4/1993 | Teicher | 235/380 |
| 5,220,501 | 6/1993 | Lawlor et al. | 364/408 |
| 5,283,829 | 2/1994 | Anderson | 380/24 |
| 5,287,270 | 2/1994 | Hardy et al. | 705/34 |
| 5,301,105 | 4/1994 | Cummings, Jr. | 364/401 |
| 5,325,290 | 6/1994 | Cauffman et al. | 705/34 |
| 5,383,113 | 1/1995 | Kight et al. | 364/401 |
| 5,465,206 | 11/1995 | Hilt et al. | 364/406 |
| 5,483,445 | 1/1996 | Pickering | 705/40 |
| 5,493,492 | 2/1996 | Cramer et al. | 705/32 |
| 5,496,991 | 3/1996 | Delfer, III et al. | 235/379 |
| 5,606,497 | 2/1997 | Cramer et al. | 705/32 |
| 5,649,117 | 7/1997 | Landry | 395/240 |
| 5,684,965 | 11/1997 | Pickering | 705/34 |
| 5,699,051 | 12/1997 | Billig et al. | 340/657 |
| 5,699,528 | 12/1997 | Hogan | 395/240 |
| 5,710,884 | 1/1998 | Dedrick | 395/200.47 |
| 5,717,923 | 2/1998 | Dedrick | 707/102 |
| 5,730,356 | 3/1998 | Mongan | 237/19 |
| 5,732,401 | 3/1998 | Conway | 705/29 |
| 5,758,331 | 5/1998 | Johnson | 705/412 |
| 5,761,650 | 6/1998 | Munsil et al. | 705/34 |
| 5,790,677 | 8/1998 | Fox et al. | 380/24 |
| 5,794,212 | 8/1998 | Mistr, Jr. | 705/26 |
| 5,794,221 | 8/1998 | Egendorf | 705/40 |
| 5,832,460 | 11/1998 | Bednar et al. | 705/27 |
| 5,842,183 | 11/1998 | Delfer et al. | 705/34 |
| 5,842,185 | 11/1998 | Chancey et al. | 705/40 |
| 5,873,072 | 2/1999 | Kight et al. | 705/40 |

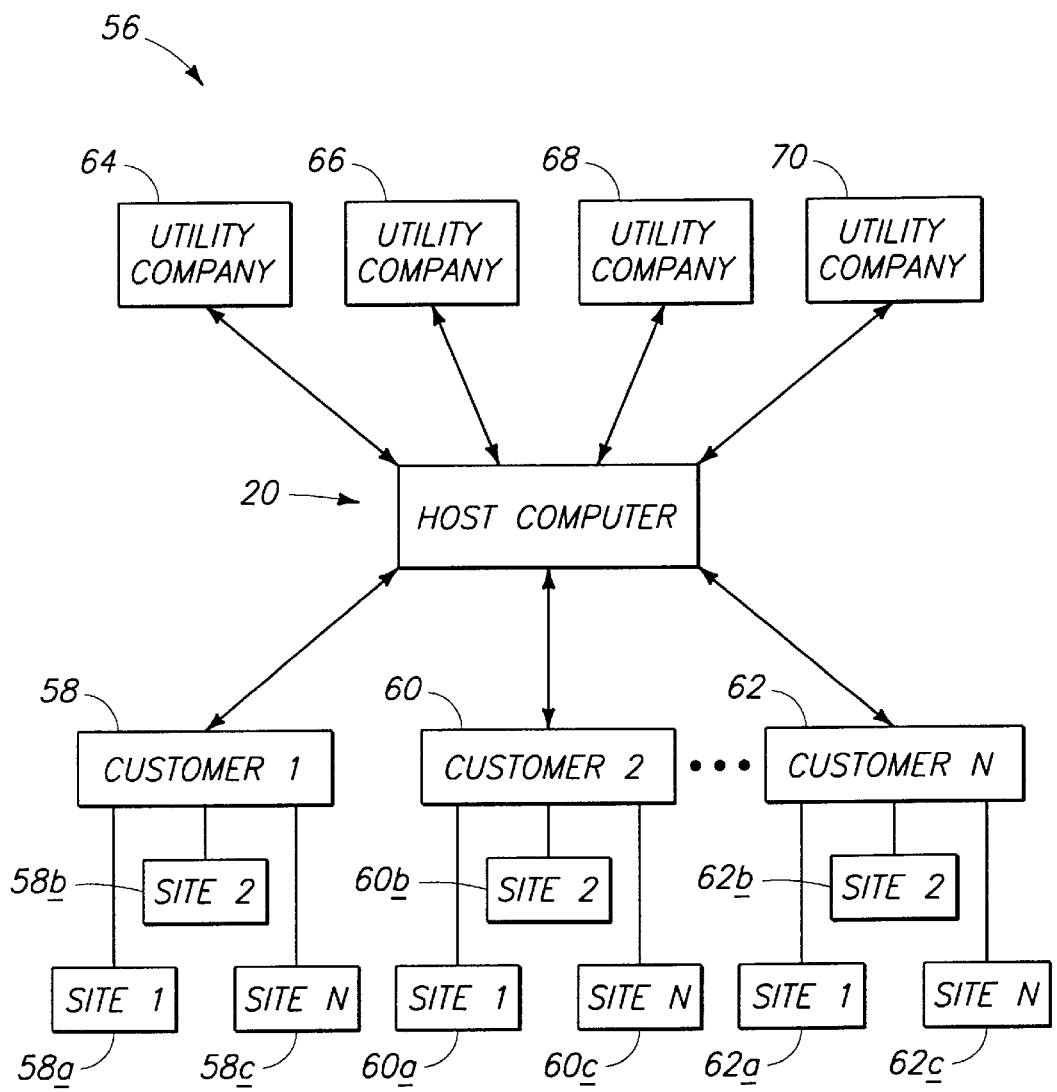

SRS/ACIS

File  Edit  View  Go  Favorite  Help

Back  Forward  Stop  Refresh  Home  Search  Favorites  Print  Font  Mail  Edit

Address http://

This web site allows easy access to ACIS Services for Consolidated Billing. If you have any questions, please use our Q&A e-mail and you will receive a reply within 24 hours.

Please enter your company's name and password

Company Name: _____ 102

Password: _____ 104

Login

Done

SRS/ACIS

File  Edit  View  Go  Favorite  Help

Back  Forward  Stop  Refresh  Home  Search  Favorites  Print  Font  Mail  Edit

Address: http://                                                           Links

Site Information

Company Name: ACIS Suites
Site Name (Store Number): Detroit Luxury Suites (590)
Address: 250 Lincoln Park Way
Detroit, MI Production Units — 114

Fixed Daily Production Units: Available Rooms
Number Of Units: 110
Variable Monthly Production Units:
Site Opened Date: 02/25/92  mm/dd/yy Climate Zone — 116

This site has been assigned: Zone 2

— 118

Secondary Units

|  | 1995 | 1996 | 1997 |
|---|---|---|---|
| Jan: | 0 | 0 | 0 |
| Feb: | 0 | 0 | 0 |
| Mar: | 0 | 0 | 0 |
| Apr: | 0 | 0 | 0 |
| May: | 0 | 0 | 0 |
| Jun: | 0 | 0 | 0 |
| Jul: | 0 | 0 | 0 |
| Aug: | 0 | 0 | 0 |
| Sep: | 0 | 0 | 0 |
| Oct: | 0 | 0 | 0 |
| Nov: | 0 | 0 | 0 |
| Dec: | 0 | 0 | 0 |

ACIS

Done

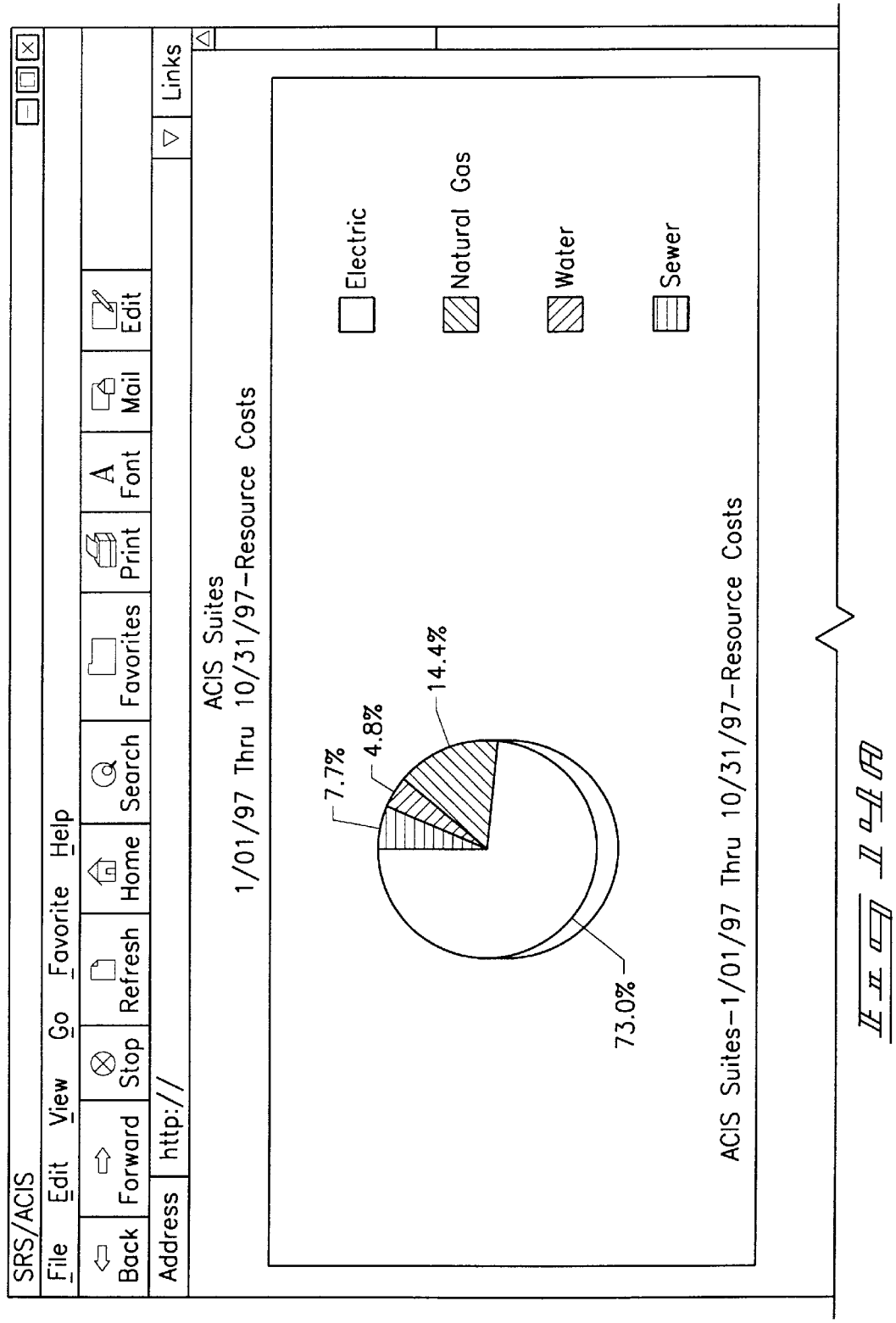

| Resource | Current | Prior | Change |
|---|---|---|---|
| Electric | $426,941.44 | $476,902.51 | -10.48% |
| Natural Gas | $84,360.31 | $82,113.01 | 2.75% |
| Water | $28,226.40 | $40,519.61 | -30.34% |
| Sewer | $44,961.43 | $89,323.75 | -49.66% |
| Total: | $557,343.00 | $671,6111.78 | -17.01% |

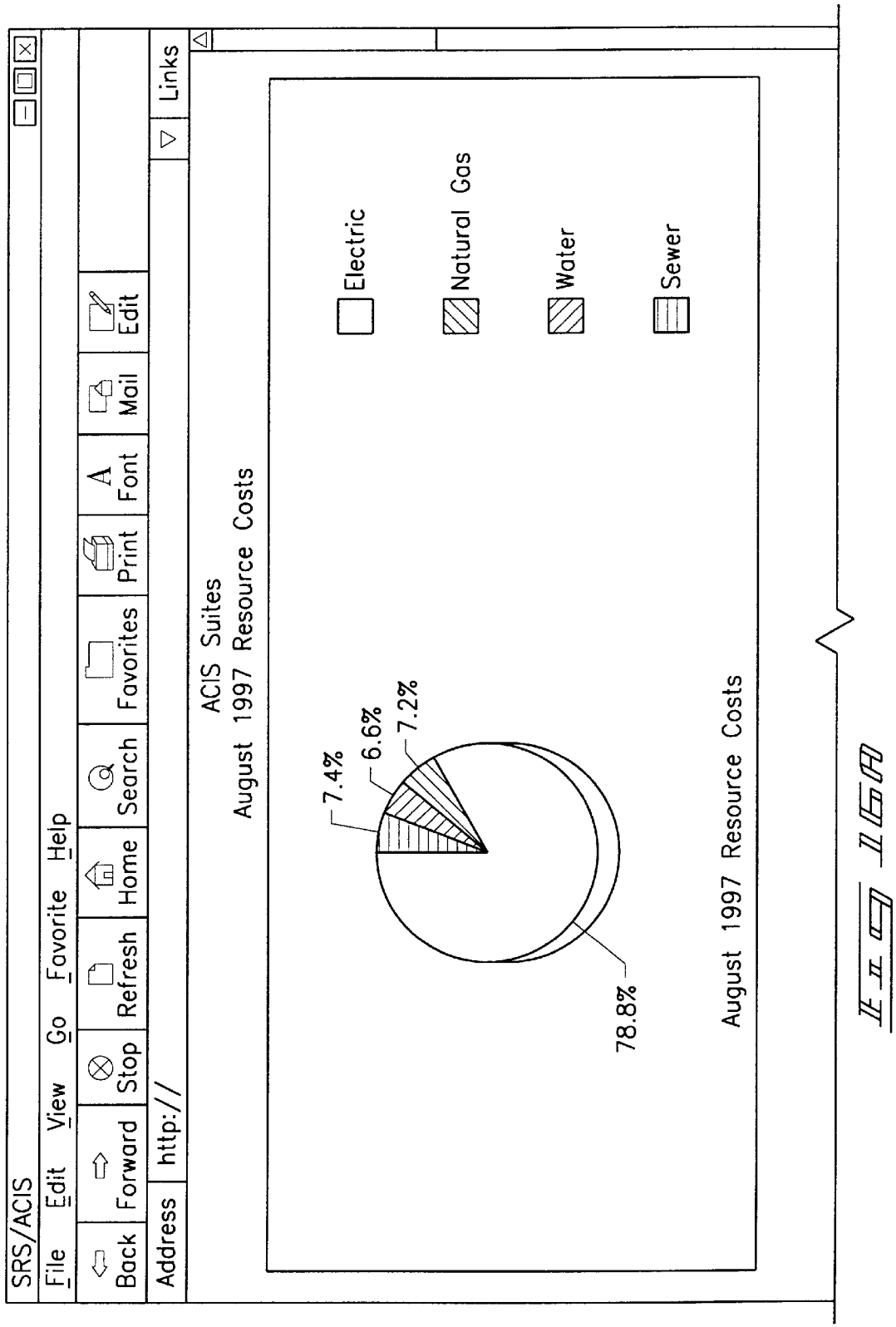

146

ACIS Suites
August 1997 Total Resource Costs

| Resource | Current | Prior | Change |
|---|---|---|---|
| Electric | $24,202.73 | $53,876.79 | -55.08% |
| Natural Gas | $2,199.13 | $6,879.75 | -68.03% |
| Water | $2,038.39 | $4,505.13 | -54.75% |
| Sewer | $2,273.54 | $9,403.78 | -75.82% |
| Total: | $30,713.78 | $74,665.44 | -56.86% |

☐ Done

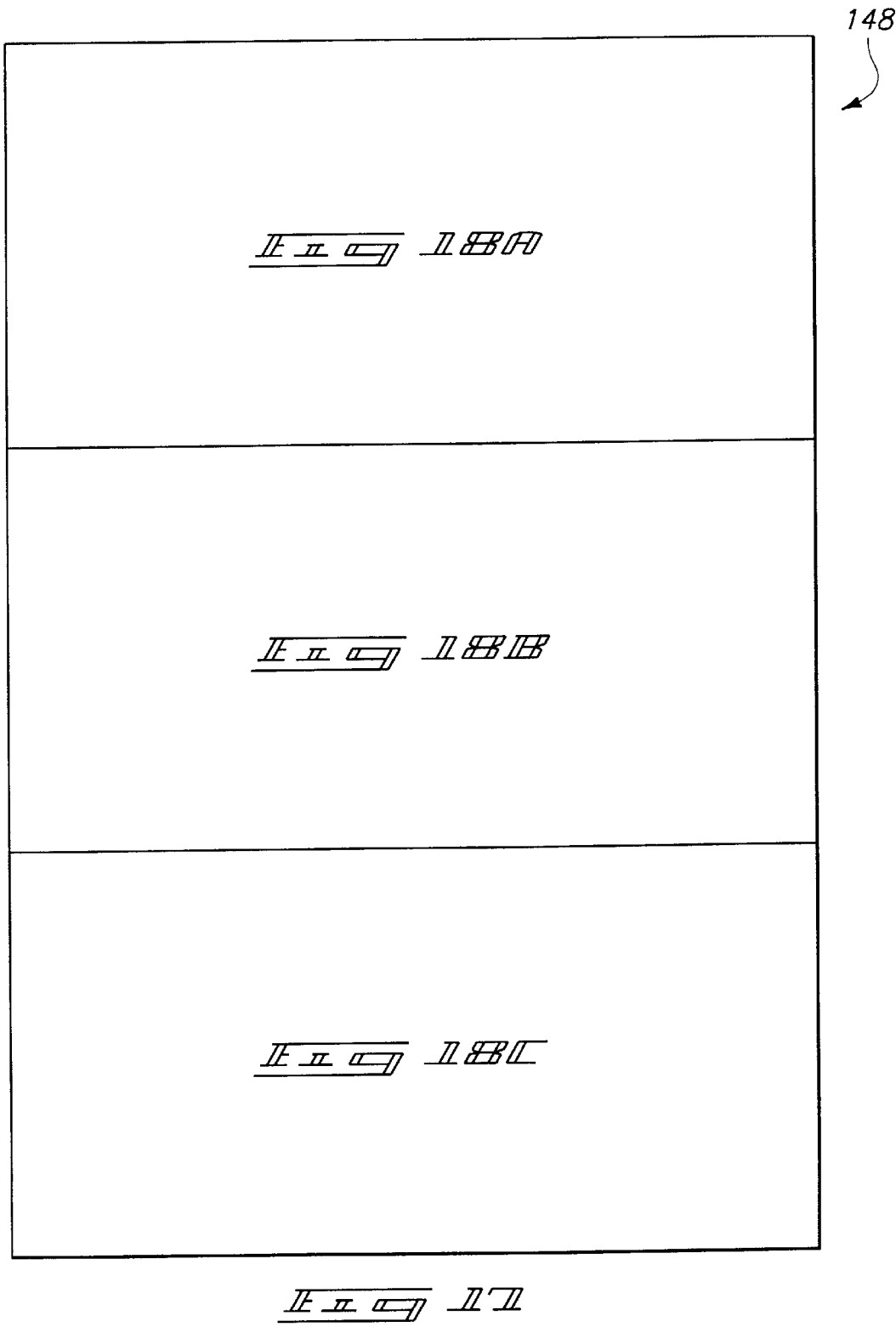

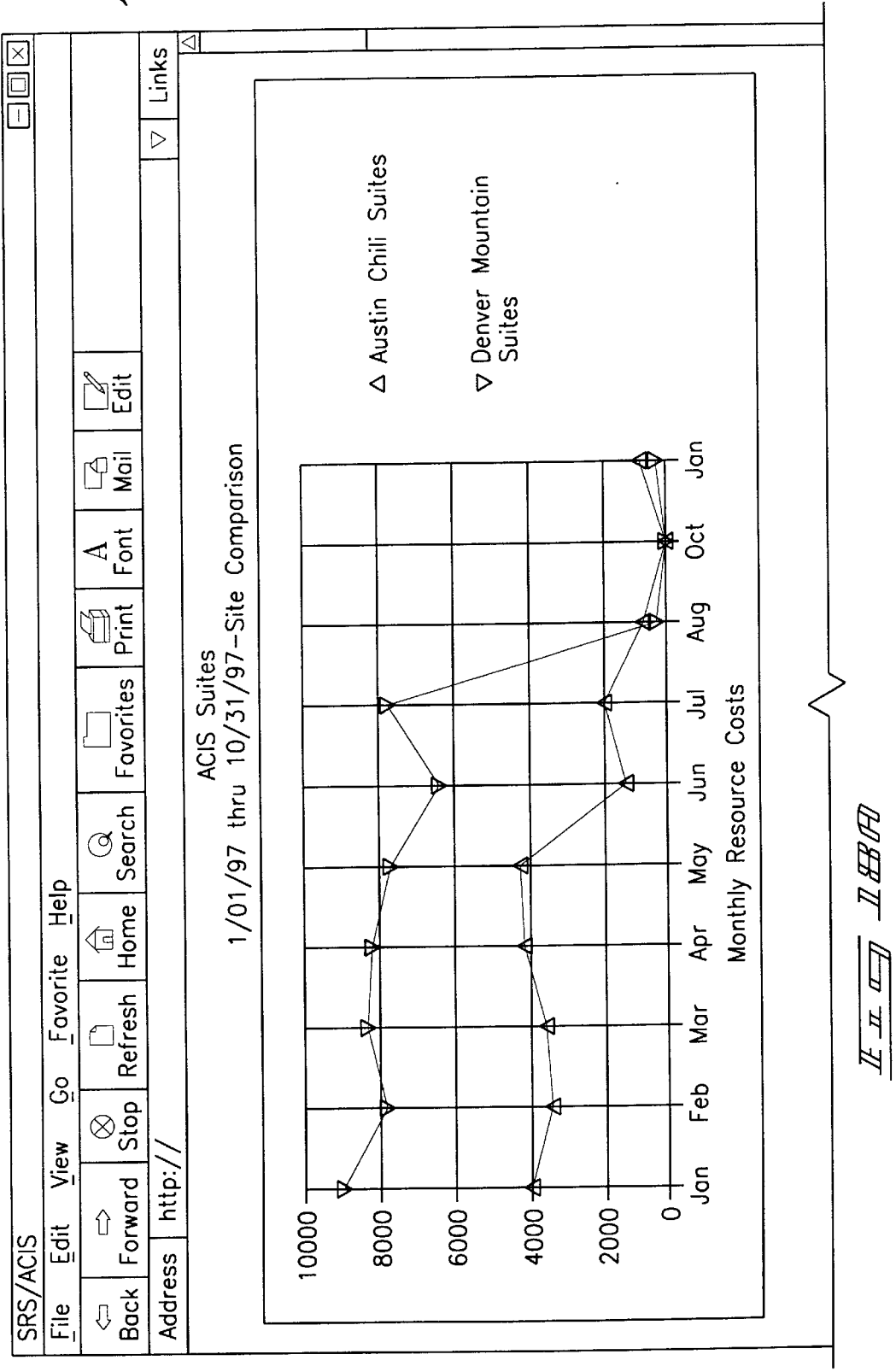

FIG. 18B

Austin Chili Suites Resource Costs
1/01/97 thru 10/31/97

| Resource | Current | Prior | Change |
|---|---|---|---|
| Electric | $23,490.62 | $107.48 | ********% |
| Natural Gas | $3,605.75 | $0.00 | N/A |
| Water | $77.33 | $59.00 | 31.07% |
| Sewer | $4,657.28 | $176.35 | 2540.96% |
| Total: | $31,830.97 | $342.82 | 9184.99% |

Denver Mountain Suites Resource Costs
1/01/97 thru 10/31/97

| Resource | Current | Prior | Change |
|---|---|---|---|
| Electric | $55,141.47 | $55,508.03 | -0.66% |
| Natural Gas | $8,018.37 | $9,899.14 | -23.46% |
| Water | $2,989.85 | $5,639.76 | -88.63% |
| Sewer | $5,000.85 | $10,426.54 | -108.50% |
| Total: | $71,150.54 | $81,473.48 | -14.51% |

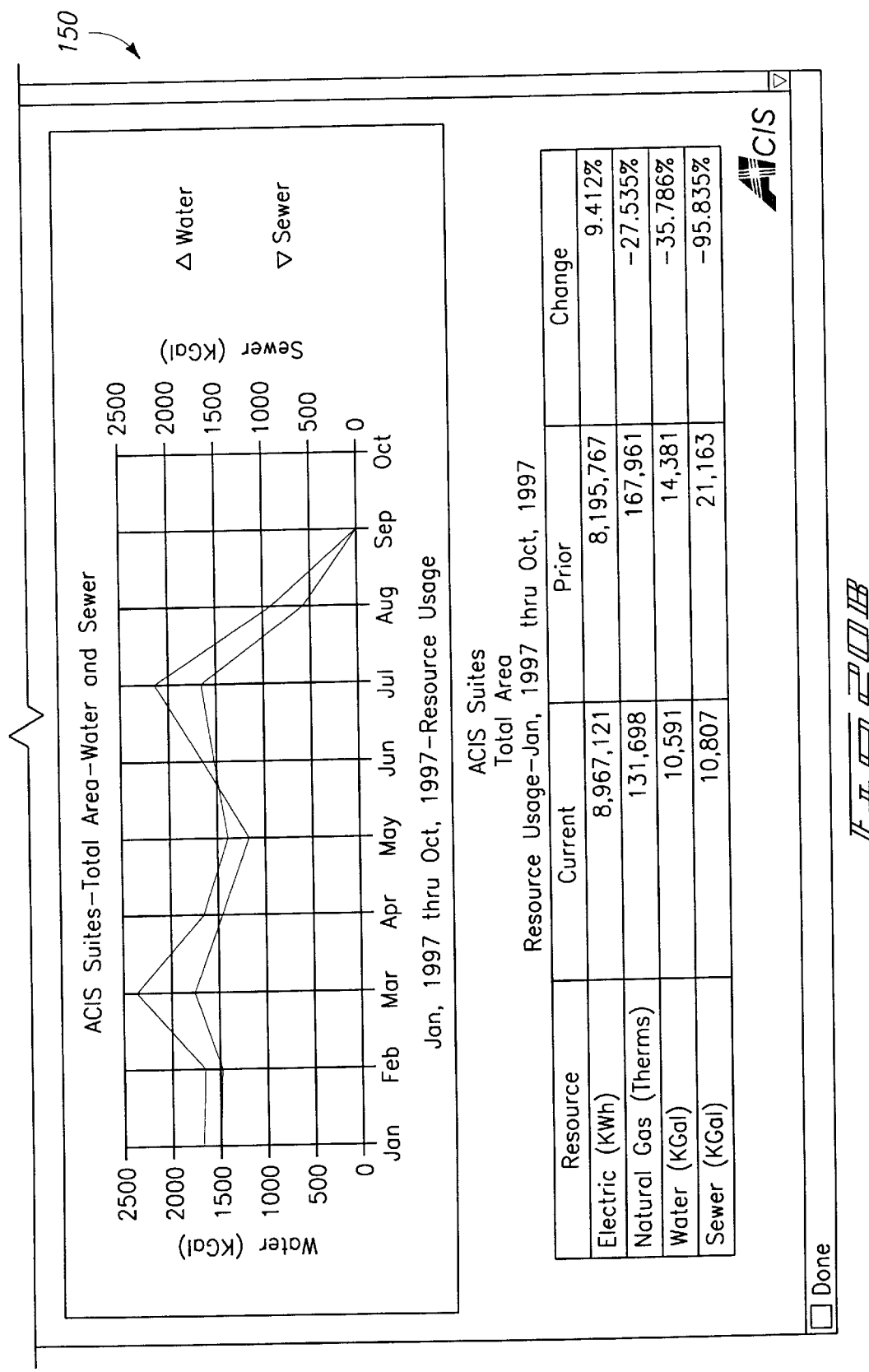

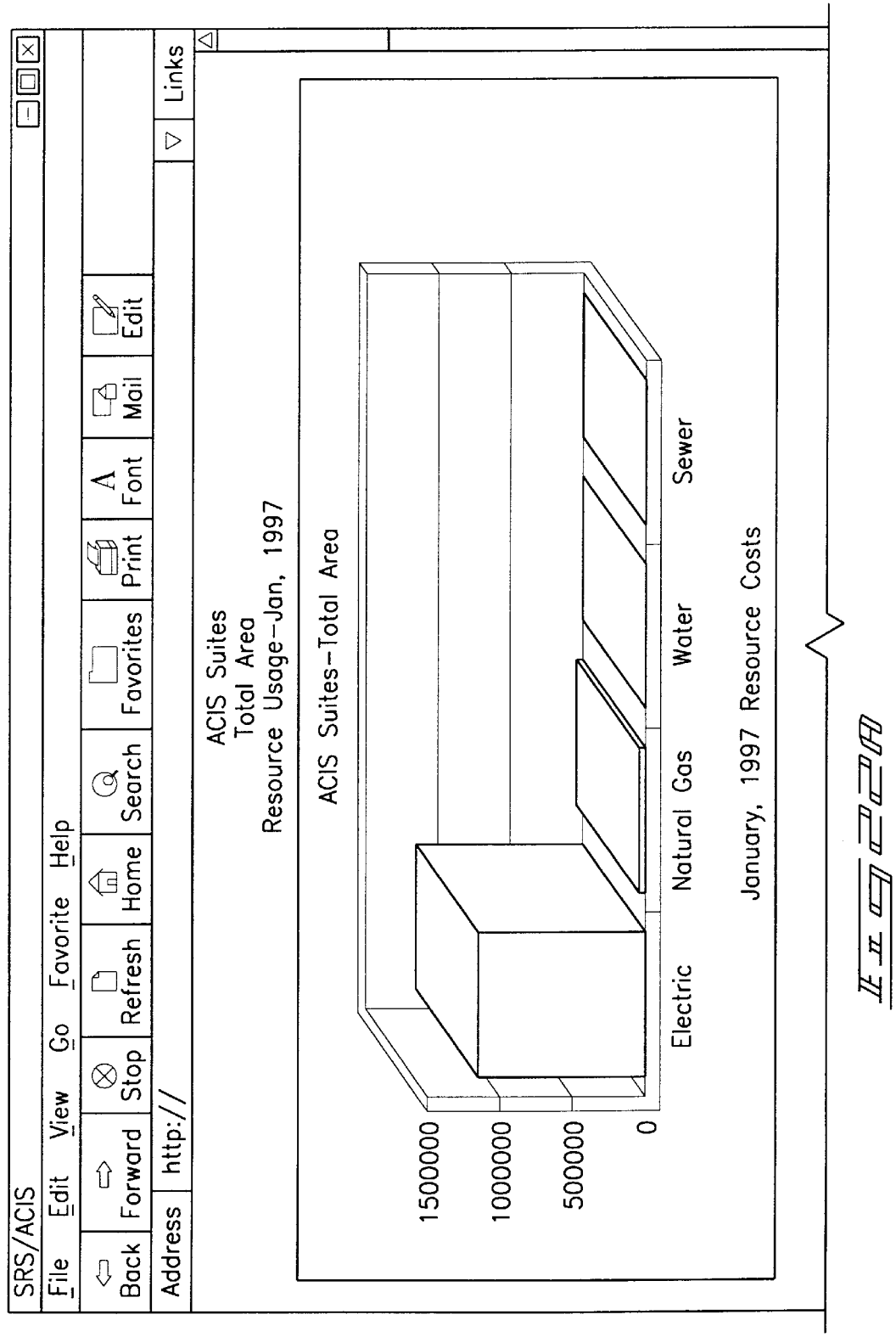

152

| Resource | Current | Prior | Change |
|---|---|---|---|
| Electric (KWh) | 1,196,124 | 801,035 | 49.32% |
| Natural Gas (Therms) | 31,143 | 24,146 | 28.98% |
| Water (KGal) | 1,503 | 950 | 58.34% |
| Sewer (KGal) | 1,701 | 1,044 | 62.97% |

ACIS Suites
Total Area
Resource Usage–Jan, 1997

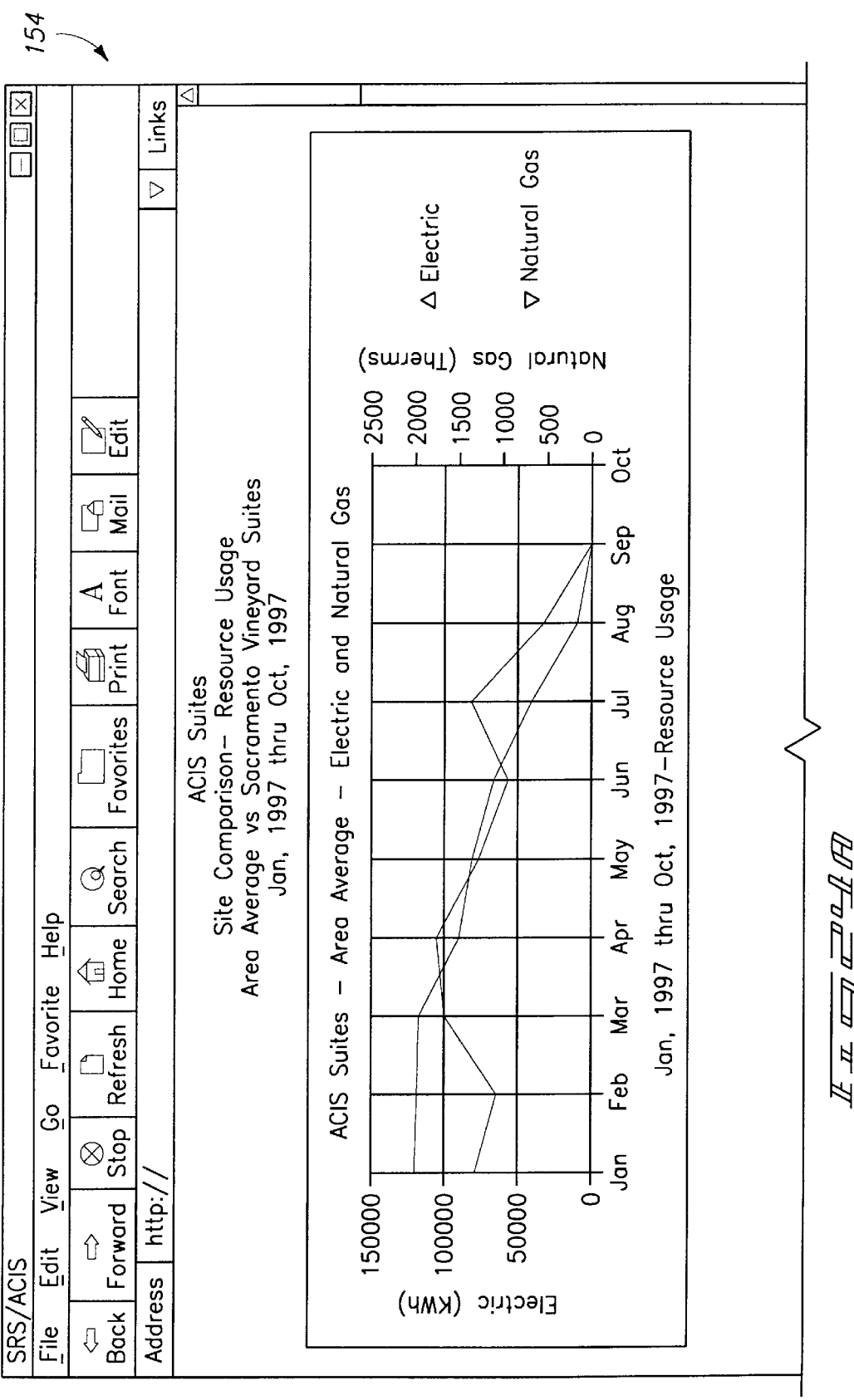

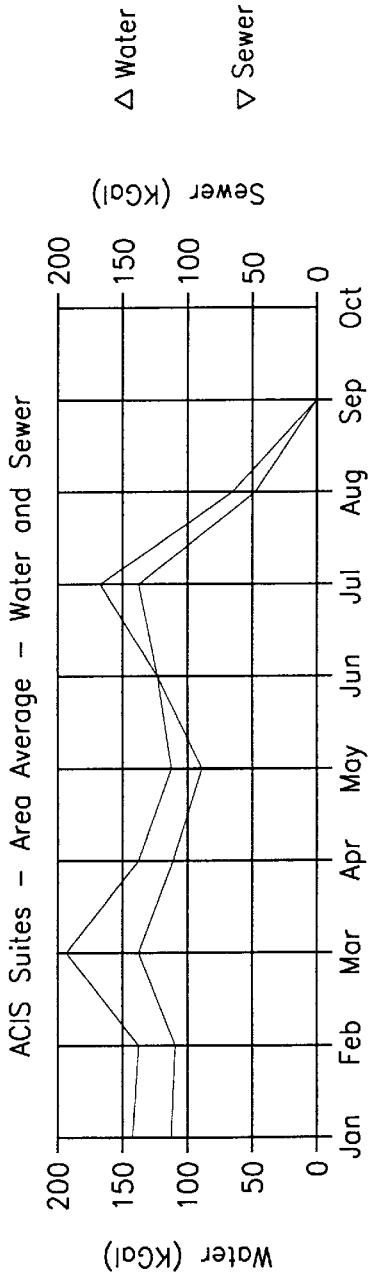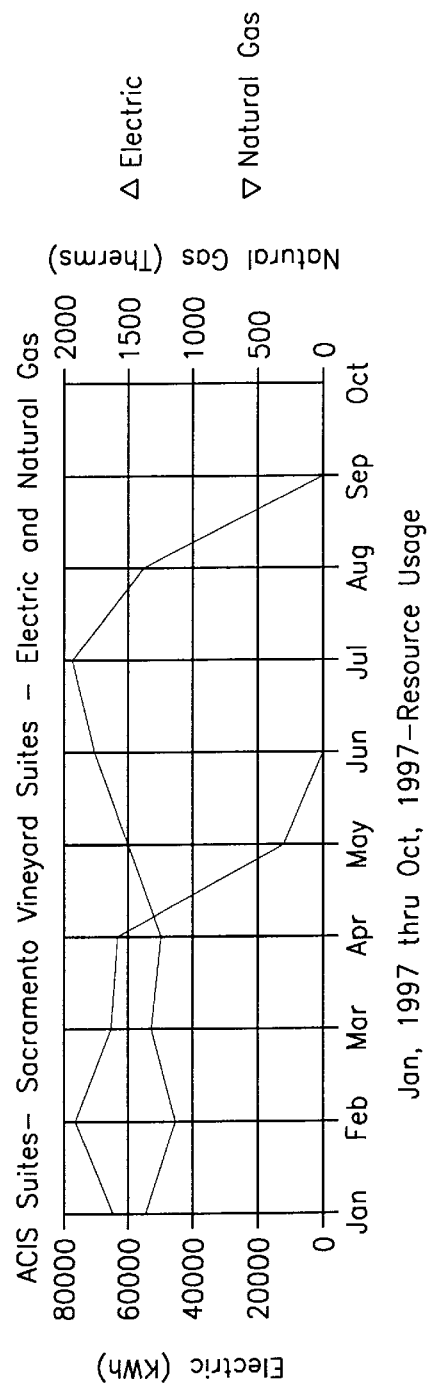
FIG. 24B

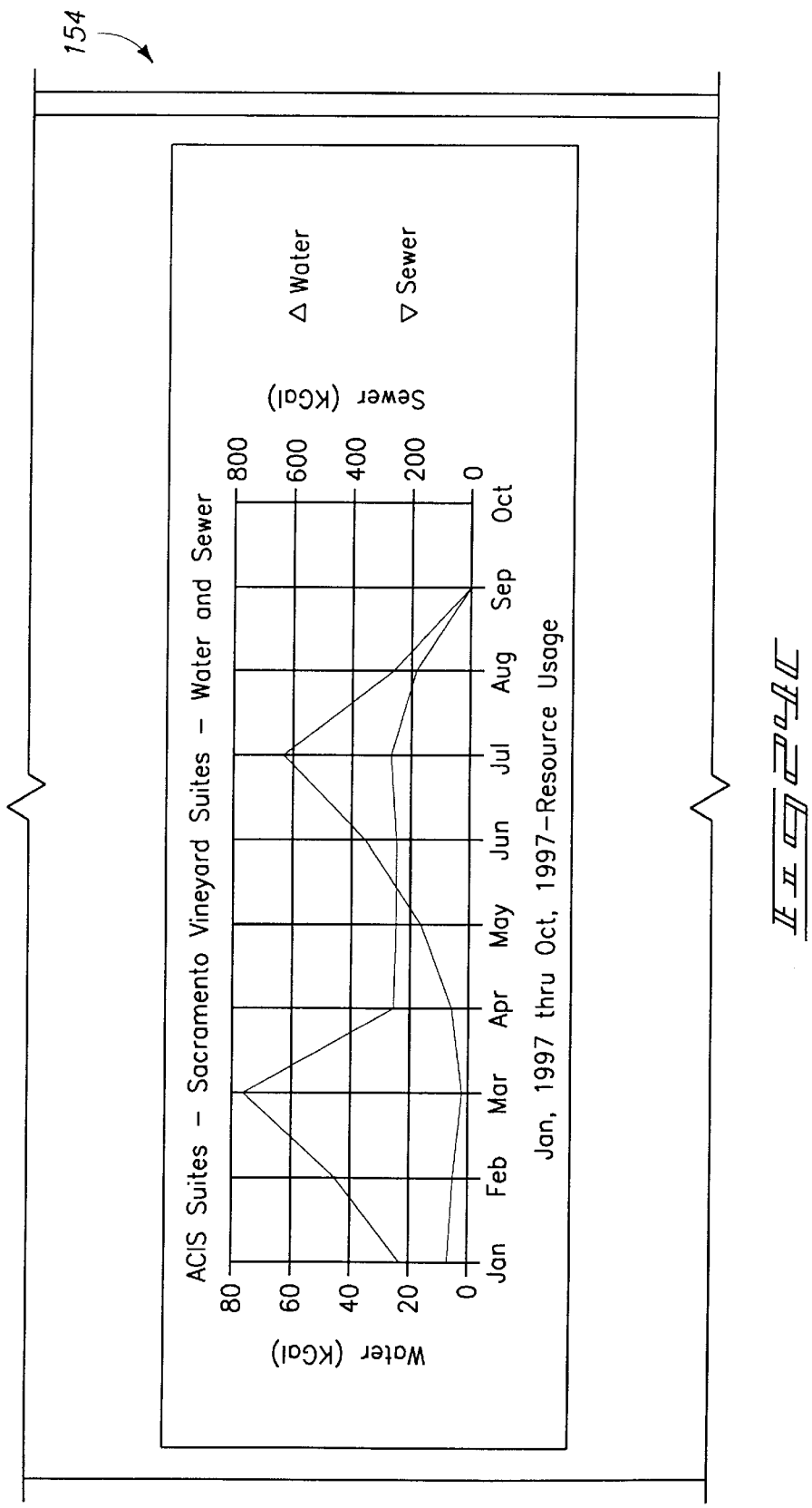

ACIS Suites
Site Comparison – Resource Usage
Area Average vs Sacramento Vineyard Suites
Jan, 1997 thru Oct, 1997
Area Average

| Resource | Current | Prior | Change |
|---|---|---|---|
| Electric (KWh) | 597,808 | 546,384 | 9.412% |
| Natural Gas (Therms) | 8,780 | 11,197 | -27.535% |
| Water (KGal) | 815 | 1,106 | -35.786% |
| Sewer (KGal) | 901 | 1,764 | -95.835% |
| Total: | 610,637 | 562,221 | 8.611% |

Sacramento Vineyard Suites

| Resource | Current | Prior | Change |
|---|---|---|---|
| Electric (KWh) | 460,162 | 514,008 | -11.702% |
| Natural Gas (Therms) | 5,483 | 9,443 | -72.219% |
| Water (KGal) | 154 | 71 | 115.092% |
| Sewer (KGal) | 2,409 | 9,341 | -287.715% |
| Total: | 470,077 | 532,864 | -13.357% |

ACIS Suites
Total Company Energy Costs ($)/Sq Foot (1004161 sqft)
September, 1996 thru August, 1997

| | Energy Costs Per Square Foot |
|---|---|
| Spokane Falls Suites | .172/.000 |
| Portland Riverview Suites | .214/.000 |
| Cincinnati Stadium Suites | .441/.000 |
| Austin Chili Suites | .494/.000 |
| Sacramento Vineyard Suites | .743/.385 |
| Memphis Country Suites | .835/.804 |
| Indianapolis Brickyard Suites | .858/.186 |
| Raleigh Match Play Suites | .877/.767 |
| Tucson Desert Suites | .979/.918 |
| Long Island Beach Suites | 1.01/.731 |
| Las Vegas Shimmering Suites | 1.12/.610 |
| Wilmington Garden Suites | 1.14/.766 |
| Dertoit Luxury Suites | 1.15/1.01 |
| Hartford Village Suites | 1.22/.991 |
| Denver Mountain Suites | 1.74/1.13 |

Current  Prior

ACIS Suites
Total Company Energy Costs ($)/Sq Foot (1004161 sqft)
September, 1996 thru August, 1997

| Site | Current | Prior | Change |
|---|---|---|---|
| Spokane Falls Suites | $0.17 | $0.00 | N/A |
| Portland Riverview Suites | $0.21 | $0.00 | N/A |
| Cincinnati Stadium Suites | $0.44 | $0.00 | N/A |
| Austin Chili Suites | $0.49 | $0.00 | N/A |
| Sacramento Vineyard Suites | $0.74 | $0.39 | 93.10% |
| Memphis Country Suites | $0.83 | $0.80 | 3.92% |
| Indianapolis Brickyard Suites | $0.86 | $0.19 | 361.87% |
| Raleigh Match Play Suites | $0.88 | $0.77 | 14.31% |
| Tucson Desert Suites | $0.98 | $0.92 | 6.56% |
| Long Island Beach Suites | $1.01 | $0.73 | 38.65% |
| Las Vegas Shimmering Suites | $1.13 | $0.61 | 85.17% |
| Wilmington Garden Suites | $1.15 | $0.77 | 49.5% |
| Dertoit Luxury Suites | $1.16 | $1.02 | 13.77% |
| Hartford Village Suites | $1.23 | $0.99 | 23.63% |
| Denver Mountain Suites | $1.74 | $1.13 | 54.01% |
| Monthly Average: | $0.87 | $0.55 | 56.81% |
| Total: | $13.03 | $8.31 | 56.81% |

FIG 26B

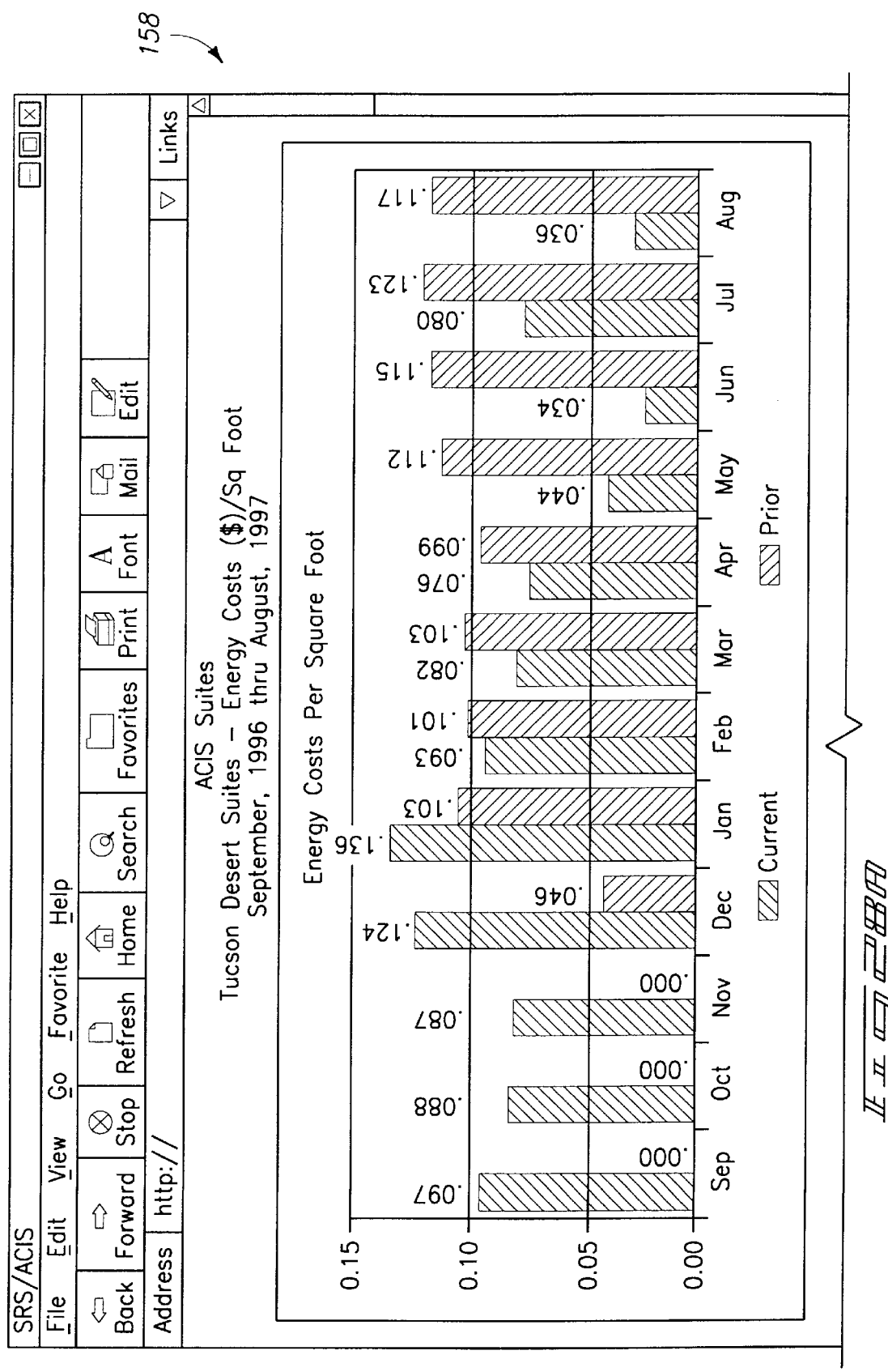

ACIS Suites
Tucson Desert Suites – Energy Costs ($)/Sq Foot
September, 1996 thru August, 1997

| Month | 1997 | 1996 | Change |
|---|---|---|---|
| September | 0.097 | 0.0 | *******% |
| October | 0.088 | 0.0 | *******% |
| November | 0.087 | 0.0 | *******% |
| December | 0.124 | 0.046 | 159.07% |
| January | 0.136 | 0.103 | 29.41% |
| February | 0.093 | 0.101 | -9.26% |
| March | 0.082 | 0.103 | -22.05% |
| April | 0.076 | 0.099 | -24.21% |
| May | 0.044 | 0.112 | -60.99% |
| June | 0.034 | 0.115 | -70.46% |
| July | 0.08 | 0.123 | -35.80% |
| August | 0.036 | 0.117 | -69.80% |
| Monthly Average: | 0.081 | 0.077 | 6.31% |
| Total: | 0.977 | 0.919 | 6.31% |

FIG. 28R

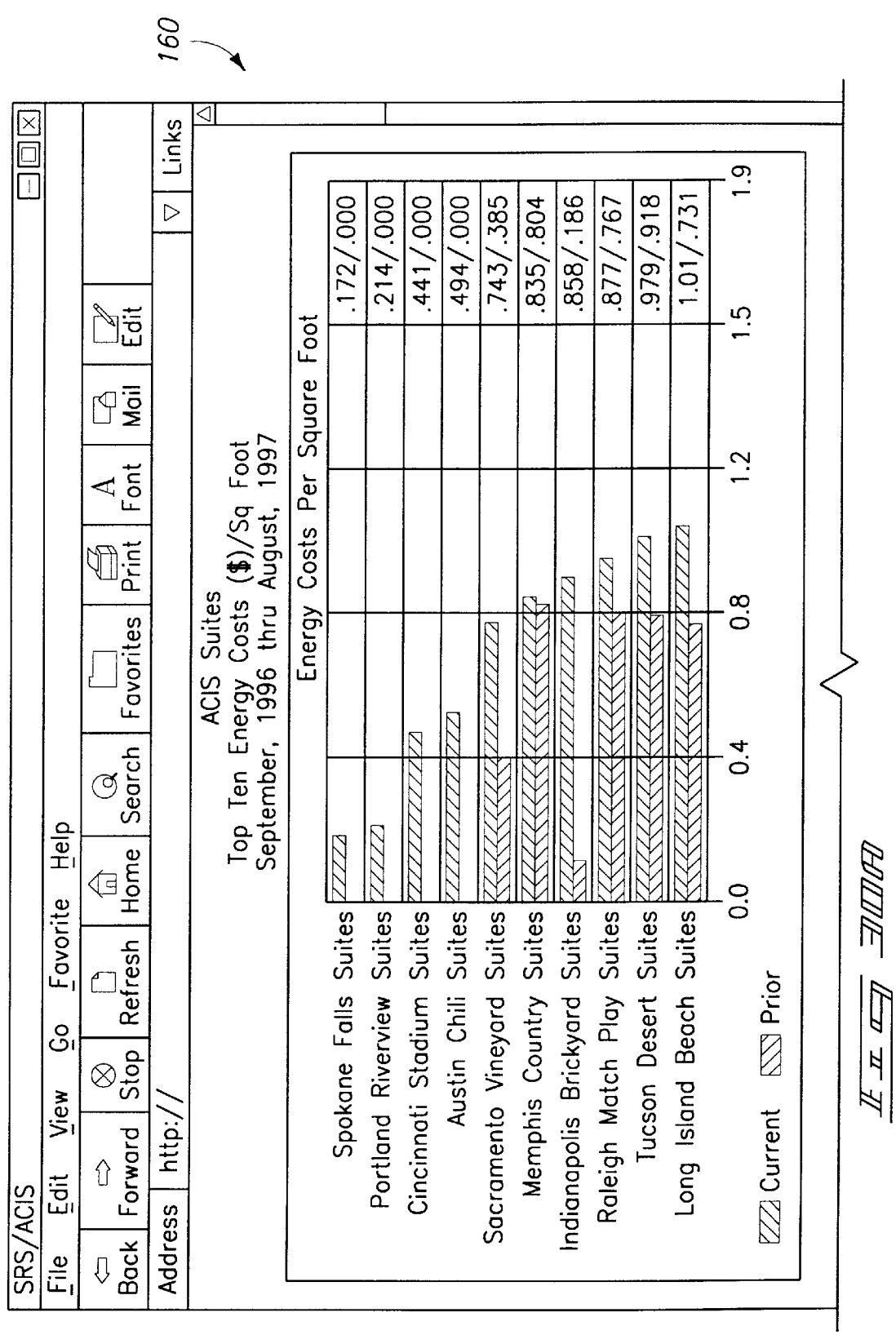

ACIS Suites
Top Ten ($)/Sq Foot (162500 sqft)
September, 1996 thru August, 1997

| Site | Sqfeet | Current | Prior | Change |
|---|---|---|---|---|
| Spokane Falls Suites | 162500 | 0.172 | 0.00 | N/A |
| Portland Riverview Suites | 75690 | 0.214 | 0.00 | N/A |
| Cincinnati Stadium Suites | 82536 | 0.441 | 0.00 | N/A |
| Austin Chili Suites | 65700 | 0.494 | 0.00 | N/A |
| Sacramento Vineyard Suites | 56980 | 0.743 | 0.385 | 93.10% |
| Memphis Country Suites | 27560 | 0.835 | 0.804 | 3.92% |
| Indianapolis Brickyard Suites | 49500 | 0.858 | 0.186 | 361.87% |
| Raleigh Match Play Suites | 68585 | 0.877 | 0.767 | 14.31% |
| Tucson Desert Suites | 118250 | 0.979 | 0.918 | 6.56% |
| Long Island Beach Suites | 44750 | 1.014 | 0.731 | 38.65% |
| Monthly Average: | 75205 | 0.66 | 0.38 | 74.81% |
| Total: | 752051 | 6.627 | 3.791 | 74.81% |

FIG. 30E

ACIS Suites
Bottom Ten ($)/Sq Foot (162500 sqft)
September, 1996 thru August, 1997

| Site | Sqfeet | Current | Prior | Change |
|---|---|---|---|---|
| Denver Mountain Suites | 51200 | 1.743 | 1.132 | 54.01% |
| Hartford Village Suites | 60500 | 1.225 | 0.991 | 23.63% |
| Dertoit Luxury Suites | 48535 | 1.156 | 1.016 | 13.77% |
| Wilmington Garden Suites | 52250 | 1.145 | 0.766 | 49.50% |
| Las Vegas Shimmering Suites | 39625 | 1.129 | 0.61 | 85.17% |
| Long Island Beach Suites | 44750 | 1.014 | 0.731 | 38.65% |
| Tucson Desert Suites | 118250 | 0.979 | 0.918 | 6.56% |
| Raleigh Match Play Suites | 68585 | 0.877 | 0.767 | 14.31% |
| Indianapolis Brickyard Suites | 49500 | 0.858 | 0.186 | 361.87% |
| Memphis Country Suites | 27560 | 0.835 | 0.804 | 3.92% |
| Monthly Average: | 56076 | 1.10 | 0.79 | 56.81% |
| Total: | 560755 | 10.961 | 7.921 | 56.81% |

SRS/ACIS

File  Edit  View  Go  Favorite  Help

Back  Forward  Stop  Refresh  Home  Search  Favorites  Print  Font  Mail  Edit

Address http://                                                              Links ACIS Suites
kBTU/sqft Usage — Sep 1996 thru Aug 1997

ACIS Suites (1004161 total sq/ft)

| Property | Value |
|---|---|
| Austin Chili Suites—65700 | 36.0/.00 |
| Cincinnati Stadium Suites—82536 | 42.6/.00 |
| Denver Mountain Suites—51200 | 130/104 |
| Dertoit Luxury Suites—48535 | 157/98.1 |
| Hartford Village Suites—60500 | 105/101 |
| Indianapolis Brickyard Suites—49500 | 75.3/14 |
| Las Vegas Shimmering Suites—39625 | 83.6/45 |
| Long Island Beach Suites—44750 | 75.2/59 |
| Memphis Country Suites—27560 | 64.7/63 |
| Portland Riverview Suites—75690 | 27.0/.00 |
| Raleigh Match Play Suites—68585 | 62.1/56 |
| Sacramento Vineyard Suites—56980 | 62.9/36 |
| Spokane Falls Suites—152500 | 12.5/.00 |
| Tucson Desert Suites—118250 | 69/59 |
| Wilmington Garden Suites—52250 | 88/71 |

Scale: 0.0  34.6  69.3  103.9  138.5  173.1

▨ Current  ▧ Prior

162

ACIS Suites
kBTU/sqft Usage – Sep 1996 thru Aug 1997

| Site | Sq Feet | Current | Prior | Change |
|---|---|---|---|---|
| Austin Chili Suites | 65700 | 36.01 | 0.0 | N/A |
| Cincinnati Stadium Suites | 82536 | 42.66 | 0.0 | N/A |
| Denver Mountain Suites | 51200 | 130.61 | 104.69 | 27.76% |
| Dertoit Luxury Suites | 48535 | 157.39 | 98.14 | 60.38% |
| Hartford Village Suites | 60500 | 105.24 | 101.42 | 3.77% |
| Indianapolis Brickyard Suites | 49500 | 75.3 | 14.02 | 437.11% |
| Las Vegas Shimmering Suites | 39625 | 86.62 | 45.88 | 82.26% |
| Long Island Beach Suites | 44750 | 75.28 | 59.17 | 27.23% |
| Memphis Country Suites | 27560 | 64.07 | 63.22 | 1.34% |
| Portland Riverview Suites | 75690 | 27.04 | 0.0 | N/A |
| Raleigh Match Play Suites | 68585 | 62.1 | 56.04 | 10.82% |
| Sacramento Vineyard Suites | 56980 | 62.98 | 36.4 | 73.02% |
| Spokane Falls Suites | 162500 | 12.55 | 0.0 | N/A |
| Tucson Desert Suites | 118250 | 69.2 | 59.53 | 16.24% |
| Wilmington Garden Suites | 52250 | 88.85 | 71.98 | 23.45% |
| Monthly Average: | 66944 | 72.86 | 47.37 | 53.82% |
| Total: | 1004161 | 1092.9 | 710.49 | 53.82% |

FIG. 32B

ACIS Suites
Average of All Sites kBTU/sqft Usage (62760 sqft)
9/01/96 thru 8/31/97

| Month | Current | Prior | Change |
|---|---|---|---|
| September | 4.40 | 0.0 | N/A |
| October | 4.90 | 0.0 | N/A |
| November | 6.10 | 0.0 | N/A |
| December | 7.20 | 2.60 | 175.58% |
| January | 7.60 | 5.40 | 40.39% |
| February | 6.70 | 5.00 | 34.49% |
| March | 7.90 | 5.20 | 51.69% |
| April | 5.50 | 4.70 | 16.80% |
| May | 4.90 | 4.70 | 4.39% |
| June | 4.70 | 4.70 | 0.43% |
| July | 5.40 | 5.00 | 7.23% |
| August | 2.20 | 5.00 | -56.88% |
| Monthly Average: | 5.63 | 3.53 | 59.57% |
| Total: | 67.50 | 42.30 | 59.57% |

Detroit Luxury Suites – (48535 sqft)
9/01/96 – 8/31/97 kBTU/sqft Usage

| Month | Current | Prior | Change |
|---|---|---|---|
| September | 8.55 | 0.0 | N/A |
| October | 10.26 | 0.0 | N/A |
| November | 10.69 | 0.0 | N/A |
| December | 10.84 | 11.19 | -3.14% |
| January | 13.99 | 13.99 | -0.01% |
| February | 13.58 | 11.82 | 14.89% |
| March | 45.51 | 14.30 | 218.25% |
| April | 15.92 | 11.00 | 44.64% |
| May | 7.35 | 9.72 | -24.41% |
| June | 9.99 | 8.61 | 16.03% |
| July | 9.50 | 7.99 | 18.87% |
| August | 1.20 | 9.50 | -87.37% |
| Total: | 157.38 | 98.12 | 60.40% |

Denver Mountain Suites – (51200 sqft)
9/01/96 – 8/31/97 kBTU/sqft Usage

| Month | Current | Prior | Change |
|---|---|---|---|
| September | 9.07 | 0.0 | N/A |
| October | 9.86 | 0.0 | N/A |
| November | 12.54 | 0.0 | N/A |
| December | 14.63 | 5.48 | 167.19% |
| January | 15.32 | 15.62 | -1.88% |
| February | 12.88 | 15.31 | -15.84% |
| March | 11.88 | 14.88 | -20.18% |
| April | 6.64 | 12.13 | -45.27% |
| May | 9.77 | 10.39 | -5.94% |
| June | 9.21 | 9.77 | -5.72% |
| July | 18.02 | 10.66 | 70.69% |
| August | 0.59 | 10.46 | -94.34% |
| Total: | 130.59 | 104.70 | 24.73% |

FIG. 36D

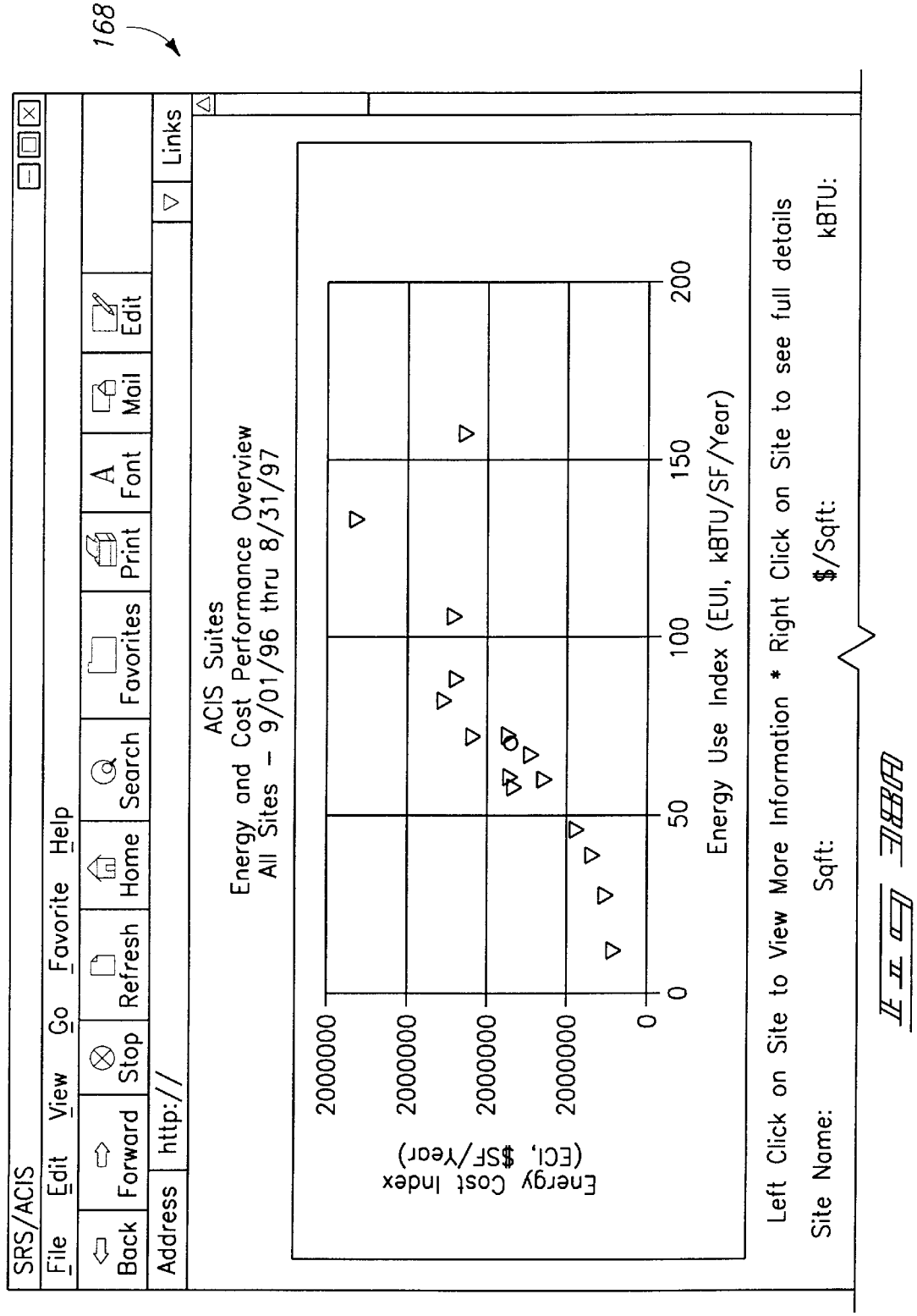

FIG. 38B

| Site | Sq Feet | $/Sft | kBTU |
|---|---|---|---|
| Monthly Average: | 66944 | $0.84 | 72.86 |
| Austin Chili Suites | 65700 | $0.36 | 36.01 |
| Cincinnati Stadium Suites | 82536 | $0.46 | 42.66 |
| Denver Mountain Suites | 51200 | $1.79 | 130.61 |
| Dertoit Luxury Suites | 48535 | $1.11 | 157.39 |
| Hartford Village Suites | 60500 | $1.19 | 105.24 |
| Indianapolis Brickyard Suites | 49500 | $0.86 | 75.3 |
| Las Vegas Shimmering Suites | 39625 | $1.22 | 83.62 |
| Long Island Beach Suites | 44750 | $1.05 | 75.28 |
| Memphis Country Suites | 27560 | $0.83 | 64.07 |
| Portland Riverview Suites | 75690 | $0.21 | 27.04 |
| Raleigh Match Play Suites | 68585 | $0.82 | 62.1 |
| Sacramento Vineyard Suites | 56980 | $0.67 | 62.98 |
| Spokane Falls Suites | 162500 | $0.17 | 12.55 |
| Tucson Desert Suites | 118250 | $0.72 | 69.2 |
| Wilmington Garden Suites | 52250 | $1.19 | 88.85 |

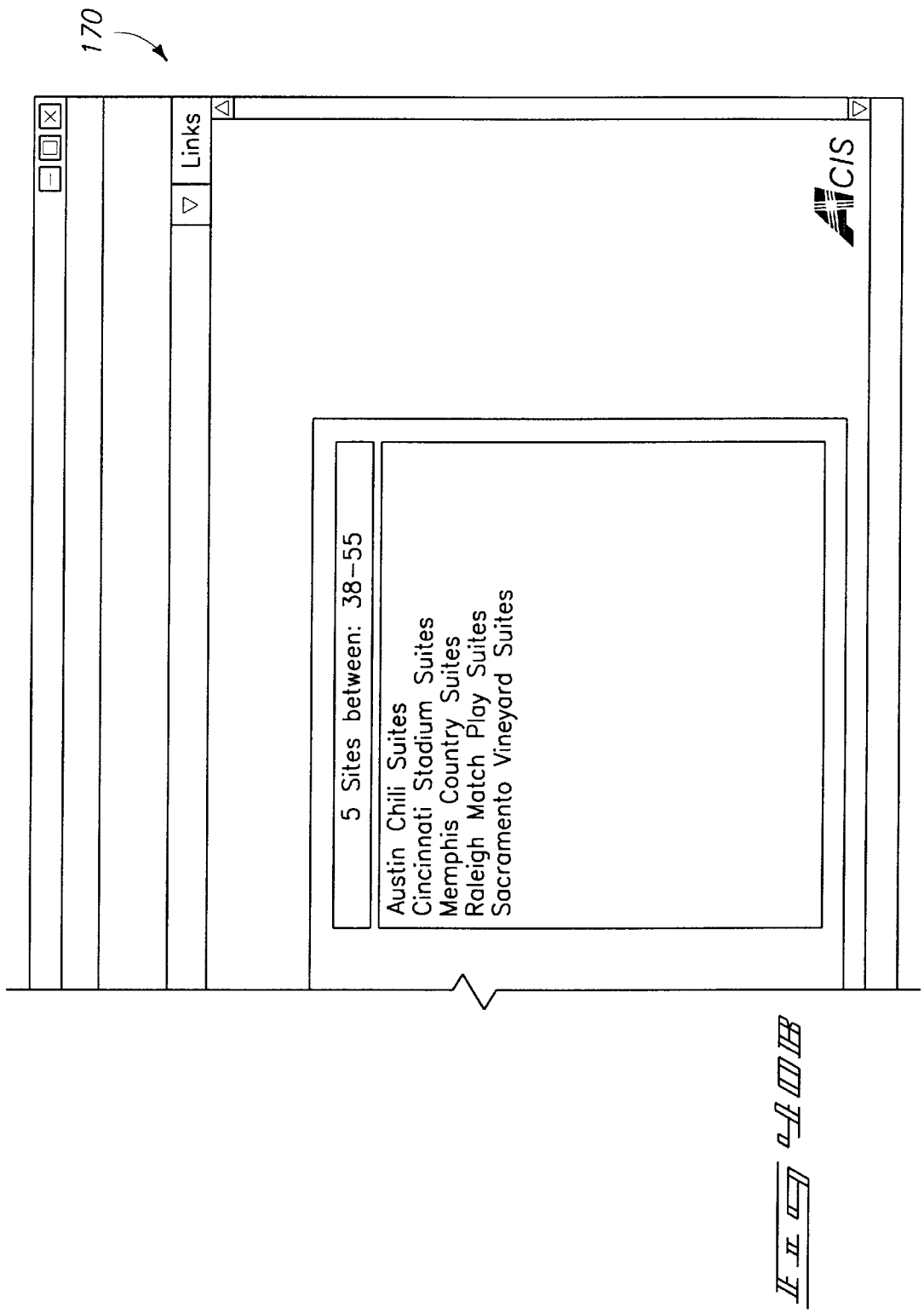

172

ACIS Suites
Energy Performance Site Detail*
12 Sites – All EUI Ranges kBTU/SF/YEAR

| Zone 1 | Floor Area (Sq. F.t) | | | | | | |
|---|---|---|---|---|---|---|---|
| National Average | | 36 | 93 | 143 | 200 | | 434 |
| Company Average | 51200 | | Δ117.7 | | | Δ153.4 | |
| Denver Mountain Suites | 51200 | | Δ117.7 | | | | |

| Zone 2 | Floor Area (Sq. F.t) | | | | | | |
|---|---|---|---|---|---|---|---|
| National Average | | 34 | 100 | 153 | 226 | | 583 |
| Company Average | 52845 | | Δ96.8 | | | Δ196.9 | |
| Indianapolis Brickyard Suites | 49500 | | Δ63.5 | | | | |
| Hartford Village Suites | 60500 | | Δ88.3 | | | | |
| Detroit Luxury Suites | 48535 | | | | Δ138.6 | | |

| Zone 3 | Floor Area (Sq. F.t) | | | | | | |
|---|---|---|---|---|---|---|---|
| National Average | | 36 | 75 | 139 | 210 | | 435 |
| | | | | Δ159.3 | | | |

| | Floor Area (Sq. F.t) | | | |
|---|---|---|---|---|
| Company Average | 62441 | Δ51.3 | | |
| Portland Riverview Suites | 75690 | Δ27.2 | | |
| Cincinnati Stadium Suites | 82536 | Δ42.7 | | |
| Sacramento Vineyard Suites | 56980 | Δ52.1 | | |
| Long Island Beach Suites | 44750 | Δ60.5 | | |
| Wilington Garden Suites | 52250 | Δ73.8 | | |
| Zone 4 | | 21 | 68 | 103 | 166 | 490 |
| National Average | | | | Δ130.3 | | |
| Company Average | 40461 | | | Δ130.7 | | |
| Austin Chili Suites | 59500 | Δ39.7 | | | | |
| Memphis Country Suites | 27560 | Δ50.7 | | | | |
| Raleigh Match Play Suites | 68585 | Δ51.8 | | | | |
| Austin Chili Suites | 6200 | | | | Δ380.7 | |
| Zone 5 | Floor Area (Sq. F.t) | 22 | 69 | 92 | 152 | 425 |
| National Average | | | | Δ117.7 | | |
| Company Average | 39625 | Δ67.1 | | | | |
| Las Vegas Shimmering Suites | 39625 | Δ67.1 | | | | |

\* The four quartile ranges were developed from a 1992 national survey. The values shown are for buildings of similar activity types and climate zones.

ACIS

Done

FIG. 42B

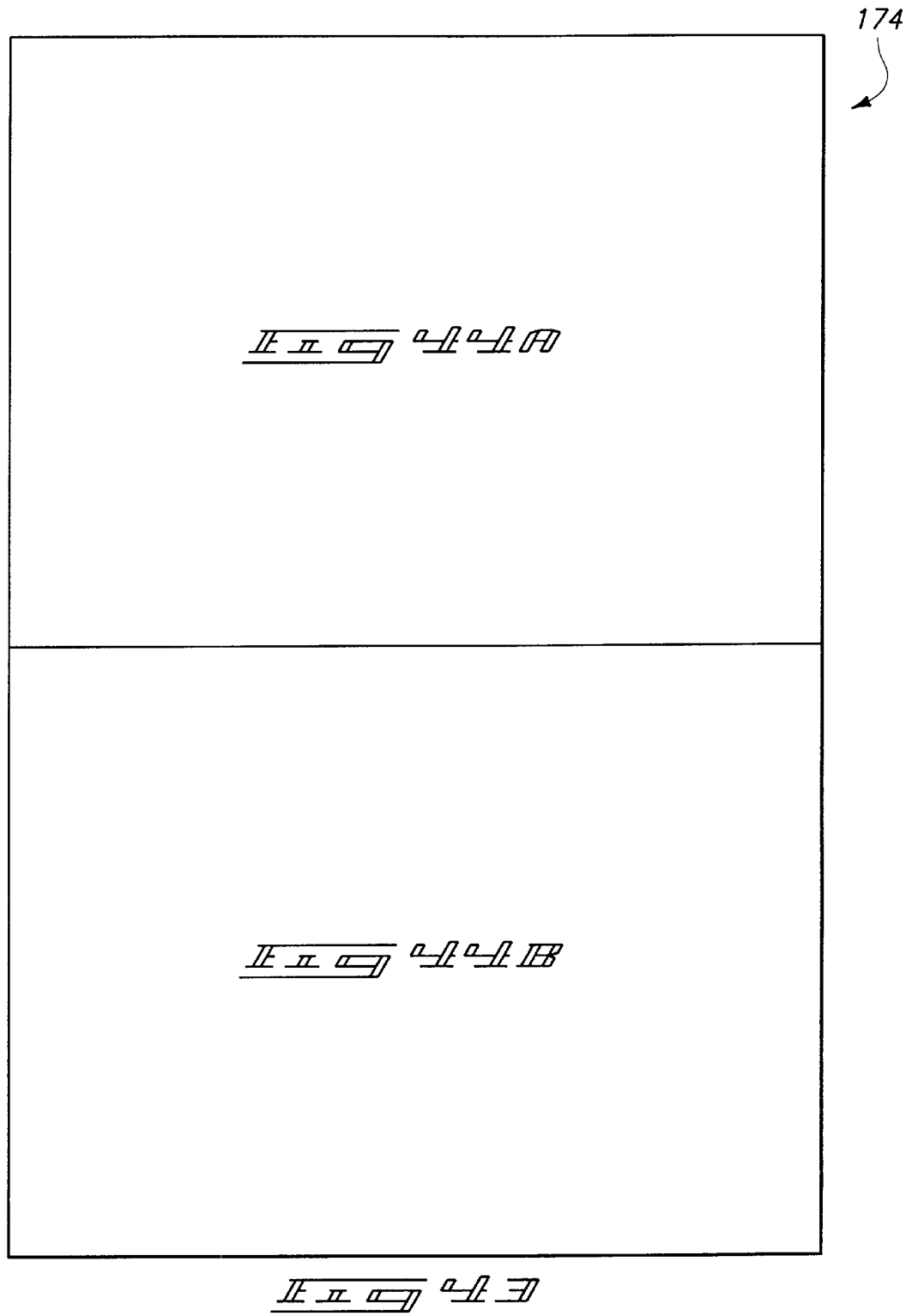

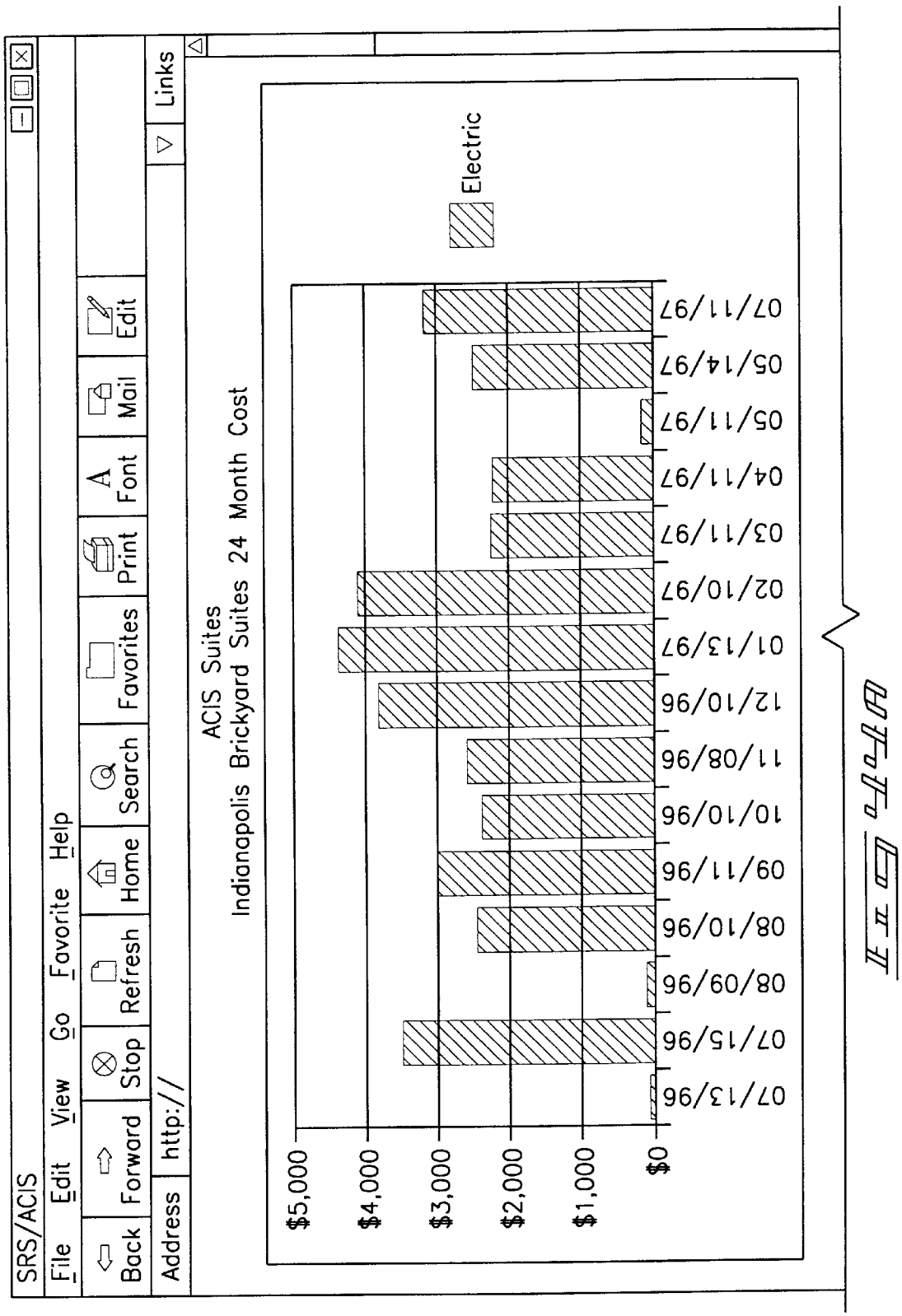

SRS/ACIS

ACIS Suites
October, 1997 YTD Production Units Costs

| Site Name | Oct 97 YTD | Oct96 YTD | Variance YTD | Variance % |
|---|---|---|---|---|
| Memphis Country Suites | $0.97 | $1.64 | (0.67) | -40% |
| Tucson Desert Suites | $1.24 | $1.96 | (0.73) | -36% |
| Sacramento Vineyard Suites | $1.49 | $2.30 | (0.80) | -34% |
| Long Island Beach Suites | $2.16 | $2.95 | (0.80) | -26% |
| Dertoit Luxury Suites | $1.47 | $1.96 | (0.49) | -25% |
| Raleigh Match Play Suites | $1.49 | $1.97 | (0.48) | -24% |
| Hartford Village Suites | $1.11 | $1.46 | (0.35) | -23% |
| Wilmington Garden Suites | $2.31 | $2.87 | (0.56) | -19% |
| Denver Mountain Suites | $1.39 | $1.55 | (0.16) | -10% |
| Las Vegas Shimmering Suites | $1.33 | $1.33 | (0.00) | 0% |
| Indianapolis Brickyard Suites | $0.74 | $0.35 | | |
| Cincinnati Stadium Suites | $0.76 | $0.07 | | |
| Austin Chili Suites | $1.04 | $0.00 | | |
| Portland Riverview Suites | $0.35 | $0.00 | | |
| Spokane Falls Suites | $0.87 | $0.00 | | |

FIG. 46B

COST PER
= 10% Reduction of better
= 5-9% Reduction
= 1-4% Reduction
= 0 or Less Reduction
= N/A

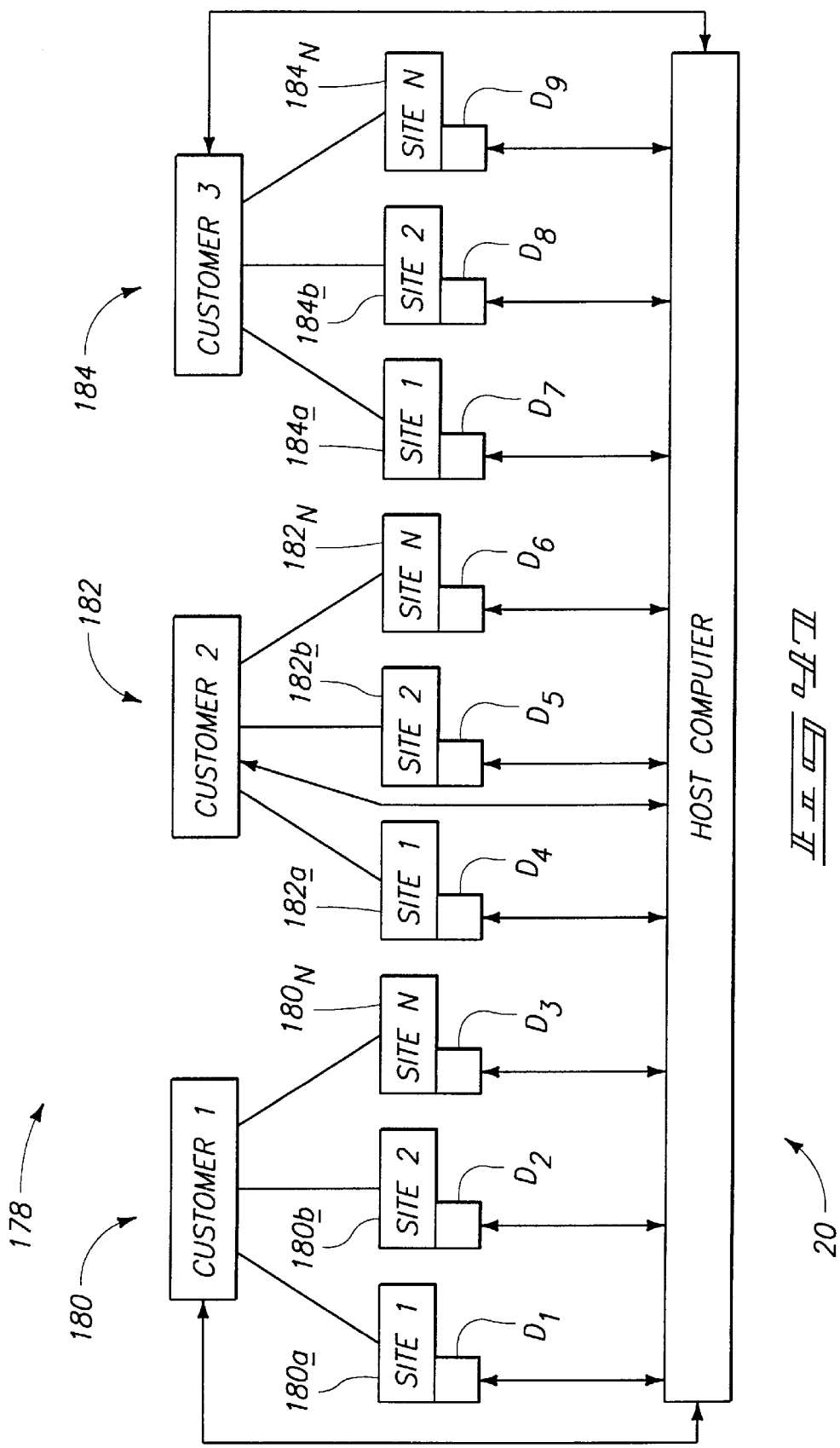

FIG. 52A

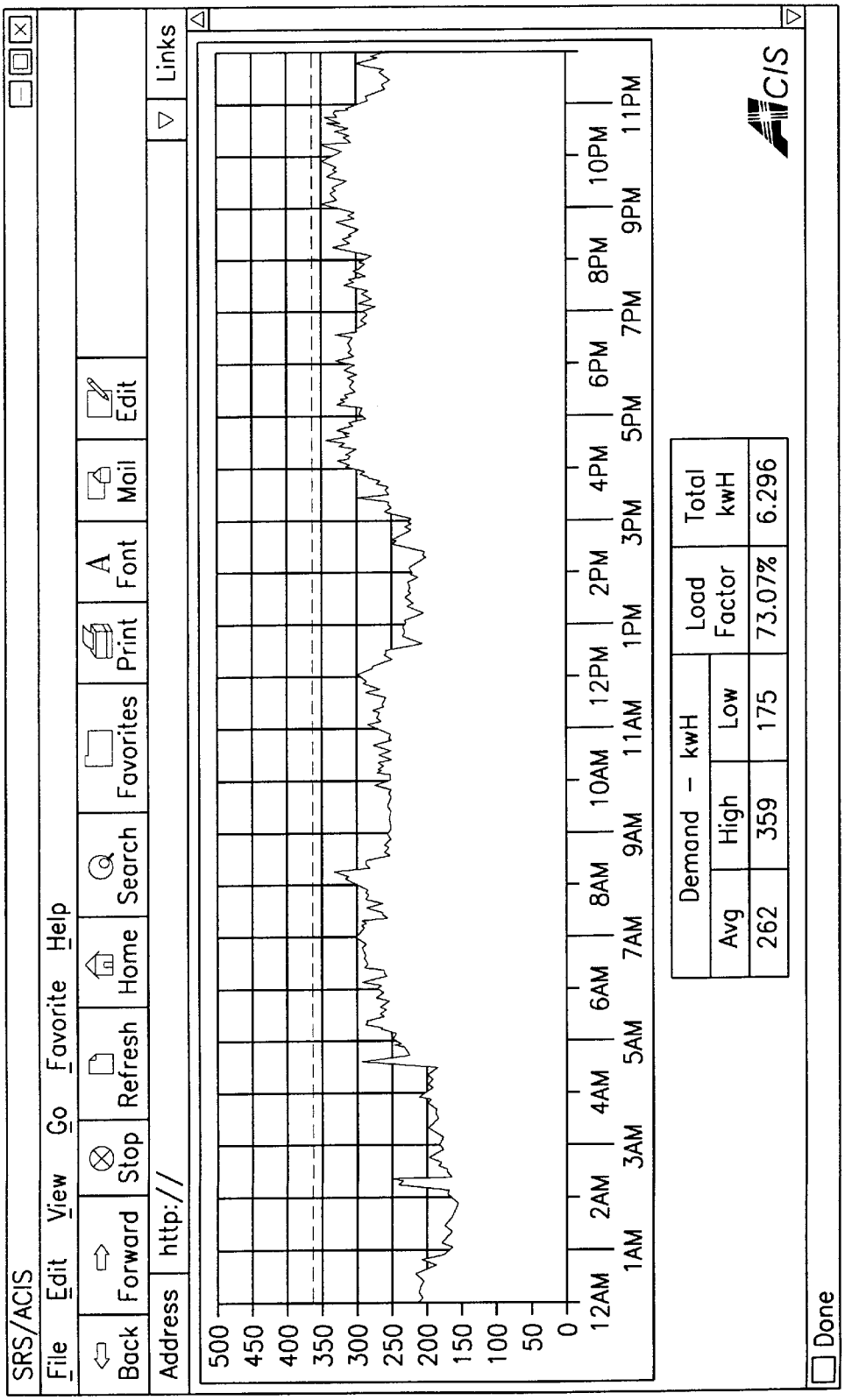

FIG. 54

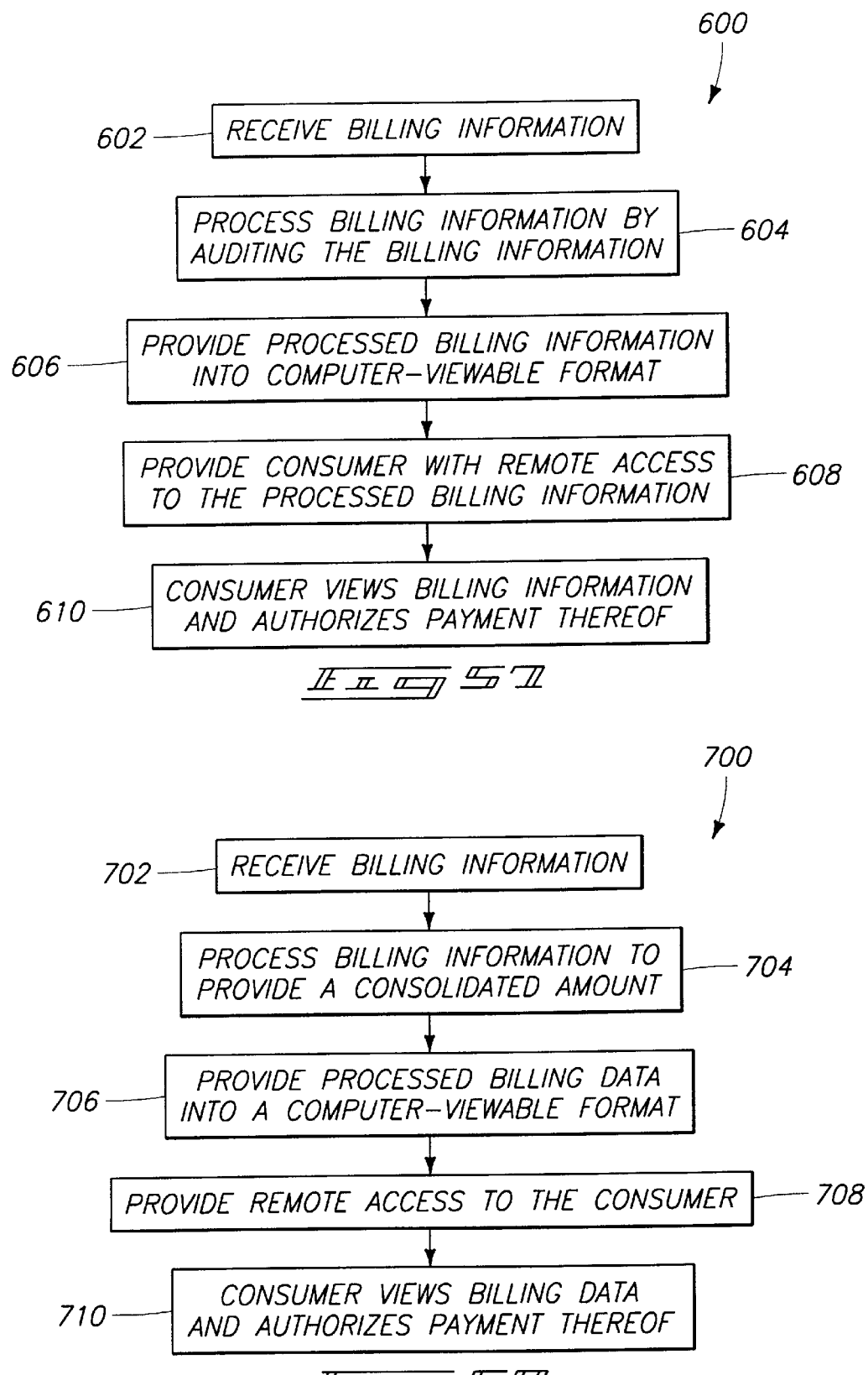

ELECTRONIC BILL PRESENTING METHODS AND BILL CONSOLIDATING METHODS

RELATED APPLICATIONS

This application is a continuation-in-part of U S. patent application Ser. No. 08/992,678 filed Dec. 17, 1997 and Ser. No. 08/984,708, filed Dec. 3, 1997, now U.S. Pat. Nos. 5,930,773 and 5,943,656, respectively.

TECHNICAL FIELD

This invention pertains to electronic bill presenting methods and to bill consolidating methods.

BACKGROUND OF THE INVENTION

A resource can be considered as a good, service, and/or commodity which is purchased by a customer and sold by a resource provider. Oftentimes a customer will purchase many different types of resources from numerous providers under differing pricing structures, and desire to account for, or otherwise track its resource consumption. This can be for various reasons which include a desire to budget for resource purchasing, track current and past usage and expenditures, and to predict future usage and expenditures.

One type of resource is a utility resource. Utility resources typically include electricity, gas (natural or petroleum-based), water, and sewer service, to name just a few. One type of customer for utility services is one which includes a number of different geographically-separated sites. Such customers typically purchase their resources from multiple unrelated resource providers. Those who have purchase decision making and/or payment authority for these types of resources typically face a very burdensome task of tracking and maintaining resource consumption and use information for a customer, and in particular for a customer having a number of different sites. In the past, tracking and accounting for resource consumption has typically been done by each individual customer. Needless to say, this is a very time-consuming and expensive proposition.

The problems faced by a customer having multiple sites are particularly nettlesome in view of the environment of deregulated energy markets because customers now have the ability to look to multiple providers with differing offering terms for required utility resources.

This invention arose out of concerns associated with improving the is management tools available for assisting customers in tracking, verifying bill accuracy, maintaining, and/or making resource purchasing decisions. In particular, this invention arose out of concerns associated with providing improved management tools for tracking, verifying bill accuracy, maintaining, and/or facilitating decision making pertaining to the acquisition, transport, and consumption of utility resources.

SUMMARY OF THE INVENTION

Electronic bill-presenting methods and bill consolidation methods are described.

In one embodiment billing information pertaining to a labor-dependent service which has been rendered to a consumer is received into a host computer which preferably includes a processor. With the processor, the billing information is processed by auditing the billing information against at least one tolerance parameter to determine whether said billing information satisfies the one tolerance parameter. Processed billing information is provided into a computer-viewable format, wherein the consumer can view the processed billing information and authorize payment thereof.

In another embodiment, an electronic bill-presenting method comprises receiving into a host computer billing information pertaining to a labor-dependent service which has been rendered to a consumer. The host computer preferably has a processor. Verification information is received from the consumer pertaining to the labor-dependent service which has been rendered to the consumer. The billing information is compared to the verification information to ascertain whether the billing information satisfies the verification information. With the processor, the billing information is processed to provide processed billing information into a computer-viewable format. The consumer can preferably view the processed billing information and can authorize payment thereof.

In yet another embodiment, an electronic bill-presenting method comprises receiving into a host computer billing information pertaining to a labor-dependent service which has been rendered to a consumer of the labor-dependent service. The host computer has a processor. With the processor, the billing information pertaining to the consumer is processed by auditing the billing information against at least one tolerance parameter to determine whether the billing information satisfies the one tolerance parameter. If, as a result of the auditing of the billing information, the billing information does not satisfy the one tolerance parameter, a review of the billing information is implemented to ascertain why the billing information does not satisfy the one tolerance parameter. Processed billing information is provided into a computer-viewable format, and the consumer can preferably view the processed billing information and authorize payment thereof.

In still another embodiment, an electronic bill-presenting method comprises receiving into a host computer billing information pertaining to a labor-dependent service which has been rendered to a consumer. The host computer has a processor and an interface device. With the processor, the billing information pertaining to the consumer is processed by auditing the billing information against at least one tolerance parameter to determine whether the billing information satisfies the one tolerance parameter. Processed billing information is provided into a computer-viewable format. The consumer is provided with remote access to the processed billing information in the computer-viewable format via the interface device, and can view the processed billing information.

In yet another embodiment, a bill consolidation method comprises receiving into a host computer billing information pertaining to a plurality of at least one of a service or material which has been rendered or provided, respectively, to a consumer. The host computer has a processor and an interface device. With the processor, the billing information is processed to provide processed billing information which includes a consolidated amount which is owed by the consumer. The processed billing information is provided into a computer-viewable format, and the consumer is provided with remote access to the processed billing information in the computer-viewable format via the interface device. The consumer can view the processed billing information which includes the consolidated amount.

BRIEF DESCRIPTION OF THE DRAWINGS

Preferred embodiments of the invention are described below with reference to the following accompanying drawings.

FIG. 7 is a high level organizational diagram illustrating a preferred embodiment of the present invention.

FIG. 8 is a view of an interactive computer screen implemented in connection with a preferred embodiment of the present invention.

FIG. 9 is a view of another interactive computer screen implemented in connection with a preferred embodiment of the present invention.

FIG. 10 is a view of another interactive computer screen implemented in connection with a preferred embodiment of the present invention.

FIG. 11 is a view of another interactive computer screen implemented in connection with a preferred embodiment of the present invention and illustrates a Resource Accounting menu from which a plurality of graphical reports can be selected by a customer.

FIG. 12 is a view of the FIG. 11 computer screen showing a drop down menu feature listing a number of different exemplary graphical reports which can be selected by a customer.

FIGS. 17, 18A–18C are views of one report screen in connection with one aspect of the present invention.

FIGS. 19, 20A–20B are views of one report screen in connection with one aspect of the present invention.

FIGS. 21, 22A–22B are views of one report screen in connection with one aspect of the present invention.

FIGS. 23, 24A–24D are views of one report screen in connection with one aspect of the present invention.

FIGS. 35, 36A–36D are views of one report screen in connection with one aspect of the present invention.

FIGS. 39, 40A–40B are views of one report screen in connection with one aspect of the present invention.

FIGS. 43, 44A–44B are views of one report screen in connection with one aspect of the present invention.

FIG. 47 is a high level organizational diagram illustrating another preferred embodiment of the present invention.

FIG. 49 is a view of another interactive computer screen implemented in connection with the FIG. 47 preferred embodiment of the invention.

FIGS. 51, 52A–52B are views of one report screen in connection with one aspect of the present invention.

FIG. 53 is a view of another interactive computer screen implemented in connection with the FIG. 47 preferred embodiment of the invention.

FIG. 54 is a view of another interactive computer screen implemented in connection with another aspect of the present invention.

FIG. 57 is a flow diagram which describes a method in accordance with one or more embodiments of the present invention.

FIG. 58 is a flow diagram which describes a method in accordance with one or more embodiments of the present invention.

DETAILED DESCRIPTION OF THE PREFERRED EMBODIMENTS

Overview

Figure 1:
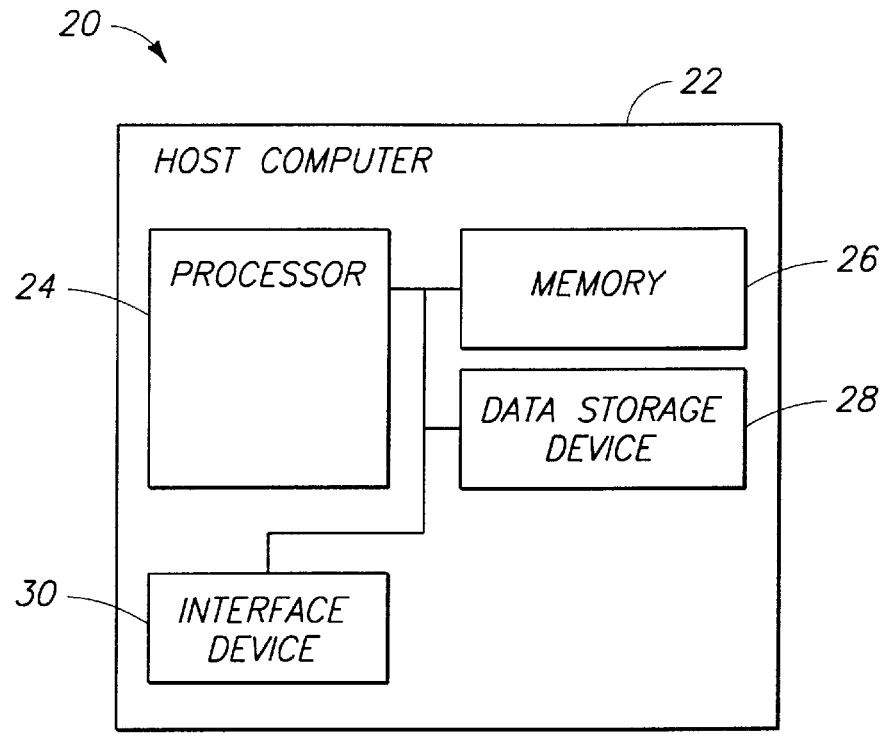
FIG. 1 is a block diagram of a computer system which is suitable for implementing the methodologies and systems of the present invention.

With reference to the various systems and methodologies of the present invention, as described below, aspects of the present invention are described in terms of steps, some of which being executed or executable on a computer system. Various implementations of the a inventive systems and methodologies provide a comprehensive, multi-faceted, multi-user based resource accounting feature which, in a preferred implementation, provides a dynamic, real-time resource management tool. In accordance with these implementations, a resource tracking system is provided which is prepared to handle the increased complexities of resource billing, such as electric and gas billing, due to deregulation. Significant cost savings are achieved through the identification of opportunities made possible by detailed resource tracking aspects which will become apparent below. Access to important pertinent resource consumption and pricing information is immediate and comprehensive, and permits an individual or company to access, among other things, resource costs and usage figures to assist in the decision making process. In other aspects of the invention which are discussed in much more detail below, one is given the opportunity to compare resource consumption among various multiple sites for purposes which include identifying sites having desirable and undesirable resource usage or cost characteristics.

In a preferred implementation, a central database is developed and contains information pertaining to different corporate and/or individual facilities. Information such as billing history for resource usage, structure information (such as square footage and structure characteristics), servicing resource provider and/or utility resource providers, and resource account information can be, and preferably is incorporated into the database. Other types of information can be incorporated, as will become apparent below.

Through the normal course of the database development process, a verification can be utilized to ensure that all sites are receiving, the most advantageous resource rate. Accordingly, comprehensive resource tracking, analysis, and reporting is made possible through the various systems and methodologies of the invention. Billing information, such as cost and usage information can be entered into or received into a host system or computer and normalized daily. The information can be normalized furthermore for variances in parameters such as for example degree-days and/or site specific primary and secondary production units. Through monthly tracking and monitoring of resource cost and consumption, various facilities are able to be identified with high and/or abnormal energy or resource usage. Through timely detection of such usage anomalies, corrective action can be undertaken immediately, rather than months after the fact.

In accordance with one aspect of the invention, billing information which is received from each resource provider is scrutinized in accordance with a plurality of predefined or pre-determined tolerance parameters. Any information which does not meet with one or more of the tolerance parameters can be identified for remedial processing. In accordance with a preferred aspect of the invention, scrutinization is performed by the host computer in accordance with a variety of algorithmic checks which are implemented by means of software. The tolerance parameters are preferably calculated through utilization of the billing information for each resource provider.

In accordance with one aspect of the invention, resource usage-based information is provided and can be accessed by a customer through an exclusive password-protected system. In this way, a flexible and paperless reporting environment meets the demands of real-time information needs of various customers. Still further, customers can remotely view resource usage data, via computer, in a number of different formats. For example, usage data can be viewed for individual facilities, all facilities, or in accordance with various defined reporting formats, e.g. BTUs/square feet, facility versus facility, facilities within a region, yearly, monthly or daily aggregate for a single or a group of facilities. Such various reporting formats are discussed in much more detail below. In other aspects of the invention, information can be downloaded from the host system, via a computer link established with a remote computer at a customer location. Such permits a customer to conduct their own analysis at their own location. In a preferred implementation, the download function is accessed through a drop down menu which permits selection of a time period, service codes, and locations. Once a request for downloading information is complete, a file is sent containing the bill date, bill identifier, site identifier, service code, consumption amount and unit of measurement, dollar amount, tax, and various miscellaneous charges. The information can be, and preferably is in a so-called fixed column flat file format.

Although a variety of different computer systems can be used with the present invention, an exemplary computer system is shown generally at 20 in FIG. 1.

Computer System Overview

Computer system 20 includes a host computer 22 having a processor 24, memory 26, data storage device 28, and an interface device 30. The exemplary components 24–30 of host computer 22 are operably connected via an address/data bus which is not specifically designated. Memory 26 can, and preferably does include a volatile memory (e.g. random access memory) which is coupled with the data bus for storing information and instructions for processor 24, and a nonvolatile memory (e.g. read only memory) coupled with the data bus for storing static information and instructions for processor 24. Data storage device 28 can comprise a mass storage device. Host computer 22 constitutes a hardware platform which executes instructions to implement the application program(s) described just below. It will be understood that system 20, as set forth in FIG. 1, is a schematic representation only. Accordingly, the system as described above and below can be implemented as an integral stand alone system as suggested by FIG. 1, or can include separate component parts which are interconnected and operable for implementing the invention described below.

Interface device 30 preferably comprises a multi-user network interface (e.g. an Internet interface) which couples computer system 20 to a multi-user system (e.g. the Internet in one embodiment of the present invention). Interface 30 is coupled to permit communication with various application programs contained on the hardware platform defined by computer system 20.

As mentioned above, and in a preferred implementation of the present invention, interface device 30 comprises an Internet interface. The Internet is a well known connection of world wide computer systems that operate using a well known Internet protocol. The Internet is one type of multi-user computer system. Other Internet applications (e.g. using specific protocols) operate in combination with is the Internet protocol. One such application is the well known world wide web or "www" Internet application which operates using the hypertext transfer protocol or http. The "www" Internet application is a "demand system" in which a user requests information from a site and the site transfers the information back to the user on-line. Also well known is the email Internet application which operates using the simple mail transport protocol or smtp. The email Internet application is a "present system" in that an information transfer command originates from a sender site and information pursuant to that command is presented to the target email address. Another Internet application is the file transfer Internet application which operates using the file transfer protocol or ftp. In one embodiment, the present invention utilizes the www, email, and file transfer Internet applications as well as the Internet protocol. Other embodiments of the present invention can be implemented in other multi-user computer environments. For example, the present invention could be implemented with a dedicated multi-user system.

Computer system 20 supports a software configuration which operates under control of a conventional operating system. The operating system permits various application processes to be executed. These include, for example, a communications application which permits data transfer with various remote terminals as will become apparent below. The software environment further includes a data management, storage, and retrieval application that is utilized in connection with data storage device 28. The data management, storage, and retrieval application organizes and stores information which will be described in greater detail below. This information is organized and stored within the environment of the operating system on one or more mass storage devices such as data storage device 28. Other applications conventionally known may be included in the software environment comprising computer system 20.

Figure 2:
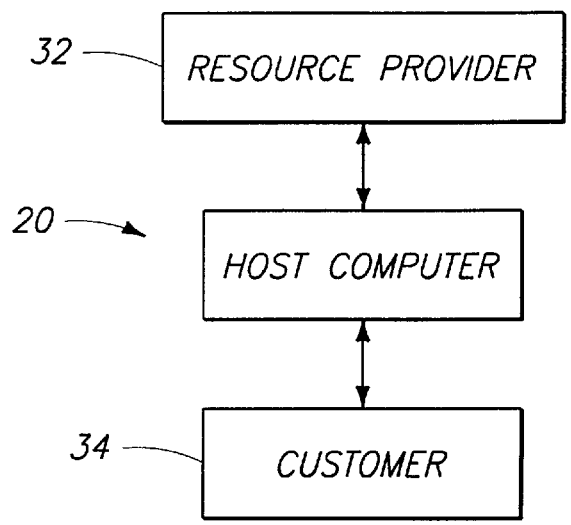
FIG. 2 is a high level organizational diagram illustrating one aspect of the present invention.

In view of the foregoing computer system description and in accordance with one aspect of the invention, the reader is referred to FIG. 2. There, an exemplary computer system or host system 20 can be seen to comprise part of a system which includes a resource provider 32 and a customer 34. In the context of this document, the term "resource provider" will be understood to include a company or other source from which resources in the form of goods, services and/or commodities originate. In a preferred implementation, such resource provider can comprise one or more utility resource providers, e.g. providers of electricity, water, sewage services, natural gas, propane, alternate energy sources and/or other goods, labor dependent services, or processes. Similarly, the term "customer" as used in this document will be understood to include an individual, company, companies or sites which consume resources from one or more resource providers. In a preferred implementation, such customers consume one or more resources for which it is desired to account.

Figure 5:
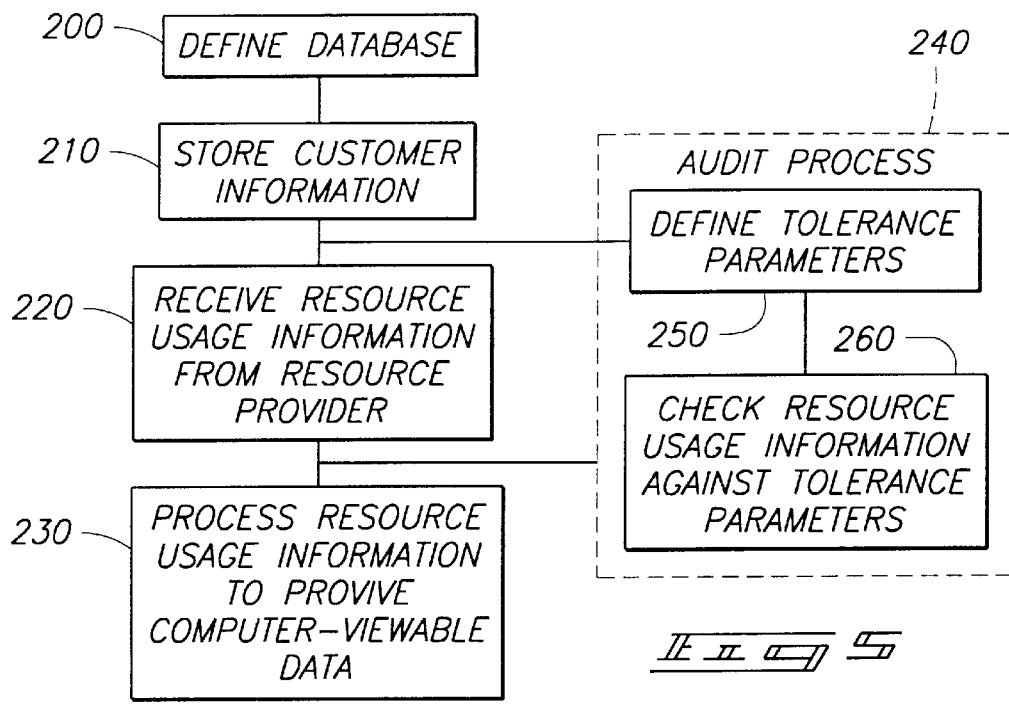
FIG. 5 is a flow diagram illustrating certain methodical aspects of the present invention.

Referring to FIGS. 1, 2, and 5, FIG. 5 presents a high level flow diagram which is or can be implemented with a software program executable on computer system 20 of the present invention. Such program would typically be stored in memory 26. A database is first defined at step 200 (FIG. 5) in host computer 22. Such database is preferably defined within a data storage device, such as data storage device 28 (FIG. 1). Information associated with at least one customer, such as customer 34, is entered and stored at step 210 in the database The information can include any type of information which is useful in implementing the present invention. Exemplary information includes the customer's name (whether an individual or a company), mailing address, business phone number, primary accounts payable point of contact, email address, general ledger account number, banking information, and/or site listing. Additionally, information such as site name, site number, site address, square footage, year built, site open date, and billing histories can be stored in the database as well. Exemplary billing history information can include such things as billing date, past due date, billing period begin and end dates, types of service, consumption, commodity charges, tax, and various other information as well.

At step 220 (FIG. 5) resource usage information from resource provider 32 is received into host computer 22. The resource usage information pertains to consumption of at least one resource by the customer. The resource usage information can be introduced into system 20 in any suitable way. In one embodiment, such information from resource provider 32 is received electronically, via a suitable data link with host computer 20, using one or more of the Internet protocols mentioned above. Alternately, resource usage information can be received in hard-copy form and entered into the host computer as by manual data entry. Other methods and systems can, of course, be utilized to permit such information to be received by host computer 20.

In a preferred implementation, the resource usage information which is received into the host computer pertains to a plurality of different consumption variables of the resource by the consumer. For example, one such consumption variable can be a cost-related consumption variable associated with the cost of a particular resource consumed by a consumer. Another consumption variable is a quantity-related consumption variable which is related to a quantity of a particular resource consumed by a consumer. Other variables are also possible.

Tolerance Parameter Checking

In one aspect of the invention, an audit process is provided at step 240 (FIG. 5). The audit process is preferably implemented in a suitable software application which is resident upon the hardware platform defined by host computer 22. Audit process 240 includes a definition step, at step 250, wherein at least one, and preferably more pre-determined tolerance parameters are defined. At step 260, the resource usage information which is received from resource provider 32 is checked against the pre-determined tolerance parameter(s) for determining whether the information satisfies such parameter(s). If the resource usage information does not satisfy the pre-determined tolerance parameter, then, in accordance with one aspect of the invention, the information from the resource provider is flagged or identified for remedial processing, either manually or electronically, which includes error checking the information.

In one implementation, the pre-determined tolerance parameters are defined through the utilization of historical billing data for customer 34. In particular, when the above-mentioned information regarding the customer is stored, at step 210, historical billing data can be entered and cataloged into the database at that time. Additionally, the historical billing data can include currently up-to-date billing information from a previous billing cycle. Processor 24 (FIG. 1) preferably processes the historical billing data and defines the tolerance parameters.

Two exemplary categories of tolerance parameters are: (1) overall bill tolerance check parameters; and (2) individual line item tolerance check parameters. Of course, other tolerance parameters are possible. Examples of overall bill tolerance check parameters could include, for example: (a) current charges cannot exceed one and one half times the average bill; (b) bills cannot overlap with any other system bill with respect to beginning and ending dates; (c) the bill cannot be a duplicate of one already existing within the system; and, (d) all required information must be present on the entered bill. Examples of individual line item tolerance check parameters could include, for example: (a) the number of days of service must fall within 20% either way of the account average; (b) service start date must be the day following the prior period bill ending date; (c) service ending date must be one day prior to next period beginning date; (d) service consumption and dollars must move in the same general direction, e.g. an increase in one should be accompanied by an increase in the other; (e) consumption must fall within a 20% difference of prior or next period consumption; and (f) charges must fall within a 20% difference of prior or next period charges. A bill or billing information failing any of the above parameters is flagged or otherwise identified for subsequent remedial processing. As history of a particular customer is accumulated, tolerances can be redefined based upon the actual variances that exist between months and/or billing periods. Accordingly, the pre-defined tolerance parameters are adjustable by the system for each customer. Further, the tolerance parameters which are calculated and used to scrutinize the resource usage information can be specifically tailored to each of the resources. For example, tolerance parameters can be calculated to ensure that each utility bill is arithmetically accurate. Additionally, the resource usage information can be used to effect a comparison between a utility tariff rate to determine whether the bill was priced properly.

Remote Access

At step 230, the resource usage information, which may or may not have been audit processed as described above, is processed by the host computer to provide usage-based, computer-viewable data associated with a particular customer's consumption of the resource.

Figure 6:
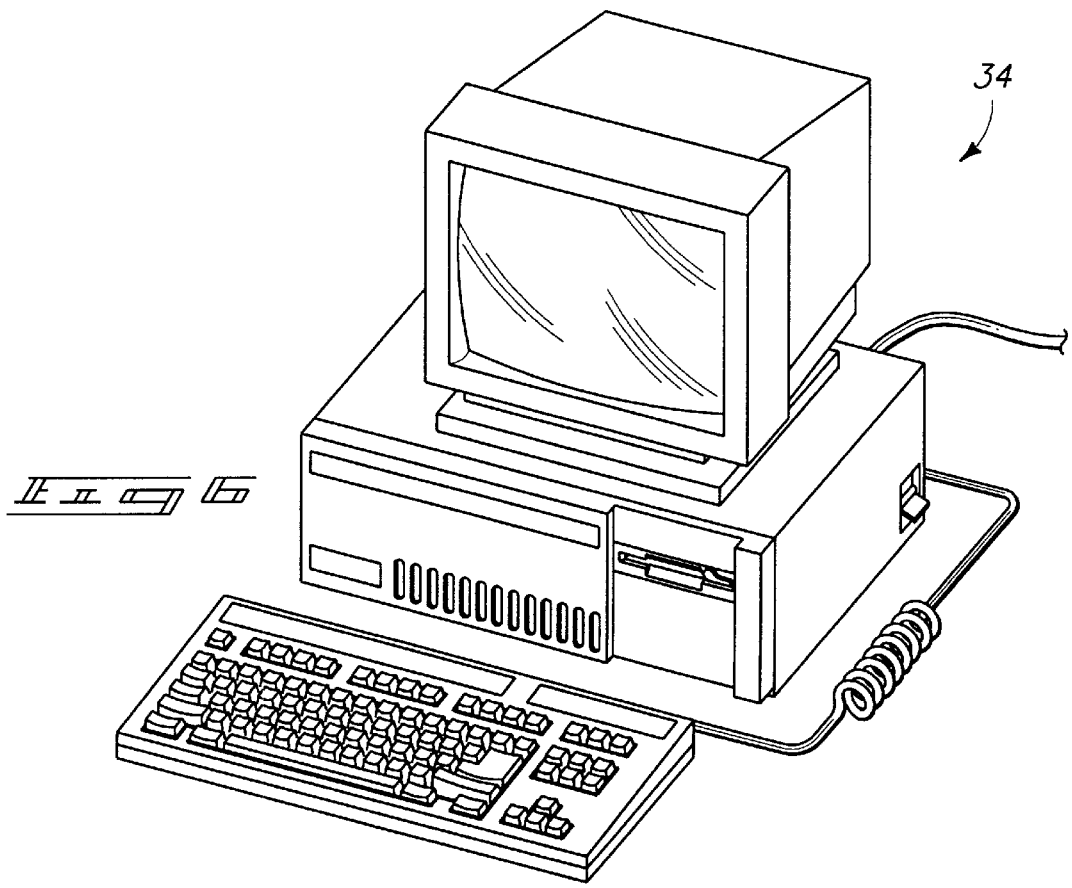
FIG. 6 is an illustration of an exemplary remote electronic access device which can be utilized in implementing the present invention.

Customer 34 can be subsequently provided with remote electronic access to the viewable data preferably through the interface device 30 (FIG. 1). Remote access is preferably provided through a remote computer, such as the one shown in FIG. 6, which is linkable with host computer 22 through a protocol, such as one suitable for use within an Internet-based system. In particular, and in connection with a preferred implementation, host computer 22 provides or otherwise defines an Internet website. The various usage information received and processed by host computer 22 from resource provider 32 is provided on the Internet site and can be remotely accessed by the customer. Preferably, access to information contained on host computer 22 is password-protected such that only the intended customer can access its relevant information and subsequently provide an authorization to make a payment or arrangement to make a payment for the resources consumed after reviewing the billing information provided. In this way, centralized, computer-accessible, resource accounting methods and systems are provided which are "proactive" in the sense that the customer can, on its own time and terms, access its relevant usage-based information. Further, an audit process is provided to scrutinize the resource usage information to ensure that the information utilized to generate the computer-viewable data is within acceptable tolerances levels.

Figure 3:
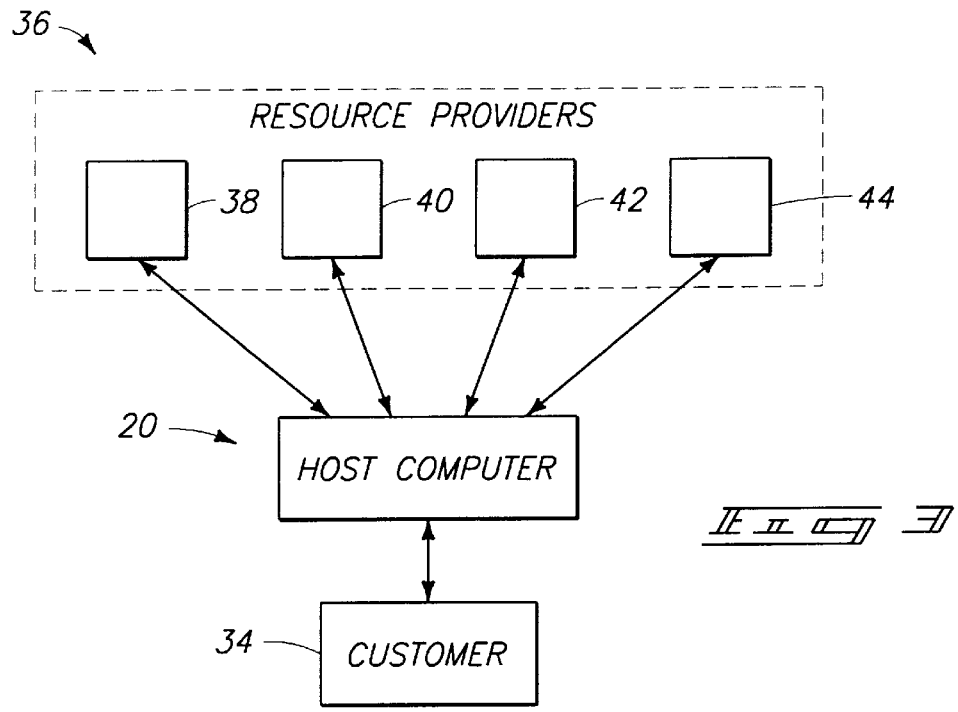
FIG. 3 is a high level organizational diagram illustrating one aspect of the present invention.

Referring to FIG. 3, an implementation in accordance with another aspect of the invention is set forth generally at 36. In this implementation, a plurality of resource providers 38, 40, 42, and 44 provide resource usage information to host computer 20 such that the host computer can process the information as described immediately above. The resource providers need not be related to one another and can comprise separate companies. Alternately, the resource usage information provided by resource providers 38–44 can originate from one resource provider and can constitute a plurality of different resources, e.g. electric power, water, natural gas, sewer services, and the like. Such would be the case, for example, if one resource provider were to provide all of the pertinent resources which are utilized by a particular consumer. As earlier discussed, the above-described tolerance parameters which are effectuated through the audit processor function can be, and preferably are implemented for the resource usage information which is received from each of the resource providers.

Through a remote computer terminal, customer 34 can access host computer 20 and receive the processed usage-based information in the form of a plurality of different graphical reports which are selectable by a customer and described below in greater detail and also make or arrange for payment of the resources. Preferably, such access is provided through interface device 30 (FIG. 1) as discussed above.

Again, centralized, computer-accessible, interactive resource management methods and systems are provided which are "proactive" in the sense that the customer can, on its own time and terms, access its relevant resource usage information. Further, a system is provided which can receive resource usage input from a number of different resource providers. Further still, a system is provided which can tolerance check the resource usage information received from each of the resource providers to ensure accurate reporting thereof to the customer. Accordingly, very streamlined, efficient, and accurate resource management and accounting systems and processes are provided by the various implementations of the invention.

Figure 4:
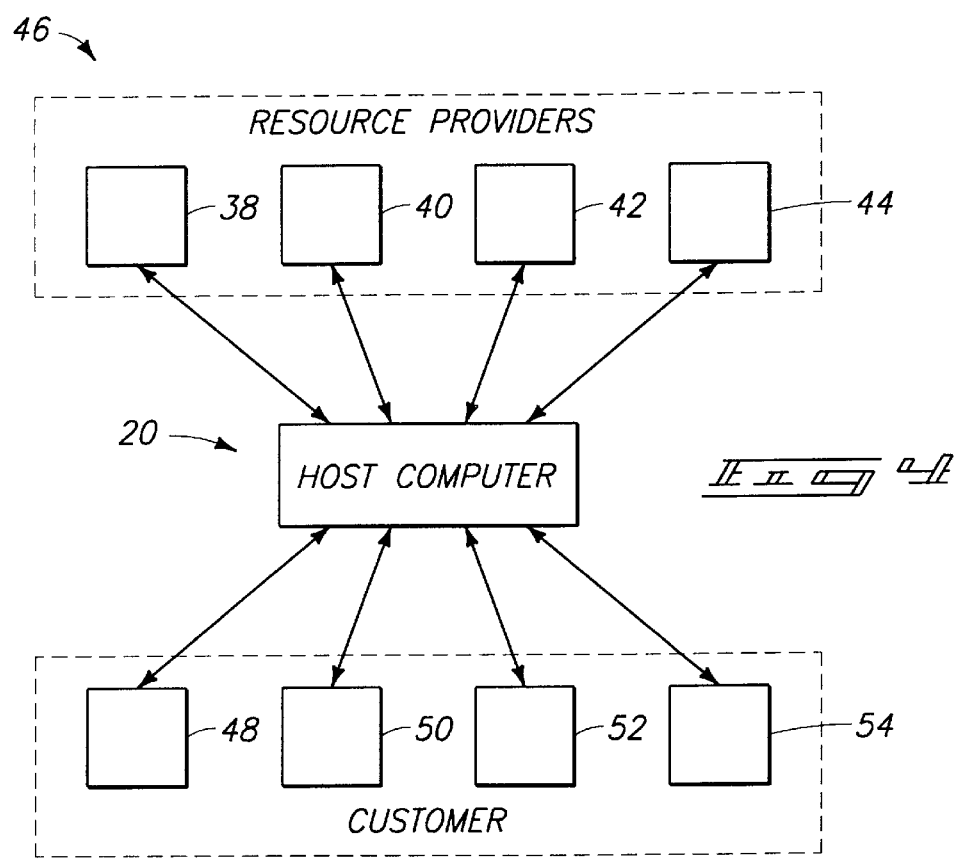
FIG. 4 is a high level organizational diagram illustrating one aspect of the present invention.

Referring to FIG. 4, another implementation in accordance with the invention is set forth generally at 46. There, it can be seen that a plurality of resource providers 38–44 have access to, or are otherwise capable of providing resource usage information to computer system 20. A plurality of customers 48, 50, 52, and 54 preferably have remote electronic access to computer system 20 in much the way as was described above. It is to be understood that although only four resource providers and four customers are utilized in the illustration, many more of both are contemplated.

In this example, a database within host system 20 receives and stores information associated with each of customers 48–54. Resource usage information is received into host computer 20 from resource providers 38–44. Such information, for each of both the resource providers and the customers, is preferably tolerance checked as described above, to ensure the accuracy of such information. Such information is further preferably processed into computer-viewable, usage-based data associated with each customer's consumption of the resource. In a preferred embodiment, the resource comprises a utility resource. Preferably a plurality of different utility resources are managed and tracked by the inventive systems and methodologies. Such processed information is preferably made available, through remote computer terminal access, to each of the customers.

Again, computer-accessible, interactive resource management methods and systems are provided which are "proactive" in the sense that the consumer can, on its own time and terms, access its relevant resource usage information. Further, a system is provided which receives resource usage information from a number of different resource providers, checks the resource usage information against one or more tolerance parameters, processes such information and makes it available to the customers via electronic link. In this implementation a plurality of different customers are incorporated into the system of the present invention. Accordingly, very streamlined, accurate, and efficient systems and processes are provided by the various implementations of the invention.

Referring to FIG. 7, a preferred implementation of the invention is set forth generally at 56. Similar to the above implementation, a computer system 20 is provided and includes a host computer 22 as described above. Information for a plurality of customers 58, 60, and 62 is stored in a database as described above. Each customer can, but need not, comprise a plurality of different sites which may or may not be geographically separated. The customers are customers and consumers of utility resources provided by a plurality of different utility resource providers 64, 66, 68, and 70. Each customer may, however, be a customer of only one utility resource provider. Alternately, each customer may be a customer of more than one utility resource provider. Where a customer has many different geographically-separated sites, (58A–58C; 60A–60C; 62A–62C) utility resources such as electricity, water, gas, and/or other related utility resource services could conceivably be provided by a large number of utility resource companies or providers. Utility resource usage information is received from each utility resource company into host computer 22 as described above in connection with step 220 (FIG. 5). The usage information pertains to consumption of utility resources by each site of each customer and includes, as mentioned above, cost-related and quantity-related consumption variables. Such information is preferably tolerance checked in accordance with the above-described audit processor to ensure the accuracy thereof. Preferably, tolerance checking is performed for each of the utility resource providers for each of their relevant customers. Such information is preferably subsequently processed as described and customers 58–62 are provided with remote electronic access to computer-viewable data in host computer 20 through interface device 30 (FIG. 1) as described above. Such computer-viewable data is preferably in the form of a plurality of different graphical reports which can be selected by the customer for viewing on a computer which is remote from the host computer.

The inventive methodologies and systems described just above are particularly useful in the context of utility resource customers having a number of different, geographically-separated sites (such as nationwide) which are serviced by a plurality of different utility resource providers.

For example, and with reference to FIG. 7, customer 58 includes sites 58a, 58b, and 58c. Although only three exemplary sites are used, it will be understood that such sites can comprise any number of different sites which may or may not be geographically-separated. Similarly, customer 60 includes site 60a, 60b, and 60c. Likewise, customer 62 includes site 62a, 62b, and 62c. For purposes of example only, assume that each geographically-separated site of any of the customers is serviced by a different utility resource provider or company. Each utility resource provider is able to, through the inventive methodologies and systems, provide usage information for each specific geographically-separated site to computer system 20. Such information is received and processed and provided so that each customer, e.g. customers 58, 60, 62, can access and view graphical reports, including numerical and tabulated reports, for each of its sites. In this embodiment, as was briefly mentioned above, the tolerance parameters can be, and preferably are defined to be utility-specific. This gives the customer access to processed, computer-viewable data which includes a desired degree of utility pricing expertise. Such expertise is comprehensive and vast insofar as a large number of utility resource providers are incorporated into the system for an even larger number of customers. Through the preferred tolerance parameter checking, errors or anomalies can be easily detected for correction. In the context of utility providers, customers whose utility usage information is determined to fail one or more of the tolerance parameters can receive an adjustment from the servicing utility, or alternately, can be placed on a correct rate schedule. Alternatively, and in the event there is no error in the usage information, the customer can be advised to modify utility consumption to qualify for a more favorable price, or, may be advised to seek an alternate supplier whose pricing may be more favorable for the customer's existing consumption pattern.

As was initially discussed above, the systems and methodologies of the present invention are preferably implemented in connection with a multi-user computer environment. A preferred computer environment is the Internet. Accordingly, and with reference to FIGS. 8 through 46; 46B; 48–51; 52A; 52B; 53; and 54, various exemplary screen displays are illustrated which can be supported or provided on a remote computer terminal, such as the one shown in FIG. 6, for each customer to utilize in accessing and viewing the computer-viewable, usage-based data described just below.

Referring to FIG. 8, a welcome screen 100 is displayed for a website supported by the host computer which allows access by a is customer to computer system 20 via interface device 30 (FIG. 1). A particular customer or company can enter its name in field 102, as well as its unique password in field 104. Accordingly, password protection ensures that proper security measures are present and prevents unauthorized access.

Figure 9:
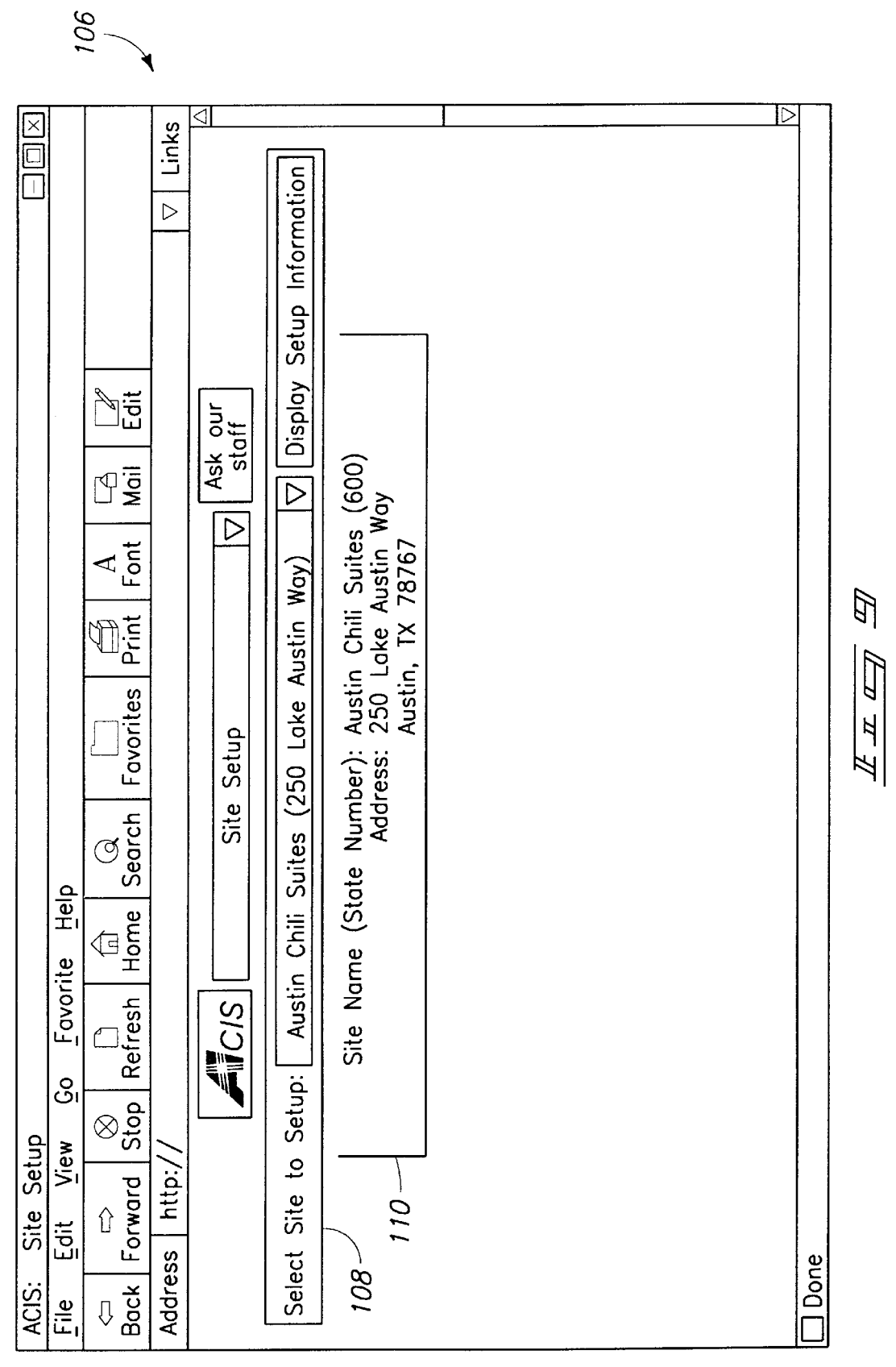

Referring to FIG. 9, a screen 106 is presented and includes a number of different fields for gathering information about the customer and, where applicable, each site maintained by a customer. A site set up field 108 is provided in which a customer can enter, where appropriate, each of its individual sites into the system. A site address field is provided at 110. Information which is gathered on each customer can be gathered through a data entry website having a data entry screen such as screen 106, through conventional hard-copy form, or through transmitted email files, and the like. Such information is, or can be utilized in building and maintaining historical billing data and includes such things as corporate name, site, billing information, and utility resource account information.

Report Overview

In the explanation which follows, certain aspects of the invention are described in the context of fictional company called "ACIS Suites" which maintains a plurality of different, geographically-separated lodging units. It is to be understood, however, that inventive systems and methodologies have application in a wide range of industries, and that the present example is for illustrative purposes only.

Referring to FIG. 10, a different site setup screen 112 is shown which enables a customer to enter even more information into the host computer. Screen 112 can be provided for customers that have a plurality of different sites for which accounting for one or more resources is desired. In particular, specific information regarding each of a customer's sites can be ascertained through this screen. In the illustrated example, a plurality of fields are provided for entry of information and include a production units field 114, a climate zone field 116, and a secondary units field 118. In the illustrated example, the production units field 114 can be utilized by a customer to enter information pertaining to the number of units maintained, the variable monthly production units, and the date the site was opened. A production unit can be considered as a fixed daily unit of measurement such as, and in this example, available rooms for a lodging company facility site. The climate zone is used for benchmarking a facility's energy use against a national average adjusted for weather. In the climate zone field 116, a customer can designate a specific climate zone in which a site is located for purposes of comparison to other similarly-located sites. A state map based on the site address entered into the system can appear and a customer can click on the county and/or state in which the site resides. Climate zone assignment information enables reports to be generated which are discussed in more detail below. Climatic conditions for locations have been placed into five categories (i.e. zones 1–5) based upon the number of annual heating degree days and cooling degree days historically occurring in a given location. Such constitutes but one way of grouping sites in accordance with a predefined grouping variable. In this example, the predefined grouping variable is climate zone.

Resource Accounting

Figure 11:
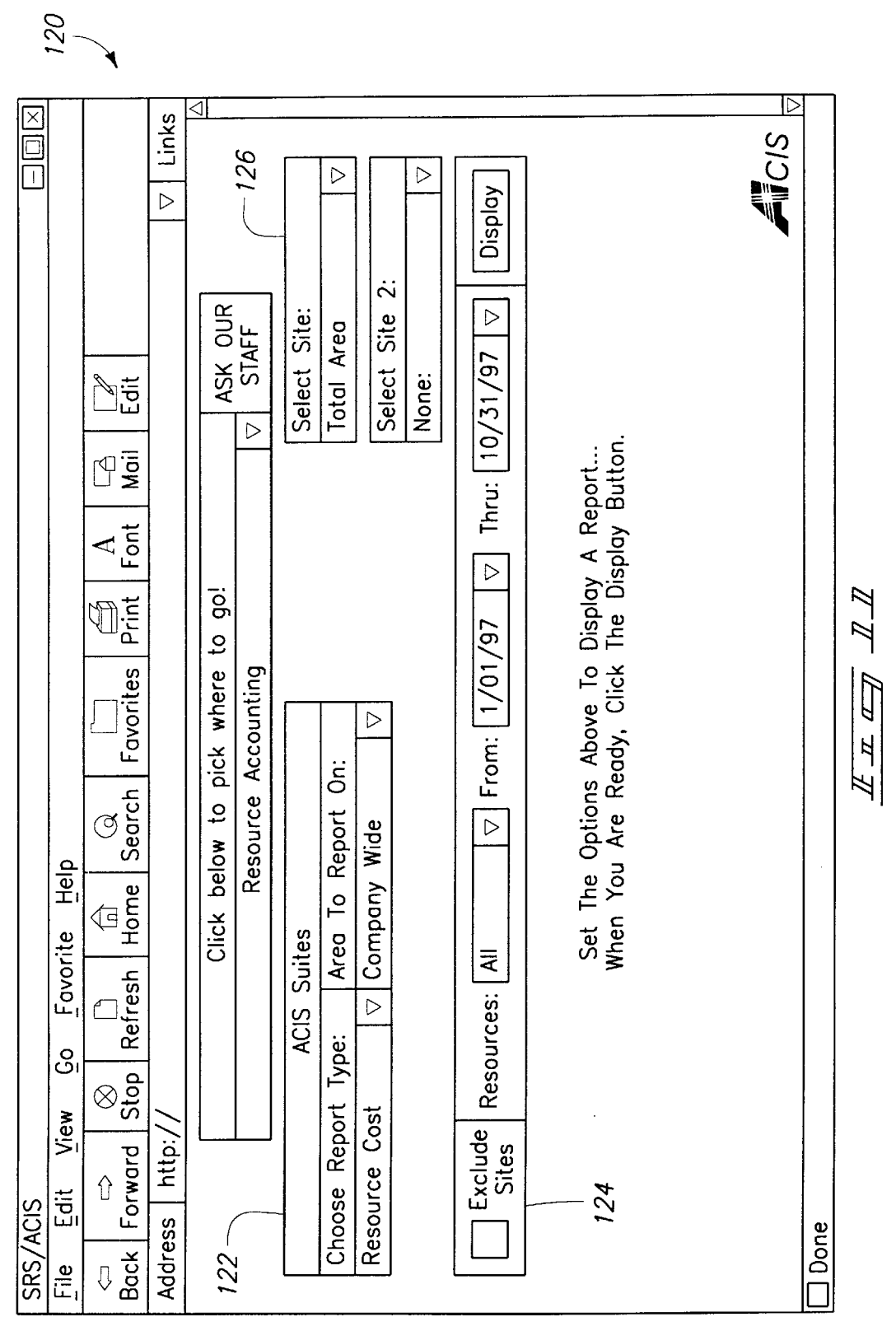

Referring to FIG. 11, a Resource Accounting screen 120 is provided and enables a plurality of selectable graphical reports to be selected by a customer. The reports which are selectable by each customer provide computer-viewable data which can be viewed, in a preferred implementation, via a remote computer terminal as described above. A report field 122 is provided and permits a customer to choose between a report type (described in more detail below) and/or an area on which to report. In the illustrated example, a Resource Cost report is selected for a company-wide report. Once a particular report and area are selected via report field 122, the report can be specifically tailored depending on the needs of the customer. For example, a field 124 is provided in which a user can exclude sites based upon user-selected criteria or which were not open for a particular reporting period, select from among a number of different resources, i.e., electricity, gas, water, sewer services, and the like, and specify a date range through which such computer-viewable data can be viewed. In the illustrated example, a company-wide report has been selected to view all resources from Jan. 1, 1997, through Oct. 31, 1997. A select site field 126 is provided and permits a site-to-site comparison to be made between two different sites of the customer. Examples of this are given below in more detail. A customer, through utilization of screen 120, can opt to select a report to view a total company area average, a single site, or a site-to-site comparison. Once pertinent parameters have been set for a report, a user need simply only click on the "Display" feature in field 124 to see a display of the relevant computer-viewable data.

Figure 12:
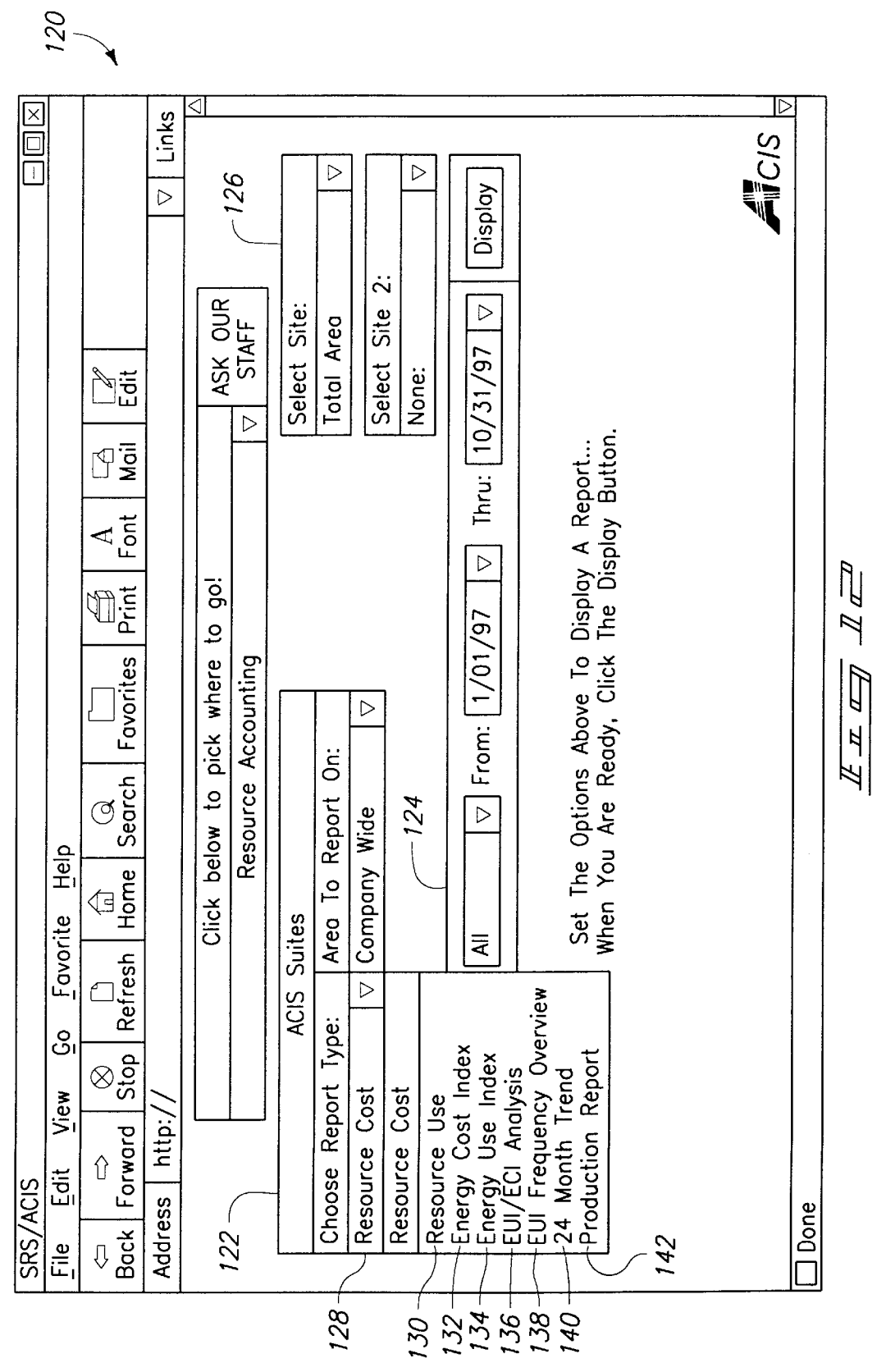

Referring to FIG. 12, screen 120 is shown in more detail, and in particular the number of different reports which can be selected by the customer in field 122. A plurality of different reports are shown in drop-down menu fashion, and include Resource Cost 128, Resource Use 130, Energy Cost Index 132, Energy Use Index 134, EUI/ECI Analysis 136, EUI Frequency Overview 138, 24-Month Trend 140, and Production Report 142. By using the drop down menu feature of field 122, a user can select from a variety of different reports which are generated based upon the resource usage information which was previously received into the host system. Each of these reports are discussed below in more detail. It is to be understood that the reports and formats thereof described below are for illustrative purposes only. Accordingly, other reports and formats could be utilized.

Before a discussion of the individual reports mentioned above, a discussion of the format of each report as presented in this document is in order. Most, if not all of the computer screens which can be displayed on a customer's computer are, for purposes of description, broken into segments in this document. This has been done because of spacing concerns. In many of the reports, the customer can navigate through the individual screen by clicking on the up/down symbols which are part of the screen. For the most part, each of the report screens is first represented in a block-type diagram. The separate segments of the screen bear their own Figure designation. Each separate segment is then shown in a subsequent Figure. Such will become evident below.

Resource Cost Report

Referring to FIGS. 13 and 14A–14C, an exemplary screen 144 is shown. Separate segments are designated as FIG. 14A, FIG. 14B, and FIG. 14C. Each segmented portion of FIG. 13 corresponds to a portion of a computer screen which can be viewed and navigated through by a customer. A customer can navigate through the computer screen using conventional up and down arrows.

Figures 13, 14A, 14B, 14C:
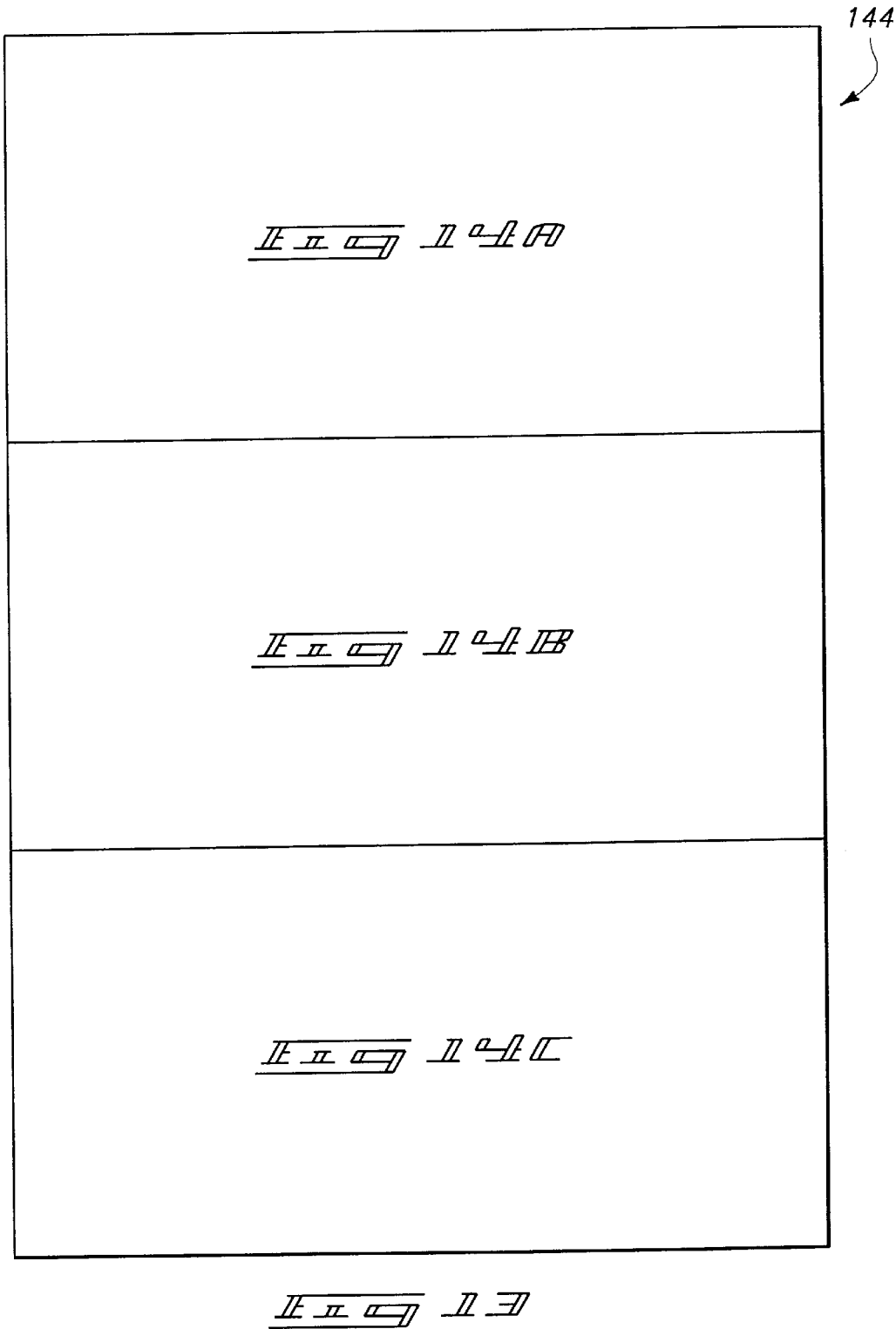
FIGS. 13, and 14A–14C are views of one report screen in connection with one aspect of the present invention.
Figure 14B:
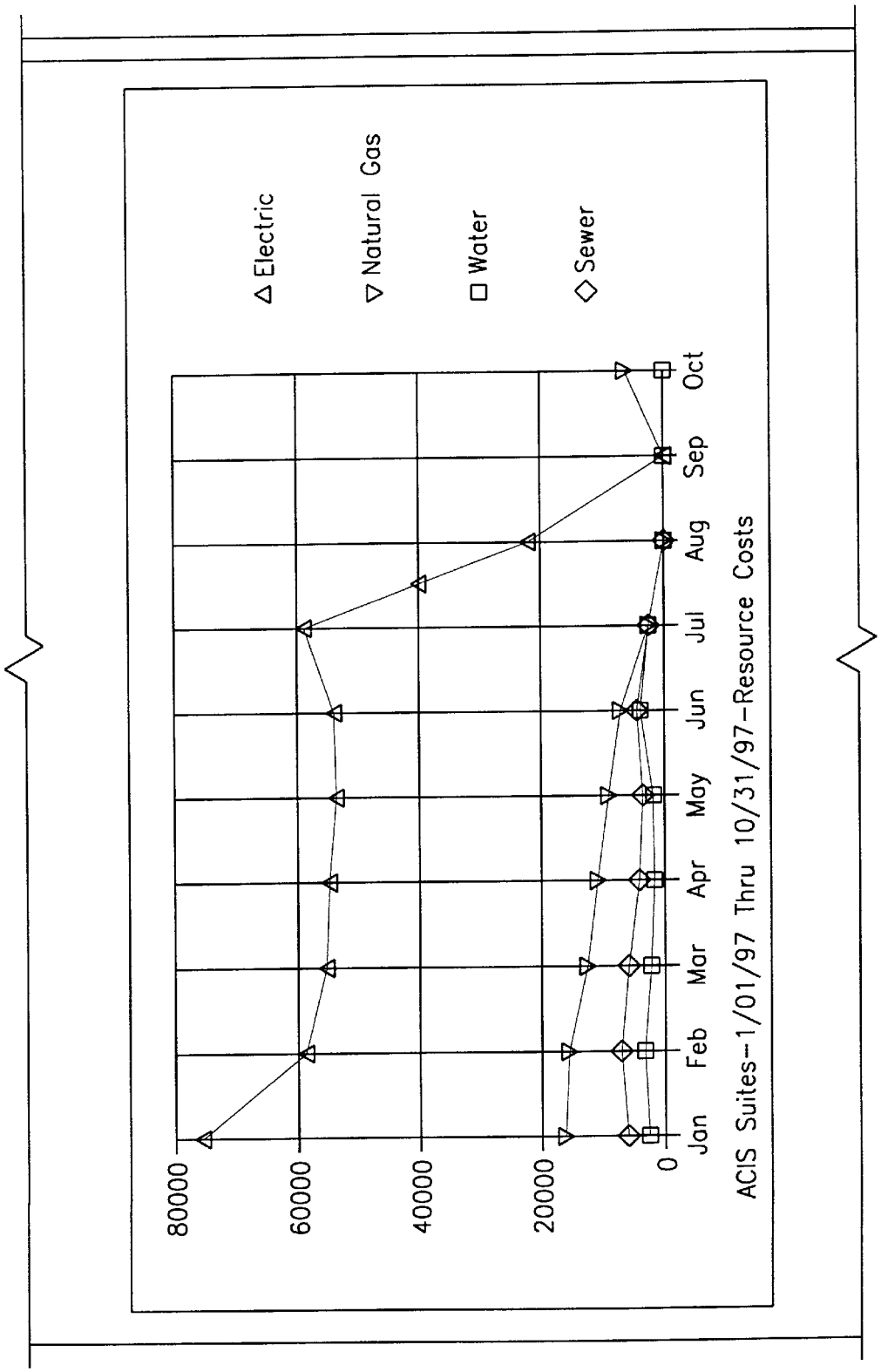
Figure 14C:

Computer screen 144 constitutes a company-wide, e.g. ACIS Suites, Resource Cost report from the period of Jan. 1, 1997, through Oct. 31, 1997. The Resource Cost report shows summed dollar amounts for the primary service groups such as electricity, gas, water, sewer, solid waste and/or other fuels. Referring more specifically to FIGS. 14A–14C, typical graphical report formats include a pie chart representation (FIG. 14A), a trend or line graph of resource costs (FIG. 14B), and a tabular or chart-based display which gives a tabular allocation comparison between current and past periods with a percentage change therebetween. Collectively, the Resource Cost report provides graphical, user-viewable data which allows a customer or a customer's facility manager to view a cost representation of its company-wide consumption of resources. The illustrated resources include electric power, natural gas, water, and sewer services. Through utilization of comparative analysis, the facility manager can identify variances in consumption costs of one or more particular resources and identify problem areas which might need attention.

Figures 15, 16A, 16B, 16C:
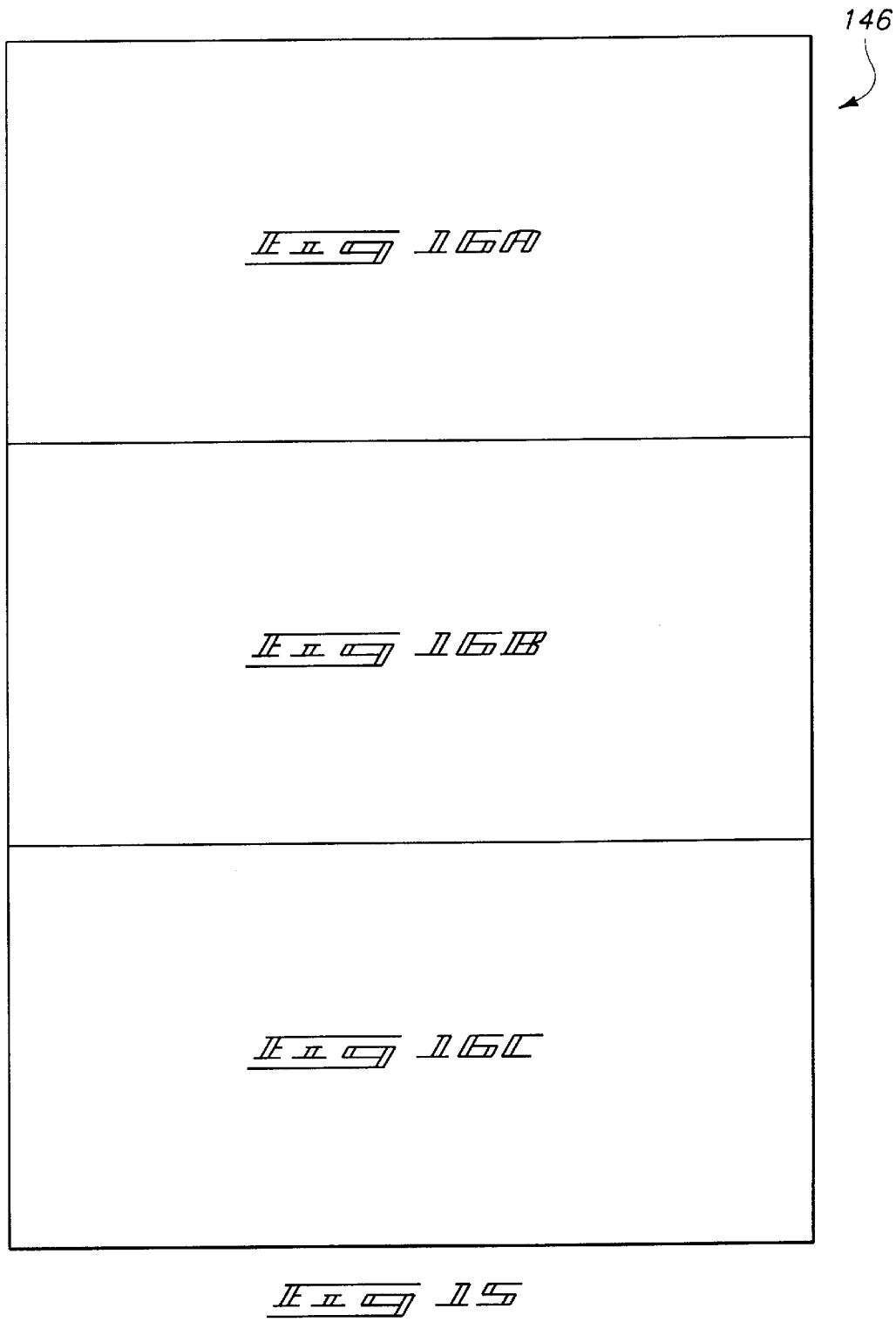
FIGS. 15, 16A–16C are views of one report screen in connection with one aspect of the present invention.
Figure 16B:
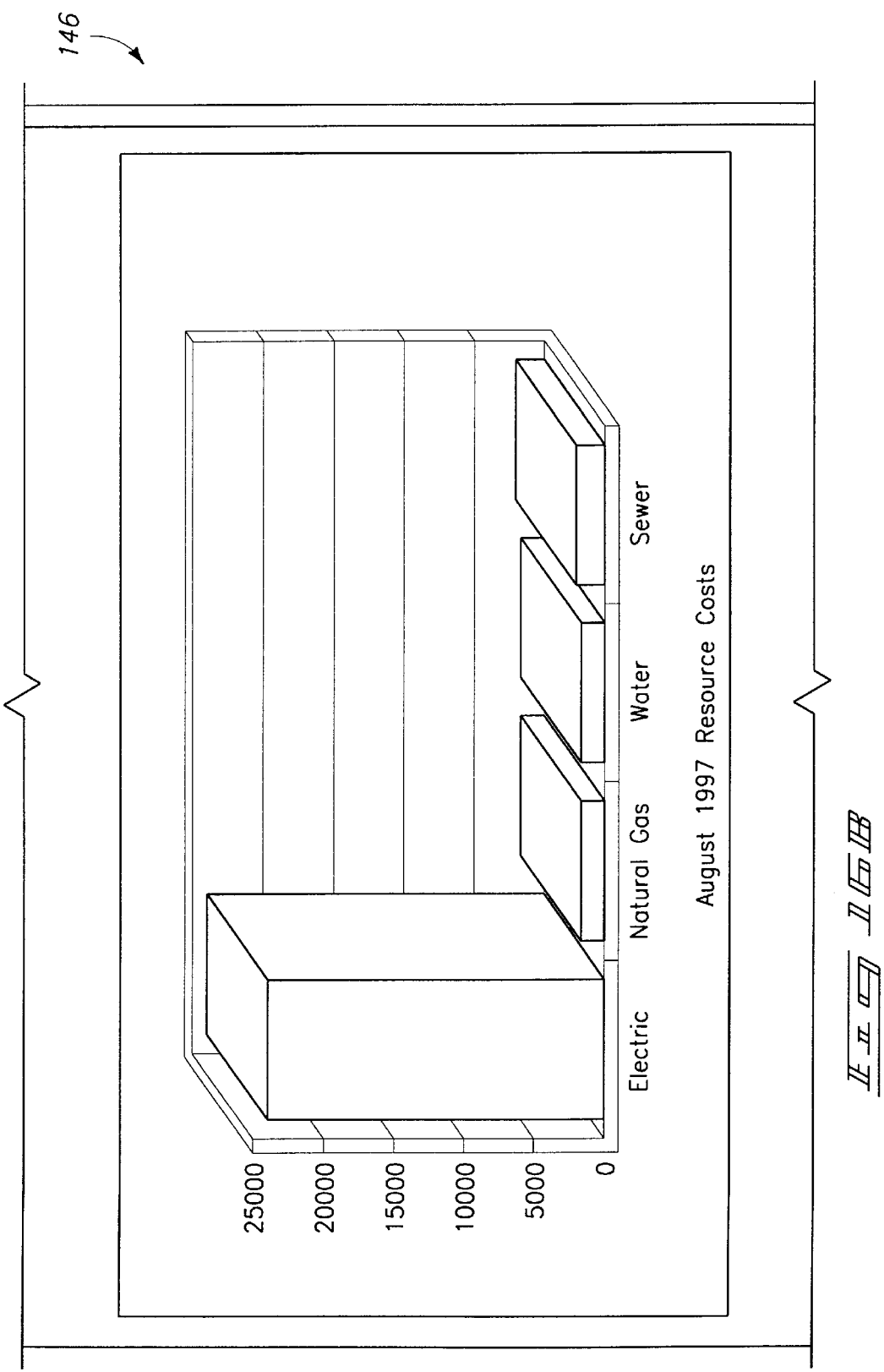
Figure 16C:

Referring to FIGS. 15 and 16A–16C, a screen 146 is shown having component parts designated as FIG. 16A, FIG. 16B, and FIG. 16C. Screen 146 constitutes a Resource Cost report for a single month which covers company-wide consumption costs of resources. In this report format, and as shown in FIG. 16A, a pie chart representation of resource consumption is shown. FIG. 16B includes a bar graph chart describing the company's consumption costs of resources including electricity, natural gas, water, and sewer. FIG. 16C shows a tabular representation of such resources for the month of August 1997. This report format enables a facilities manager to ascertain, during any given month, whether there are variances in resource costs which could indicate problem areas. It also gives the facilities manager the tools to identify the effects of any conservation measures by being able to observe variances between reporting periods.

Figure 18B:
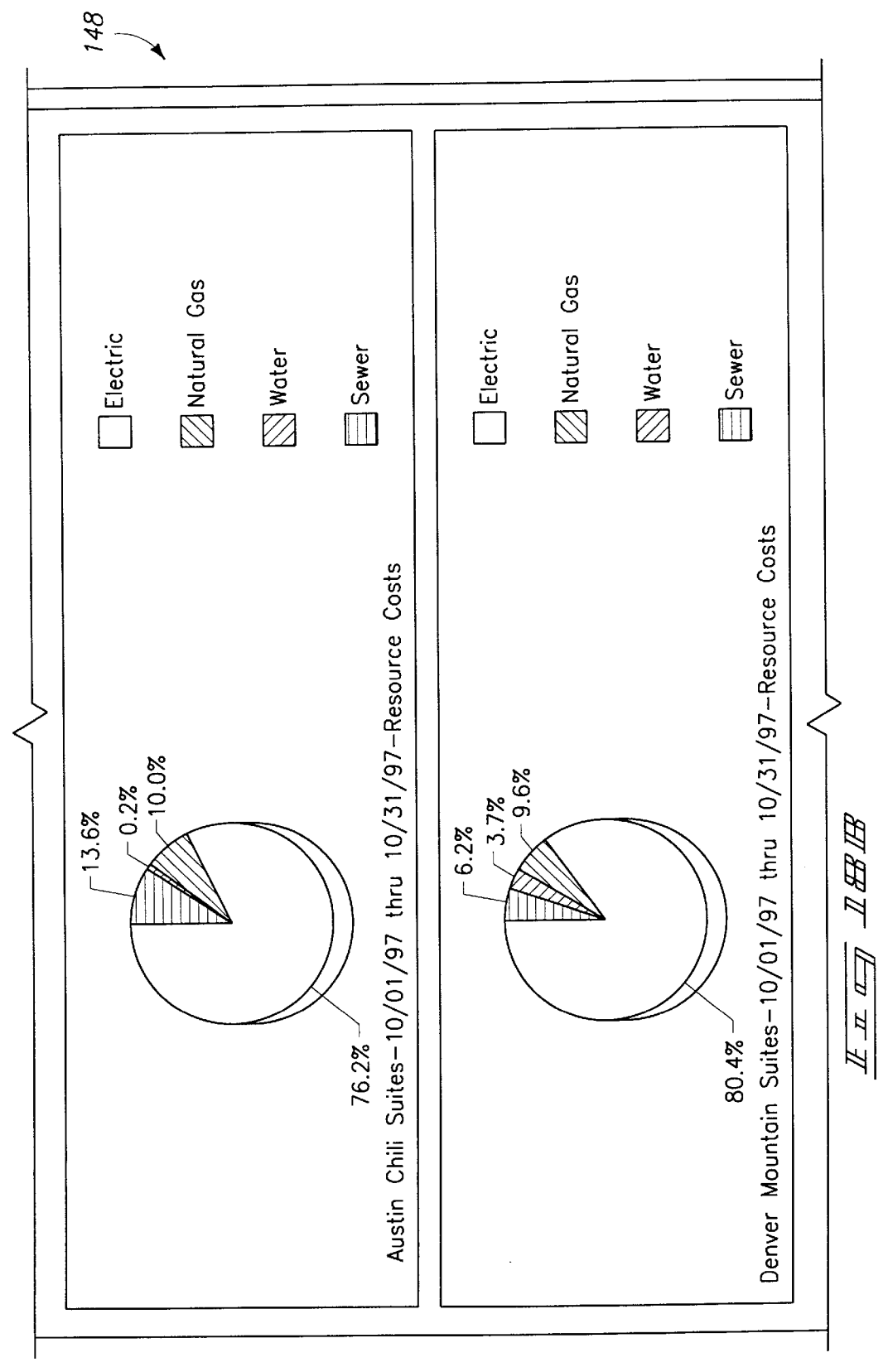
Figure 18C:

Referring to FIGS. 17 and 18A–18C, a screen 148 is provided and constitutes a report comprising a site-to-site comparison of two ACIS Suites sites, e.g. Austin Chili Suites and Denver Mountain Suites. Referring to FIG. 18A, a site-to-site, cost-based resource report is shown in line-graph form and compares the resource costs of both of the sites from a period of Jan. 1, 1997 through Oct. 31, 1997 Through utilization of this report, a facilities manager can quickly identify cost variances as between separate sites. For example, throughout most of the reporting period, Denver Mountain Suites consumed, cost-wise, more resources than did Austin Chili Suites. However, in August and through the corresponding month of October, the cost somewhat leveled out. This information is, or can be particularly useful to a facilities manager for the purpose of identifying specific reasons as to why a variation in resource cost occurred with the Denver Mountain Suites. Referring to FIG. 18B, a pair of pie charts are shown and describe, respectively, resource costs of Austin Chili Suites and Denver Mountain Suites through the relevant reporting period. The pie chart enables the costs of each of the consumed resources to be separately broken out so that each can be viewed by the customer of facilities manager. Referring to FIG. 18C, a tabular report is provided and individually describes resource costs from the prior reporting period, the current reporting period, as well as giving a percentage change therebetween. This specific information can enable the customer to identify any individual increases or decreases as between individual resource costs during a particular reporting period. It also enables a comparison to be made between separate sites. For example, Austin Chili Suites' sewer consumption costs for the current and prior reporting periods increased around 2,540%. This might be indicative of a problem which needs attention. Particularly in view of the fact that Denver Mountain Suites' sewer consumption costs decreased by around 108%. By knowing of this increase, a customer could then take remedial action to learn more about why such an increase occurred. The same would hold true for dramatic decreases in either one or more of the resources.

Resource Use Report

Figure 19:
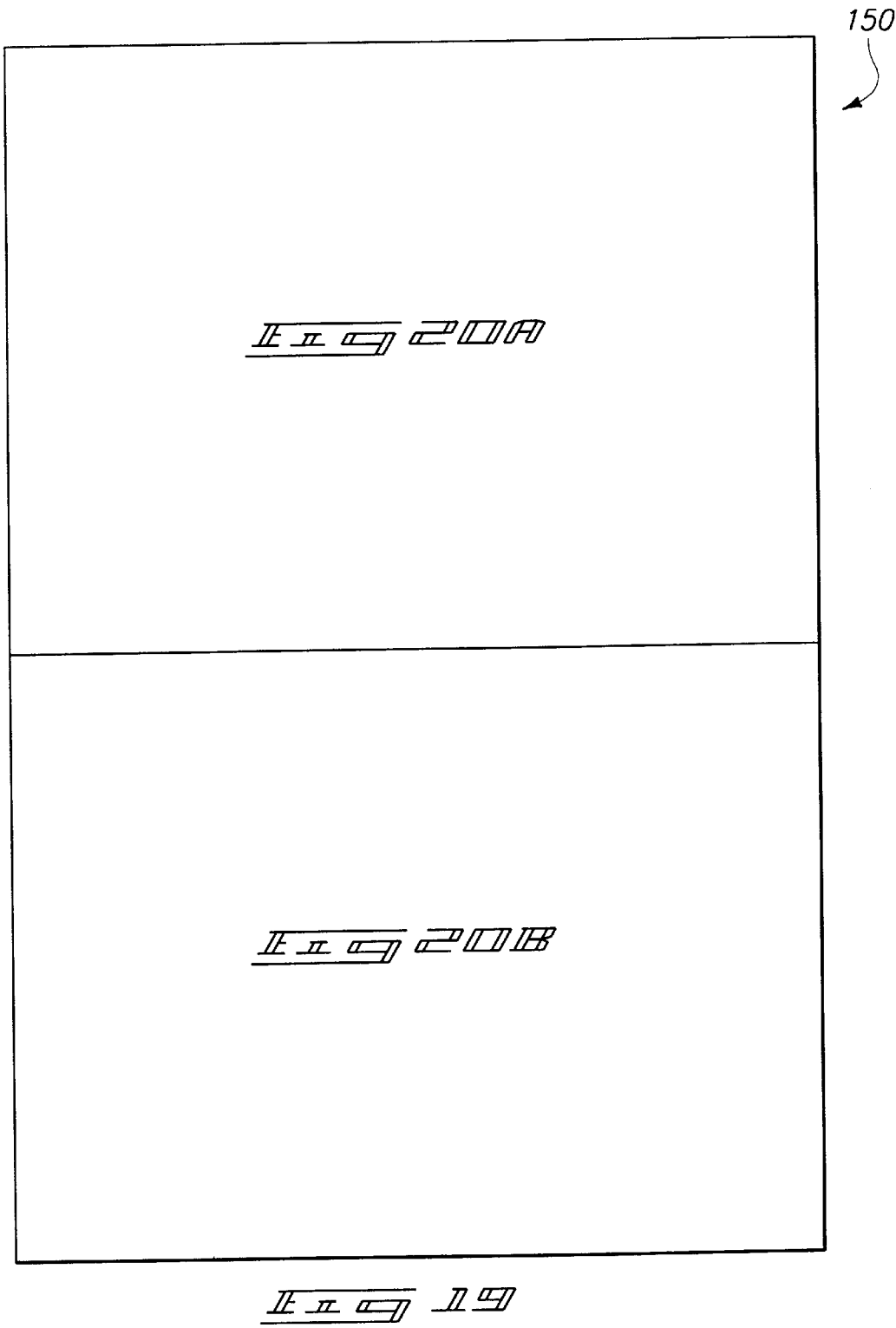
Figure 20A:
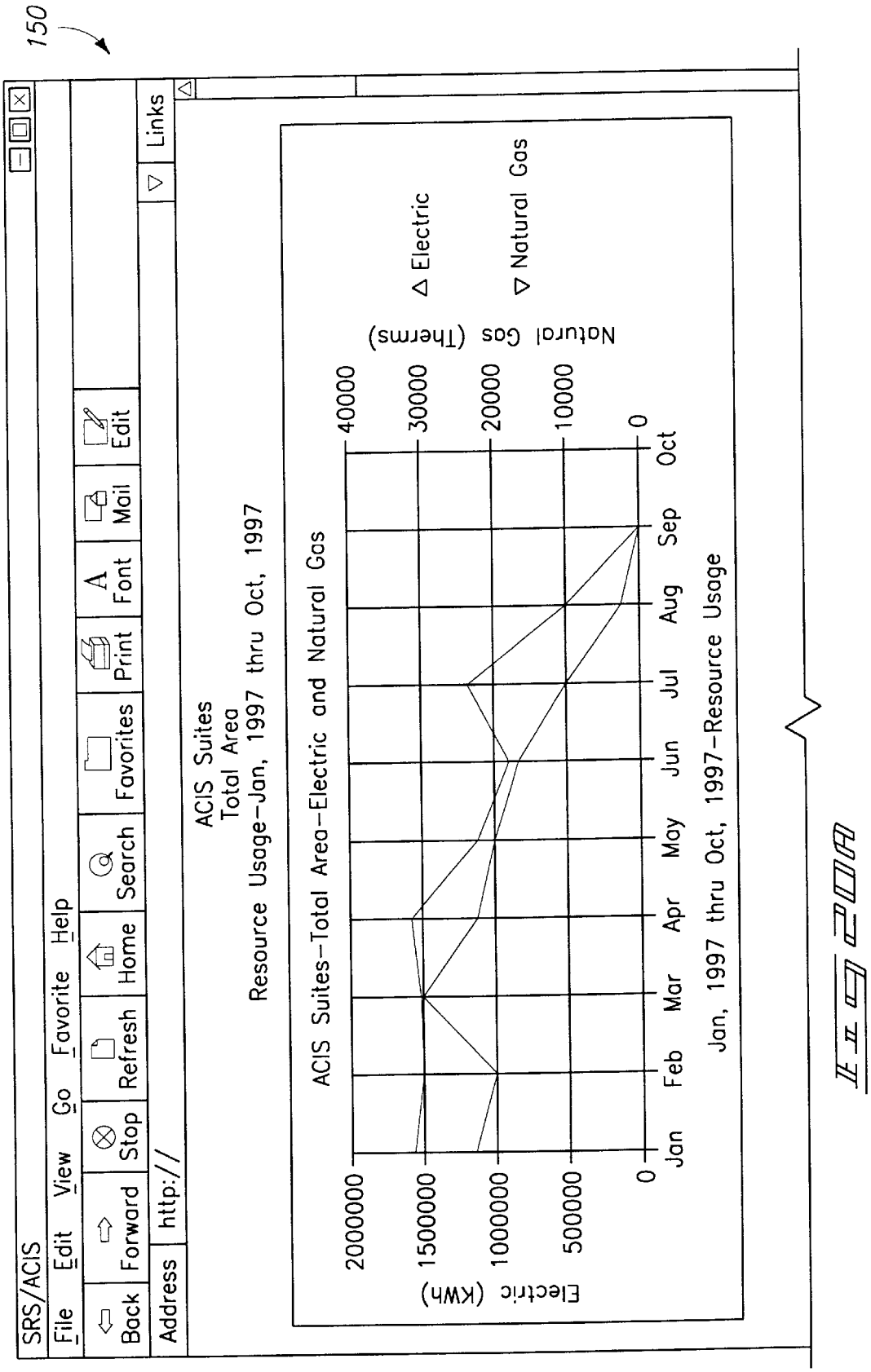

Referring to FIGS. 19 and 20A–20B, a screen 150 is provided and is divided into two segments, FIG. 20A and FIG. 20B. Screen 150 constitutes a resource usage report which is selectable by a customer and shows consumption (quantity) amounts for electricity, natural gas, water and sewer. Usage amounts are converted to a common unit of measurement. Gas and other fuels are reported in therms. Water and sewer are reported in thousands of gallons. Typical presentation formats include trending or line graphs of resource use over time, and tabular information comparing current reporting periods to prior reporting periods with an indication of any percentage change therebetween. Specifically, and with reference to FIGS. 20A and 20B, a company-wide resource usage report for electric and natural gas (FIG. 20A), and water and sewer (FIG. 20B) is shown. The date range for the report can be selected for any month or series of months. In the illustrated example, a date range from January 1997 through October 1997 has been selected. The line graph representations of resource usage can provide a customer with an understanding of its particular use of a particular resource through the relevant reporting period. By having the individual resources separated out and graphically displayed, the customer is able to identify any trends and/or variances of interest. The tabular information presented in FIG. 20B describes current and prior reporting period usages, together with any percentage changes therebetween.

Figures 22, 22A, 22B:
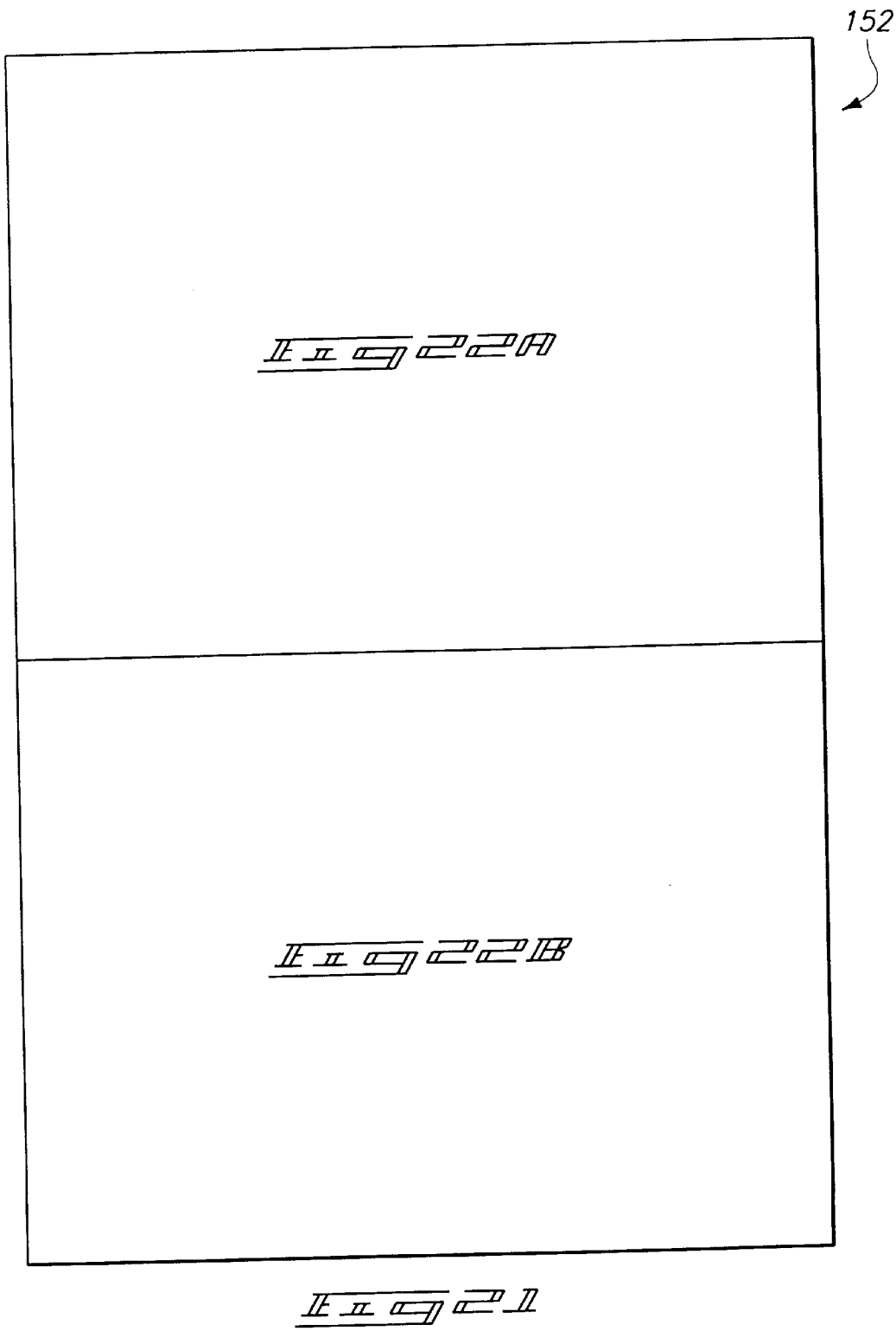
Figure 22B:
Figure 23:
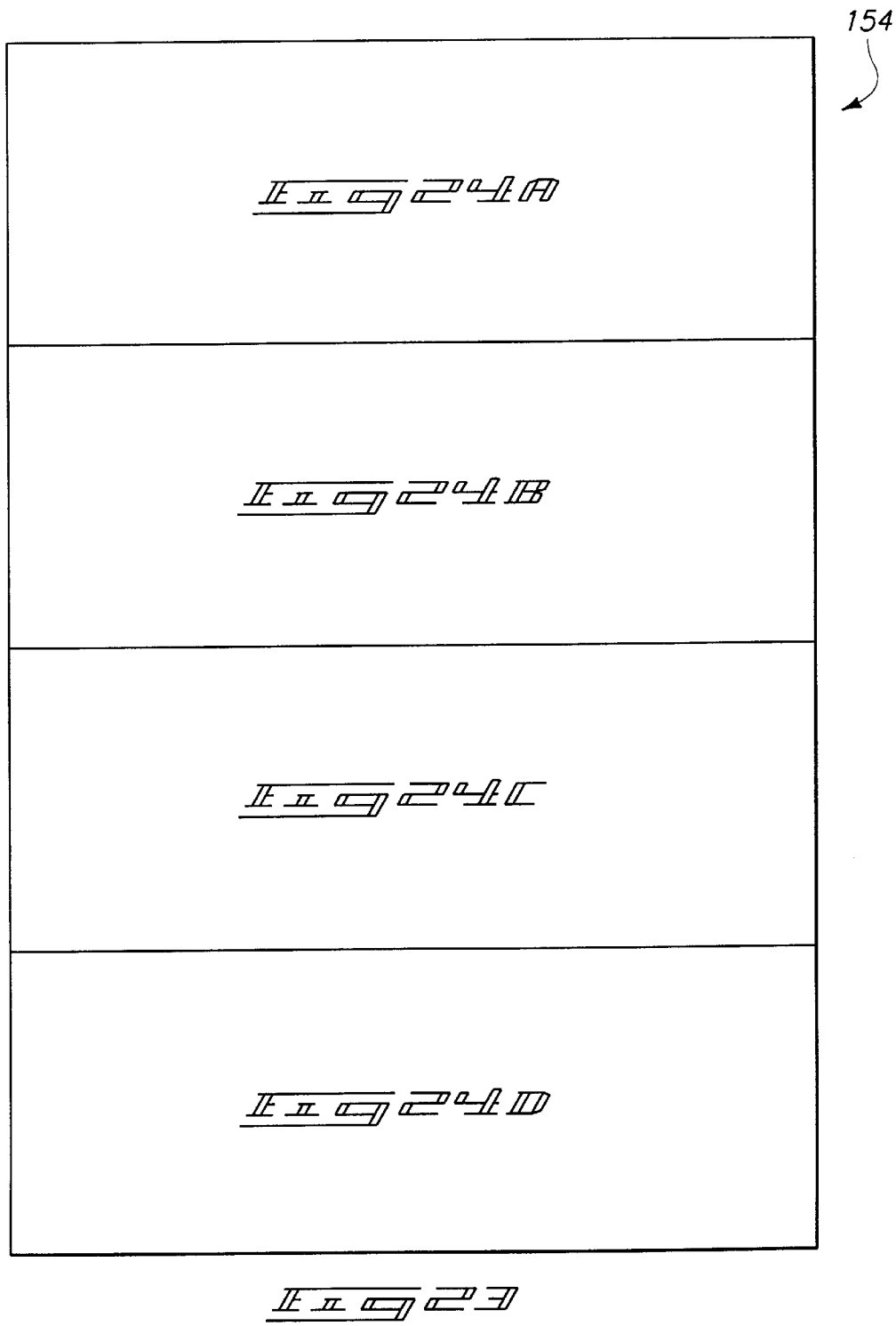

Referring to FIGS. 21 and 22A–22B, a screen 152 is provided and constitutes a company-wide, resource usage report for a single month. FIGS. 22A and 22B comprise separate portions of screen 152 and show a bar graph representation of total usage for the month (FIG. 22A), and a tabular accounting of usage (FIG. 22B).

Referring to FIGS. 23 and 24A–24D, a screen 154 is provided and is divided into four segments. Such screen constitutes a resource usage report which permits a site comparison between an area average and a particular individual site of the customer. In particular, FIG. 24A shows for the ACIS Suites in a particular area, the average electric and natural gas usage. FIG. 24B shows the ACIS Suites area average water and sewer usage (uppermost graph), and, for the Sacramento Vineyard Suites, the electric and gas usage (lowermost graph). FIG. 24C shows, for the Sacramento Vineyard Suites, specific water and sewer usage; and FIG. 24D describes in tabular form, current and prior reporting period usages as between the area average and Sacramento Suites. Additionally, relevant variances are given as well. The relevant reporting period is from January 1997 to October 1997. By comparing each of the area averages for the resources with the particular site (Sacramento Vineyard Suites), the customer can ascertain whether usage at a particular site is above or below the area average. Usages above average would, in some instances, indicate that there may be a problem. Usages below the area average may, in some instances, indicate the effectiveness with which utility resource usage takes place.

Energy Cost Index Report

Figures 25, 26A, 26B:
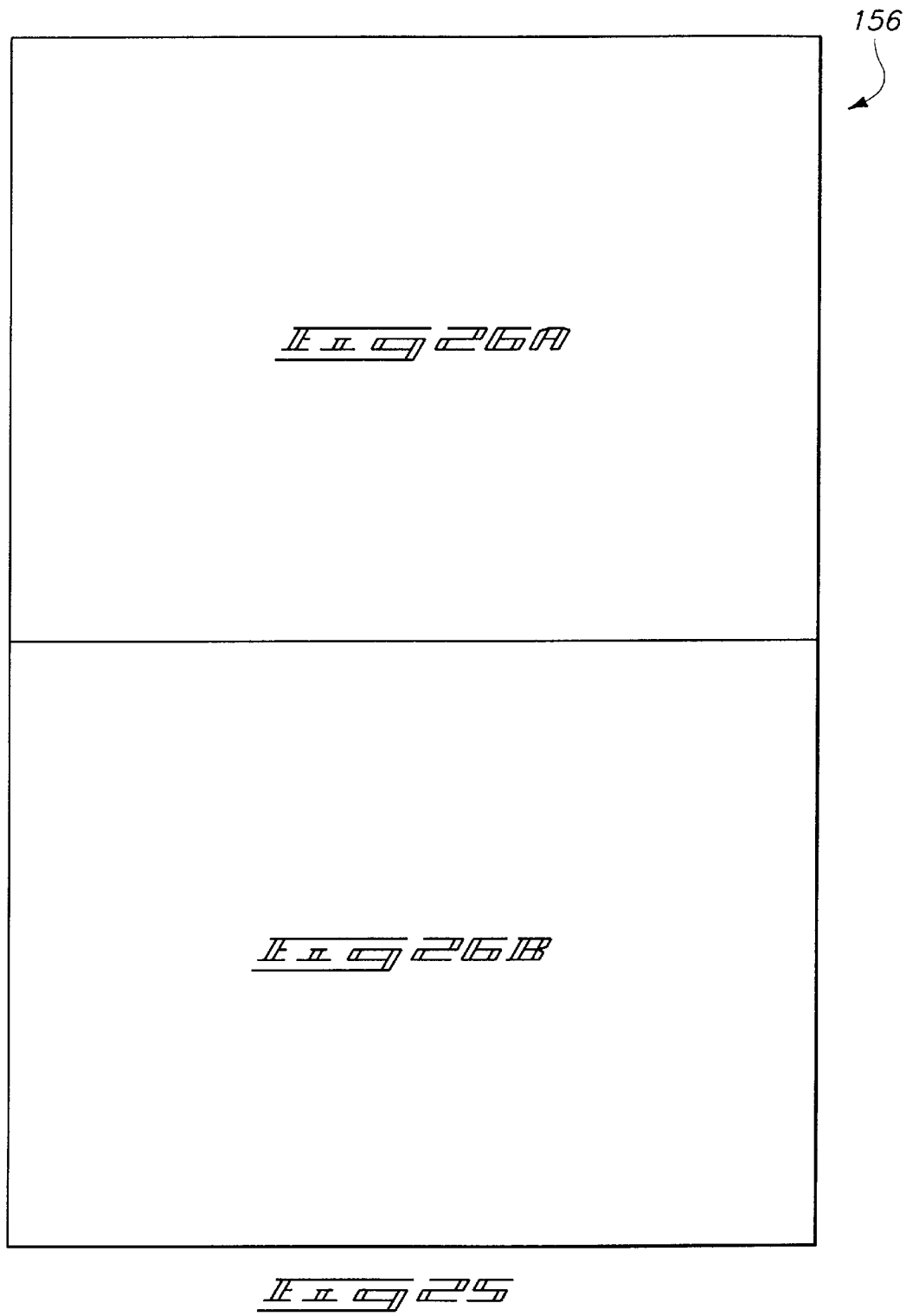
FIGS. 25, 26A–26B are views of one report screen in connection with one aspect of the present invention.

Referring to FIGS. 25 and 26A–26B, a screen 156 is provided and constitutes an Energy Cost Index (ECI) Report. The ECI Report comprises the total energy cost of all fuels used during a 12-month period divided by the total gross conditioned floor area in square feet. The units of ECI are dollars per square foot per year. Typical presentation formats of such computer-viewable data include ECI rankings for total company listing for each location, top 10/bottom 10 location ranking, company average and site-to-site comparisons Specifically, reference to FIG. 26A shows a plurality of sites with each site's ECI shown in bar graph fashion for current and prior reporting periods. In the illustrated example, the reporting period is from September 1996 through August 1997. A customer can, through review of the particular graphical representation in FIG. 26A, ascertain whether desirable or undesirable increases and/or decreases have taken place in each site's ECI during the relevant reporting. Referring to FIG. 26B, such information is presented in tabular form for the current is and prior periods, along with any relevant percentage change therebetween.

Figures 27, 28A, 28B:
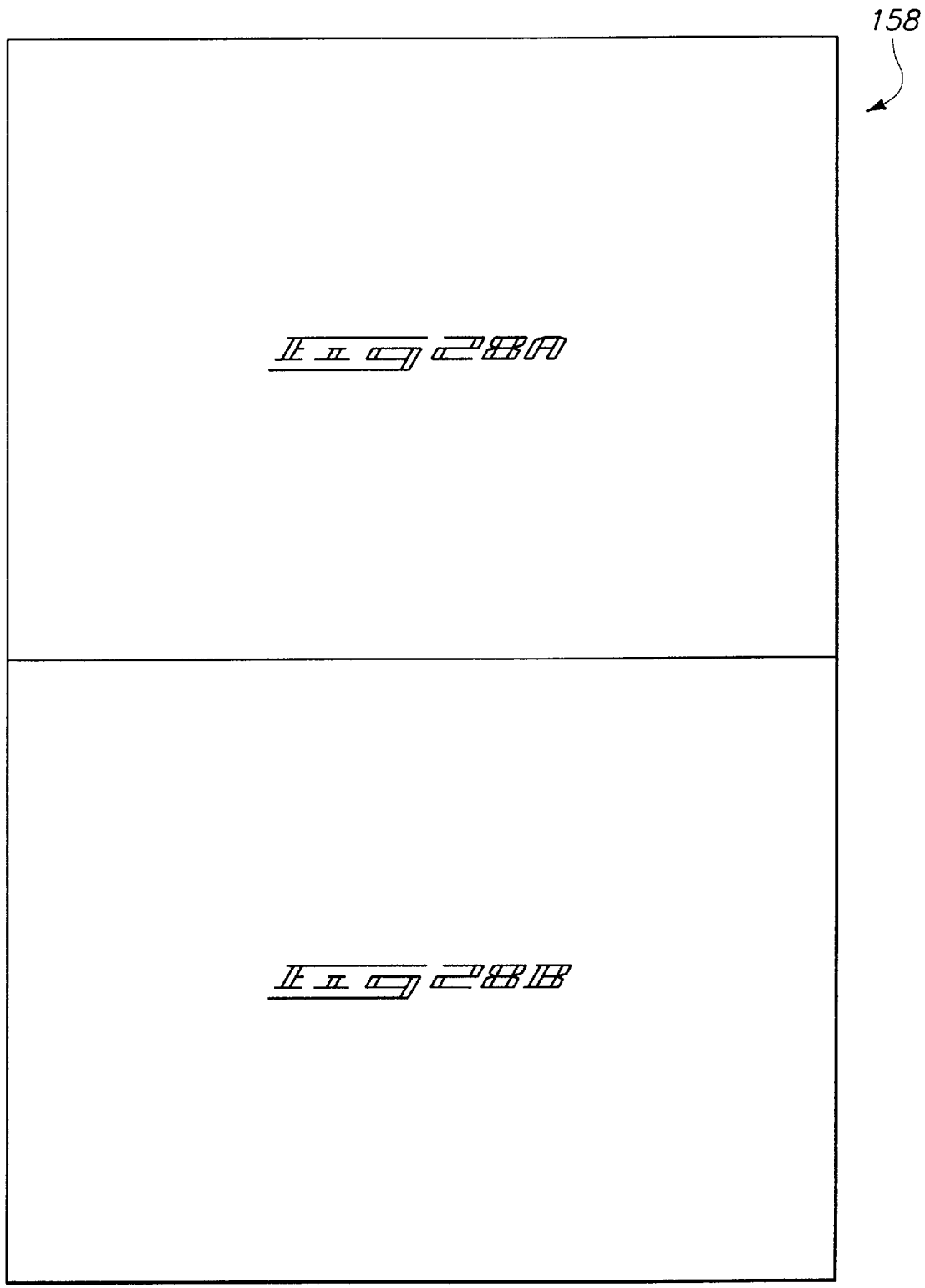
FIGS. 27, 28A–28B are views of one report screen in connection with one aspect of the present invention.
Figure 29:
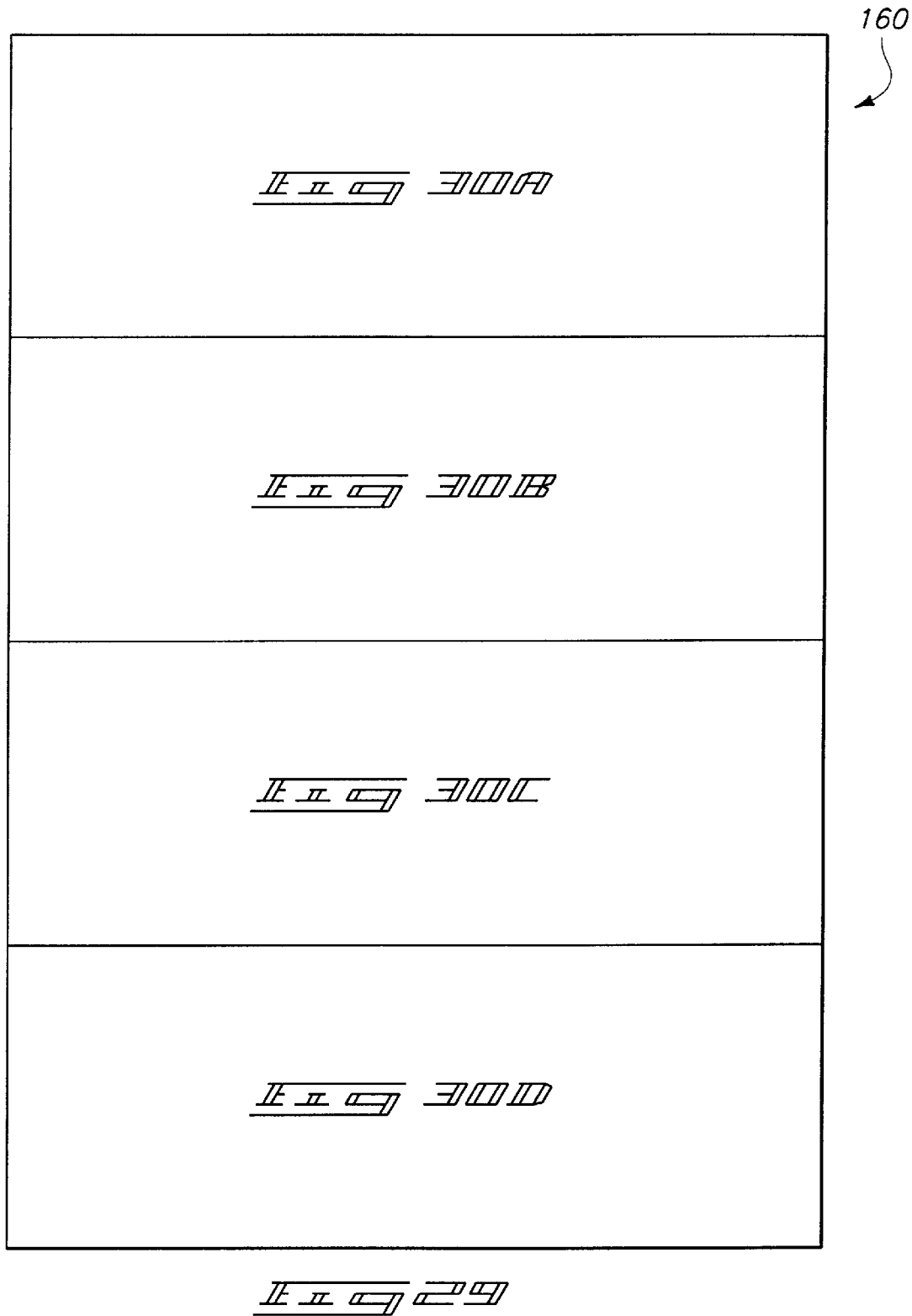
FIGS. 29, 30A–30D are views of one report screen in connection with one aspect of the present invention.

Referring to FIGS. 27 and 28A–28B, a screen 158 is provided and constitutes an ECI report for an individual site, e.g. Tucson Desert Suites, for the reporting period September 1996 through August 1997. Referring to FIG. 28A, a bar graph representation of this particular site's energy cost per square foot is shown on a month-by-month basis for the prior and current reporting periods. Referring to FIG. 28B, a tabular detailing of the energy costs per square foot of this particular site is given for the prior and current reporting periods, as well as a percentage change therebetween.

Figure 30E:
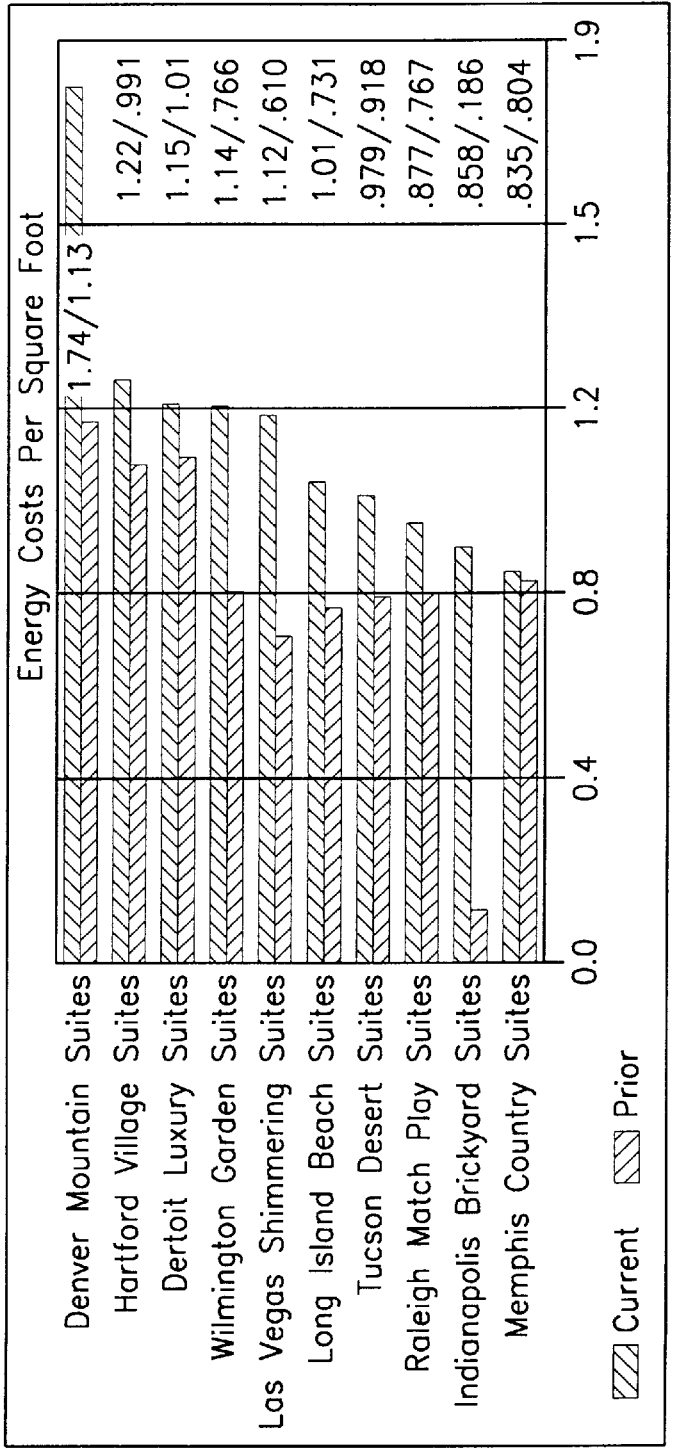

Referring to FIGS. 29 and 30A–30D, a screen 160 is provided and constitutes a ECI report for the top 10 and bottom 10 ACIS Suites sites. For example, and with reference to FIG. 30A, the top 10 sites with the lowest energy cost per square foot are shown, Similarly, FIG. 30B shows the bottom 10 sites with the highest energy cost per square foot. Through utilization of this report, the customer can identify sites having desirable or undesirable energy costs for the purpose of ascertaining, among other things, why such costs are low or high respectively. Such facilitates decision making on the part of the facilities manager. Referring to FIGS. 30C and 30D, the top 10 and bottom 10 sites respectively, are shown in tabular graphical form. The illustrated chart shows the square footage for each facility or site along with current and prior ECI indices. In addition, a percentage change is provided to enable the customer to ascertain desirable or undesirable variances in the ECI.

Energy Use Index Report

Figures 31, 32A, 32B:
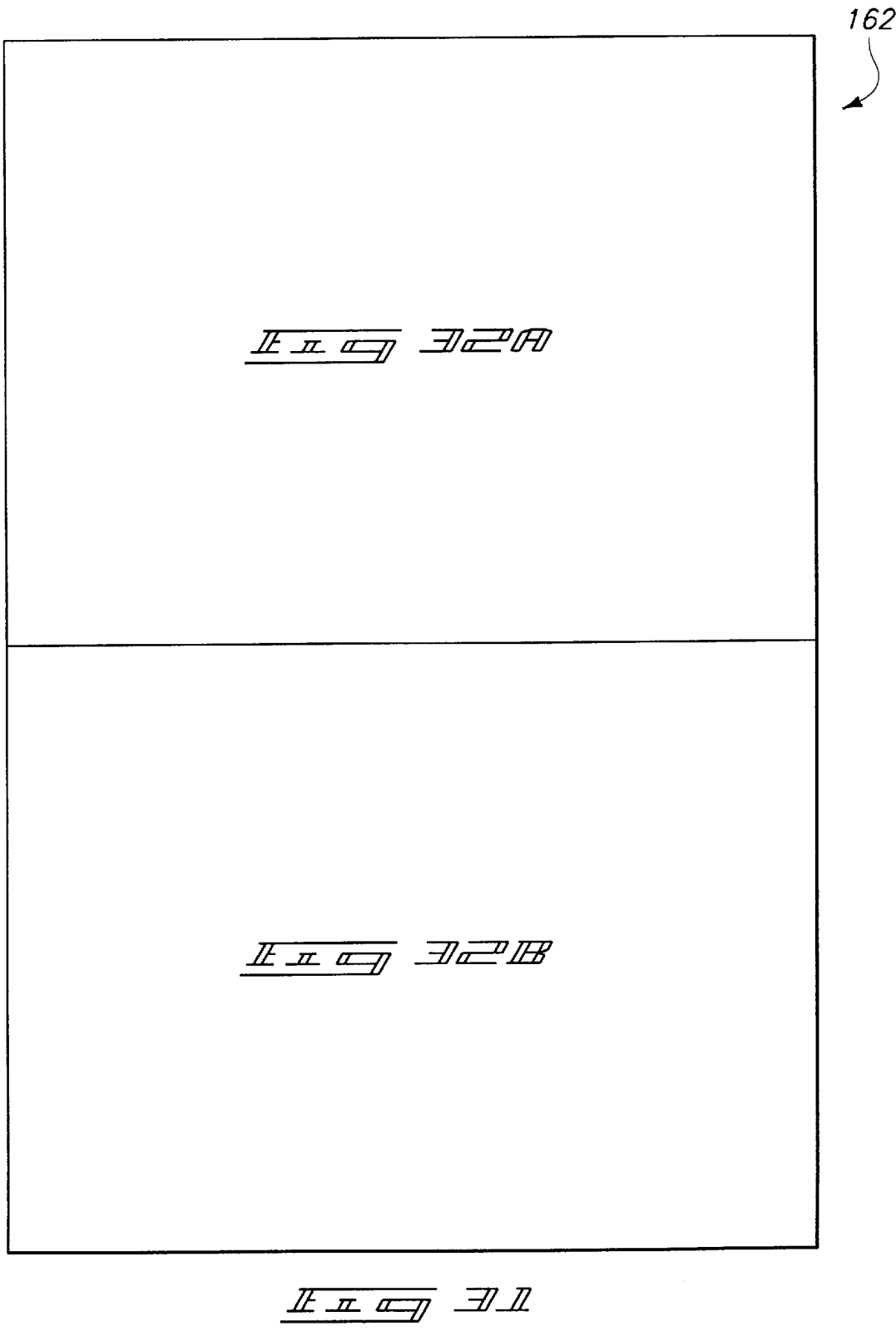
FIGS. 31, 32A–32B are views of one report screen in connection with one aspect of the present invention.

Referring to FIGS. 31 and 32A–32B, a screen 162 is provided and constitutes an Energy Use Index (EUI) Report which can be selected by the customer. The EUI is a convenient measure of energy use. In particular, consumption of each fuel type is converted into BTU's, a common unit of energy. The total energy use of a building, in BTU's, is divided by the total gross conditioned floor area, yielding the EUI in kBTU's per square foot per year (1,000 BTU/ sf/year), Because the EUI presents energy use per square foot of building area, it can be used to compare energy use in buildings of various sizes. Although the EUI is a useful tool, it should be used with an understanding of how climate, activity, and fuel types can influence the EUI value. Typical presentation formats include EUI rankings for the total company listing each location, top 10/bottom 10 location ranking, company average and site-to-site comparisons. In particular, reference to FIG. 32A shows an EUI report for the total company in bar graph form. Both current and prior reporting periods are shown. FIG. 32B shows a tabular report in which the square footage, current and prior EUI values, and percentage change are shown for each site.

Figures 33, 34A, 34B:
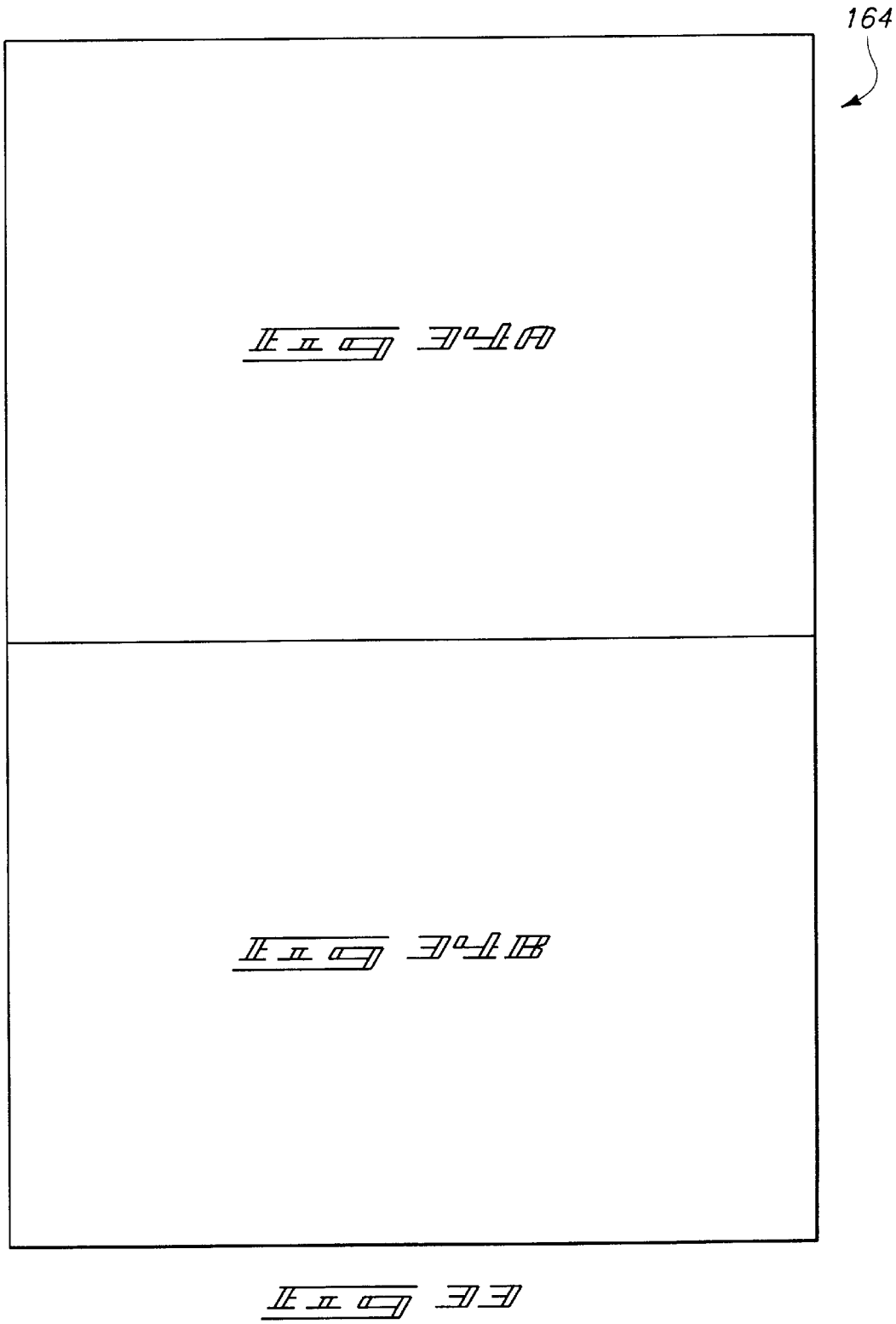
FIGS. 33, 34A–34B are views of one report screen in connection with one aspect of the present invention.
Figure 61:
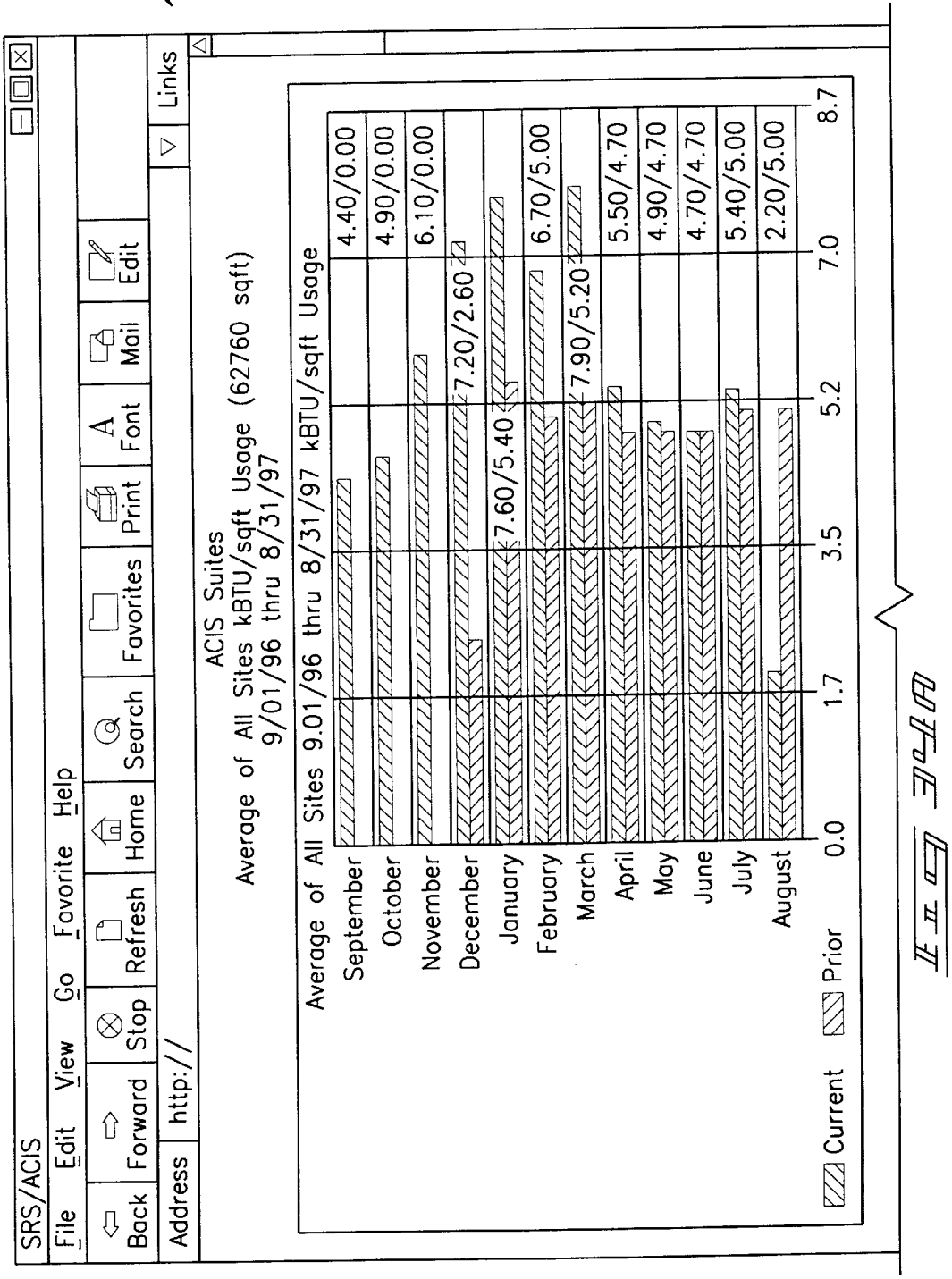
Figure 35:
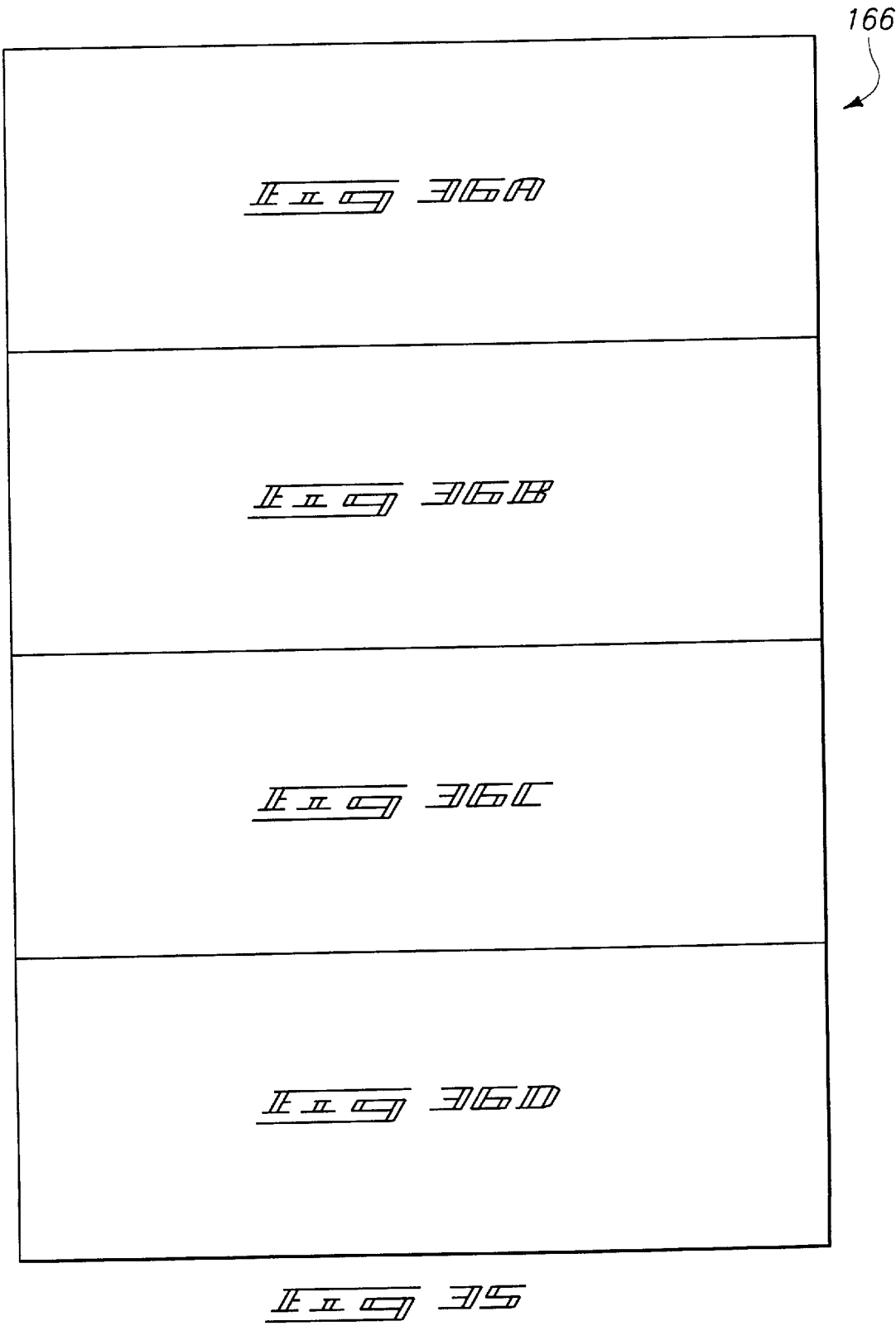

Referring to FIGS. 33 and 34A–34B, a screen 164 is provided and constitutes an EUI report comprising an average of all sites for each month of the reporting period. In particular, and with reference to FIG. 34A, a bar graph presentation of the average of all sites is indicated for each reporting month. FIG. 34B shows in tabular form, EUI values for the current and prior reporting periods along with percentage changes therebetween.

Figure 36A:
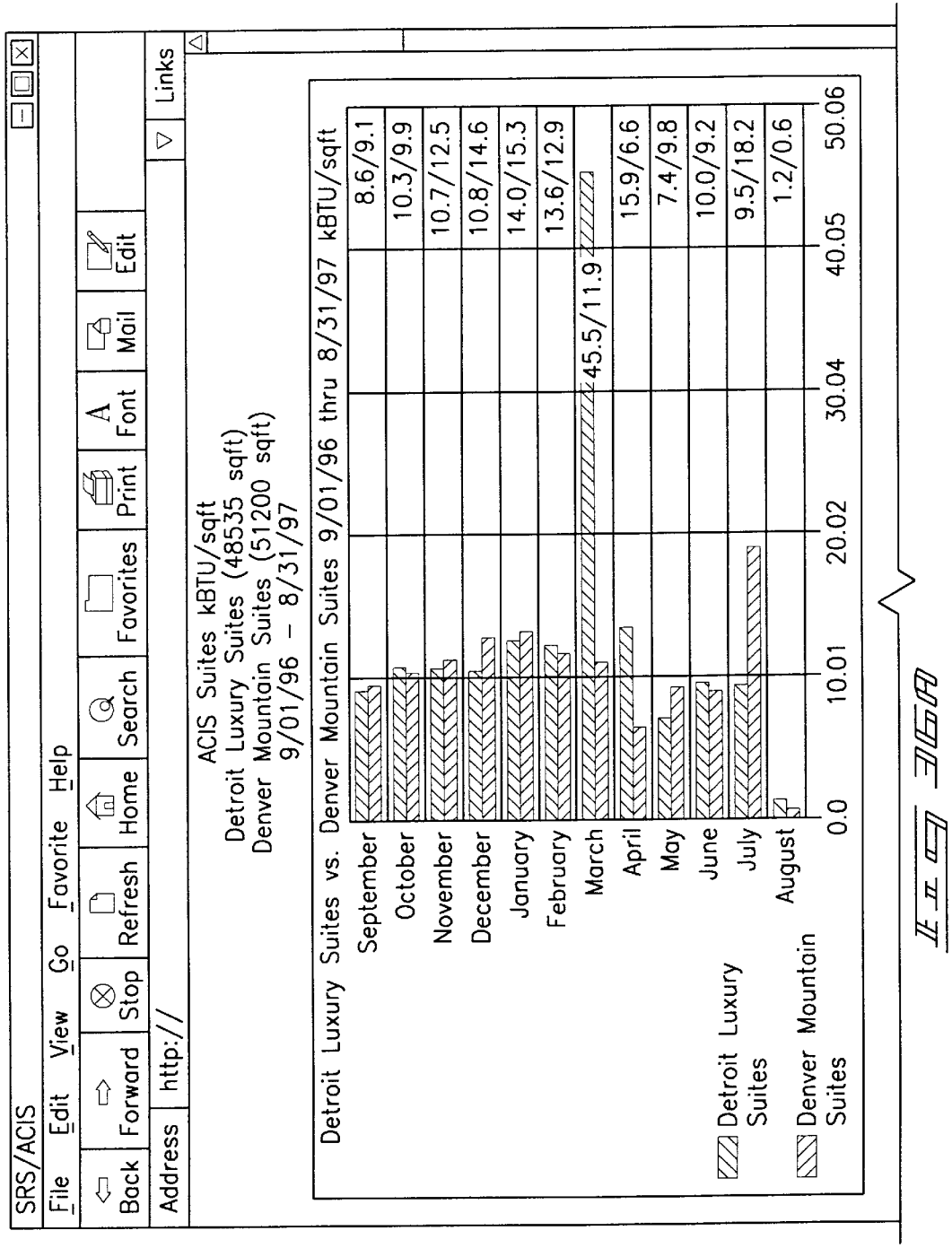
Figure 36B:
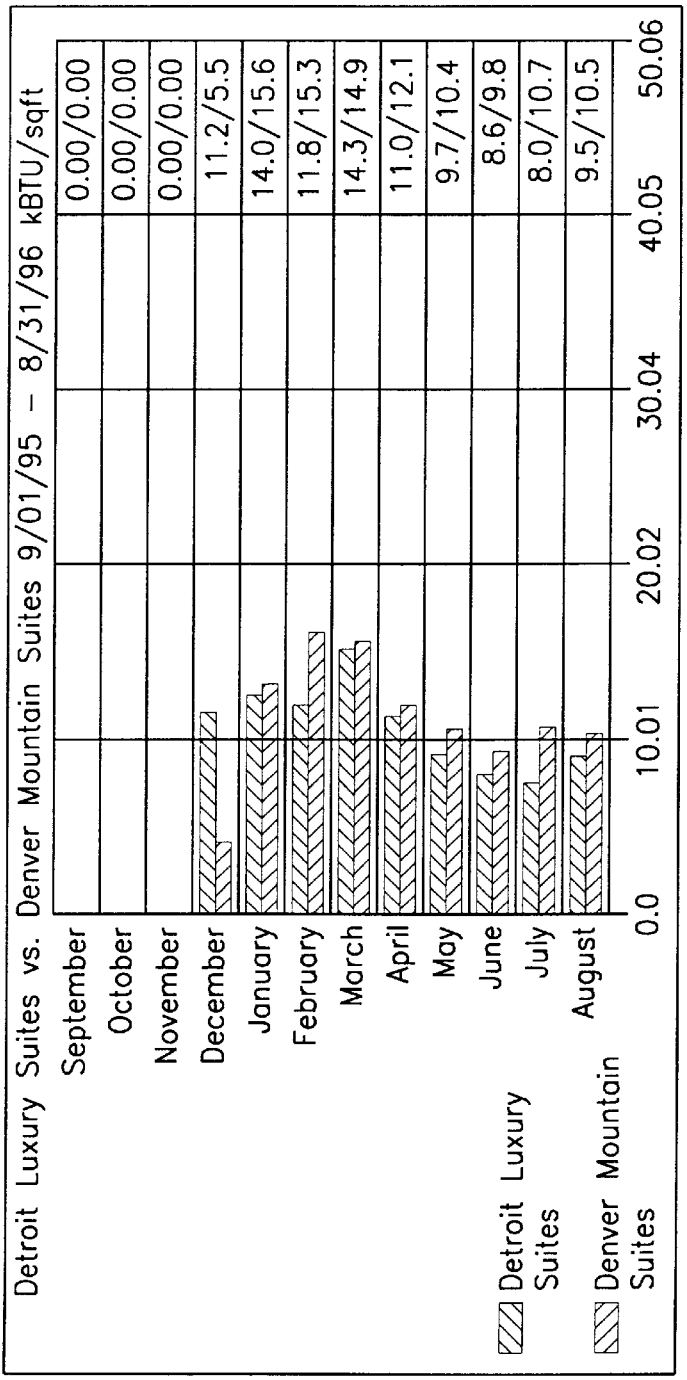

Referring to FIGS. 35 and 36A–36D, a screen 166 is presented and constitutes an EUI report which enables a site-to-site comparison to be made between two particular sites. FIG. 36A shows a site-to-site comparison between two sites, the Detroit Luxury Suites and the Denver Mountain Suites. FIG. 36B show a month-to-month, bar-graph type comparison of each site's EUI value. FIGS. 36C–36D respectively describe, in tabular form, the EUI values for each site, i.e., the Detroit Luxury Suites (FIG. 36C) and the Denver Mountain Suites (FIG. 36D). In addition, this report enables the percentage change between reporting periods to be ascertained between the current and prior reporting periods.

Provision can also be made for a report which will present a rolling EUI average for a prior time period, e.g. the prior 12-month period Reports of this type can identify gradual changes in the EUI by establishing a 12-month EUI ending on a given month, and then comparing that with the 12-month EUI ending on the prior month, and previous prior months. By testing against a customer-defined tolerance parameter, a customer can detect a trending change in resource usage which can be used to identify operational issues in a facility or site which impact resource cost.

EUI/ECI Analysis

Figures 37, 38A, 38B:
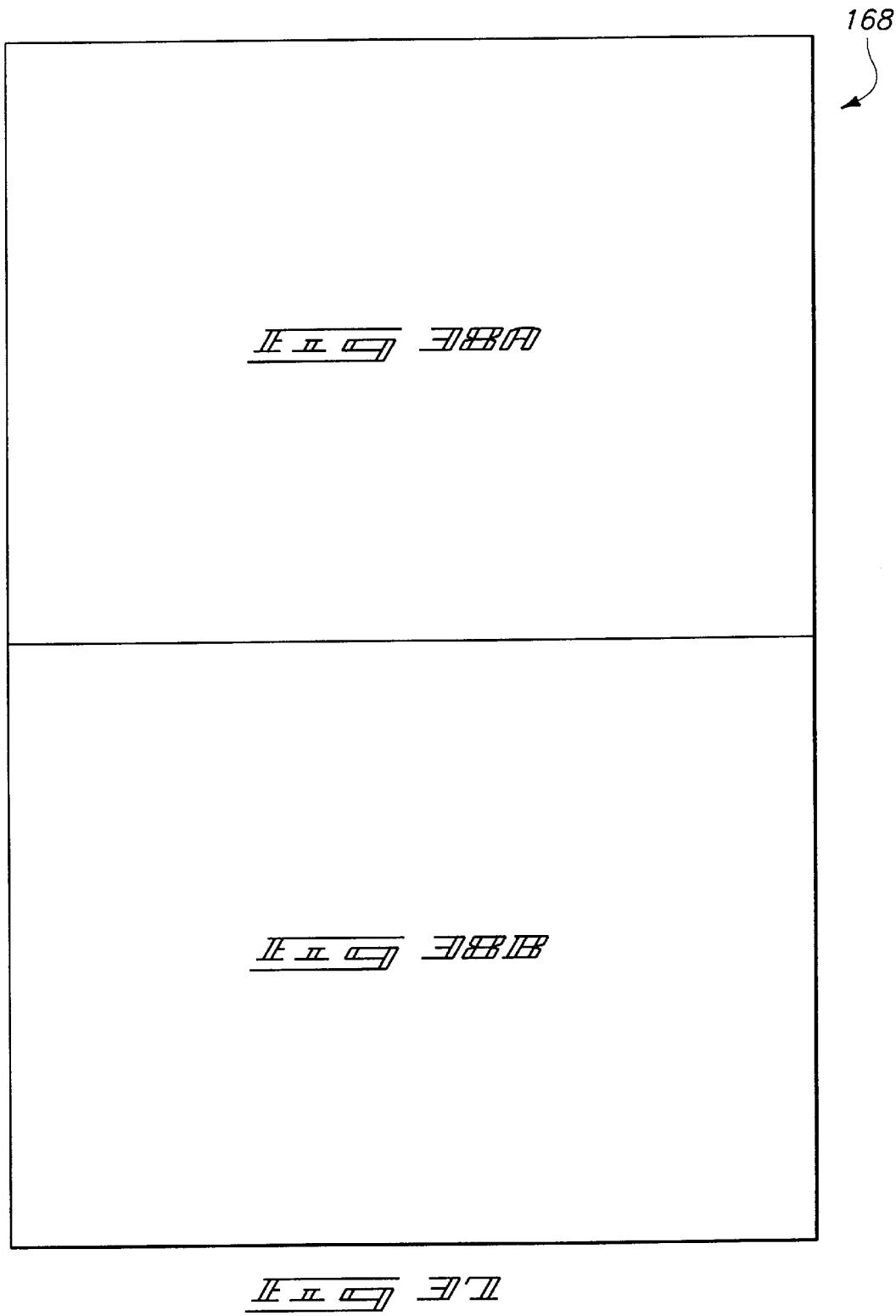
FIGS. 37, 38A–38B are views of one report screen in connection with one aspect of the present invention.
Figure 6H:
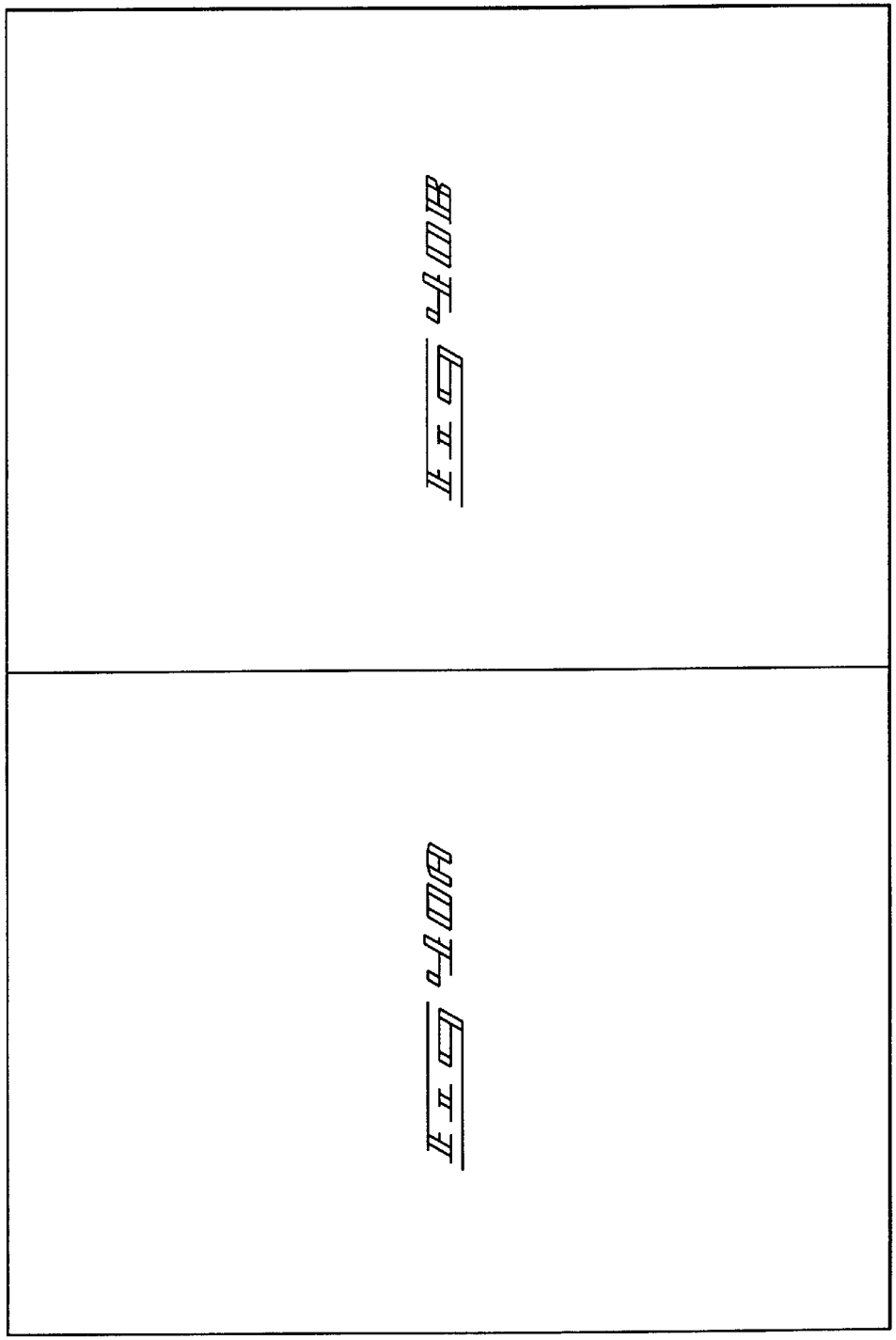

Referring to FIG. 37 and 38A–38B, a screen 168 is provided and constitutes a graphical representation of energy and cost performance in the form of a scatter plot graph. Such allows both the energy use index (EUI) and energy cost index (ECI) to be portrayed in a single graph. Importantly, such conveys both the energy use and cost performance characteristics of facilities or sites since the various fuel types vary in terms of conversion efficiency and cost. Although energy efficiency is an important issue for energy managers, it is cost efficiency that is, in most instances, the real issue. This scatter plot portrays both the EUI and the ECI and allows an energy manager to review the performance of all sites. Best and worst performers are easily identified through a matrix analysis. For sites with a high ECI and low EUI, focus on commodity management/rate schedule analysis (utility negotiations) can be had. For sites with a low ECI, and a high EUI, an investigation and implementation strategy for energy efficiency measures (demand side management) can be had. A so-called drill down capability provides detailed information about the particular site. FIG. 38A shows a scatter graph wherein ECI and EUI are presented in graphical form. Such graphical representation constitutes a matrix by is which the customer and/or facility manager can identify relevant sites which are, or fall within pertinent parts of the graph, e.g., high ECI, low EUI, and/or low ECI, high EUI. FIG. 38B shows in tabular form, information presented in FIG. 38A for each site.

EUI Frequency Overview Report

Figure 40A:
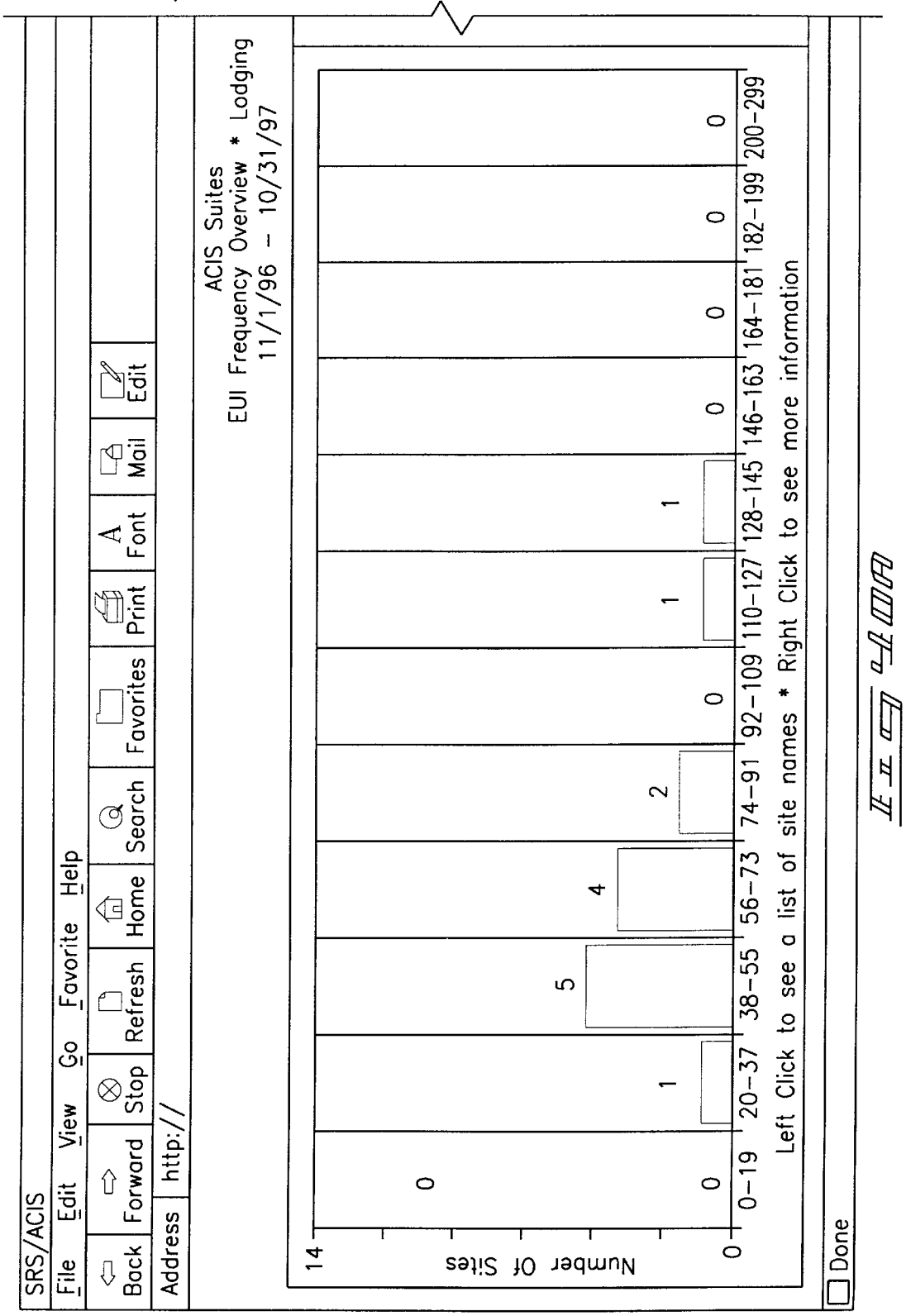

Referring to FIGS. 39 and 40A–40B, a screen 170 is provided and constitutes an EUI Frequency overview report. The EUI Frequency overview is a report which uses a frequency distribution graph of site energy use indices (EUIs). Through this report, a site can be designated to be included in the report by selecting geographic area and/or climate zone and activity type from the report option. The EUI frequency overview graph assigns sites to the appropriate EUI ranges and shows how many sites fall within a given range. Provided is a so-called drill down option to compare individual site EUIs to similar building types in a similar climate zone based on the 1992 United States Department of Energy Commercial Building database used to develop the DOE publication DOE/EIA-0318(92). Only sites that have been assigned specific climate zones from within the site setup will show it up in their respective regions.

For example, reference to FIG. 40A shows that an EUI frequency overview report for lodging facilities is set forth. Sites which fall in between particular ranges can be specifically viewed by clicking on the relevant graph portion. In particular, FIG. 40B shows that five sites fall within EUI ranges of between 38–55. These sites include the Austin Chili Suites, Cincinnati Stadium Suites, Memphis Country Suites, Raleigh Match Place Suites, and Sacramento Vineyard Suites. The above comprises but one predefined grouping variable which can be utilized to group sites. Other grouping variables can be used as well.

Figures 41, 42A, 42B:
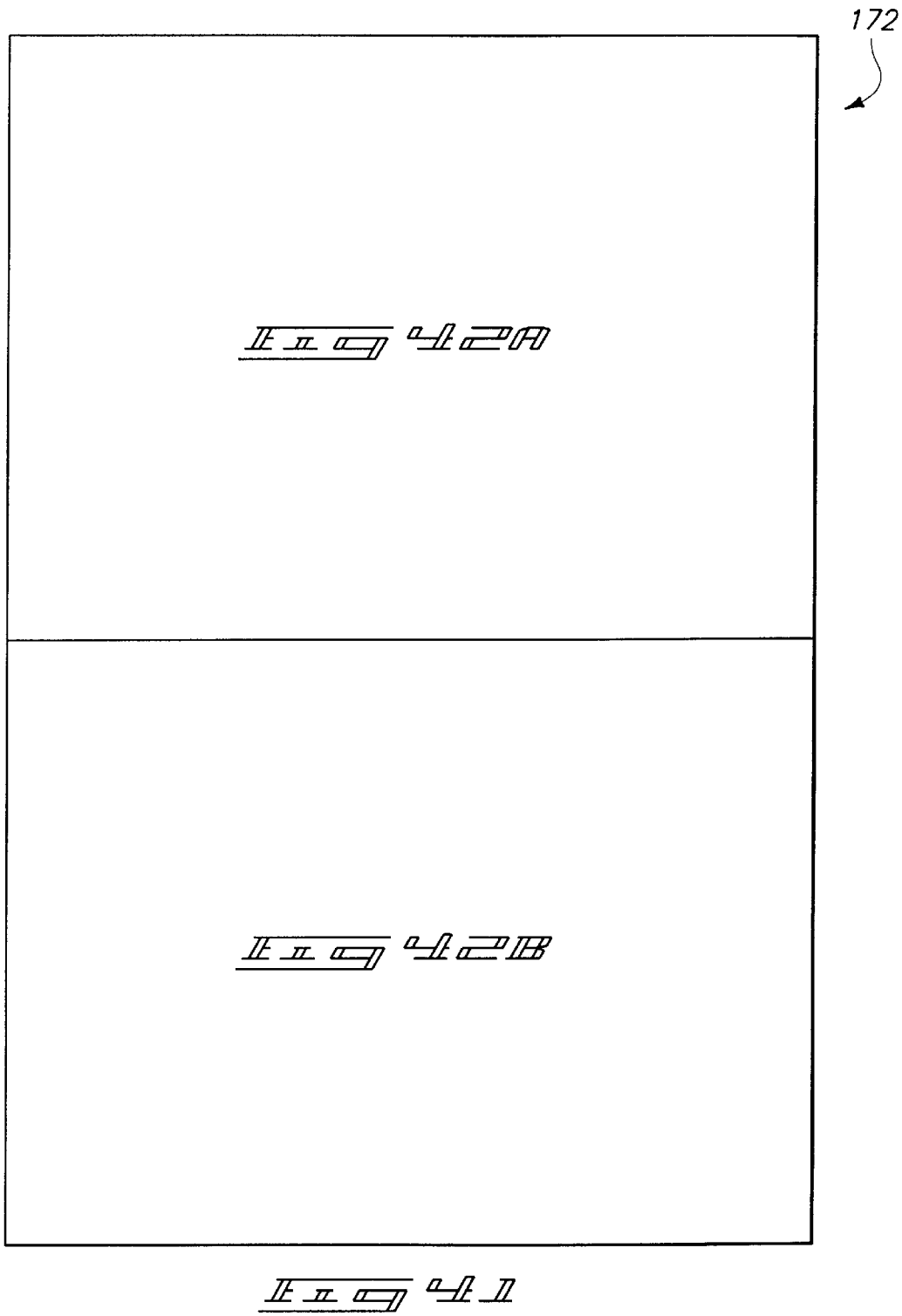
FIGS. 41, 42A–42B are views of one report screen in connection with one aspect of the present invention.

Referring to FIGS. 41 and 42A–42B, a screen 172 is provided and constitutes an energy performance site detail report. Prior to FIGS. 42A and 42B, the Energy Performance Site Detail report ranks locations by their energy index number according to their assigned climate zones. There are a total of five different climate zones in the United States, as mentioned above. Customer sites are preferably assigned a climate zone as part of the database set-up process. FIGS. 42A and 42B show five climate zones, e.g., zone 1–5, and within each zone a national average and a zone company average. Sites within a zone can be benchmarked against a national zone average for a particular building type. Individual sites within a zone can also be compared against the zone company average. In addition, the customer can view the ranking for each location within a zone. The report is broken into four quadrants which show, typically, the low-to-high index number for a particular zone, for a particular building activity. In the illustrated example, the EUI numbers are for the lodging industry. EUI numbers for other industries such as the food service industry would have different EUI rankings. The ranking of energy index numbers by climate zones allows customers to identify their high use facilities adjusting for weather conditions.

24-Month Trend Report

Figure 44B:
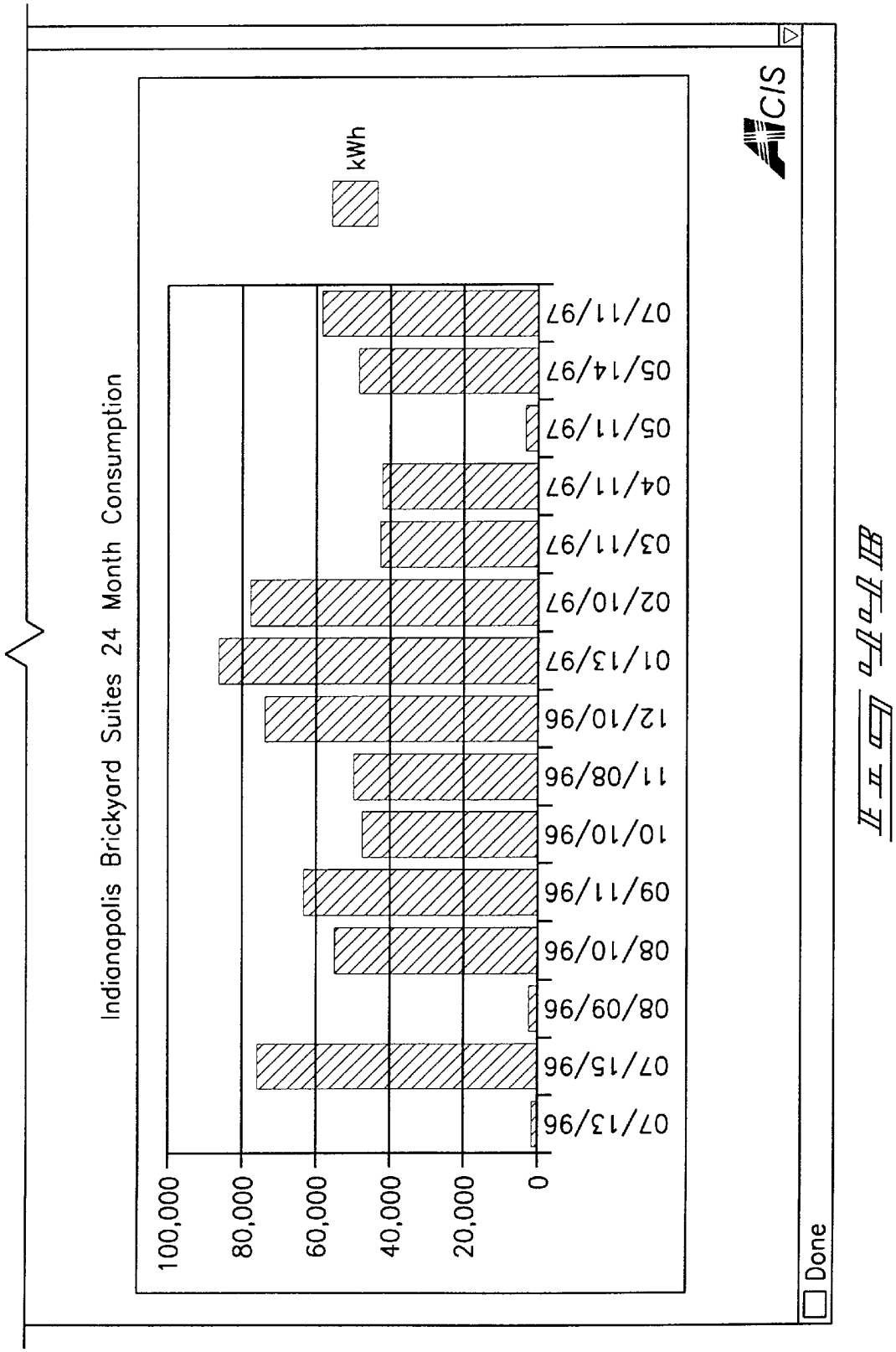

Referring to FIGS. 43 and 44A–44B, a screen 174 is provided and constitutes a report which allows a 24-month comparison of resource costs and/or resource consumption for a specific site. In the illustrated example, less than a 24-month timeline is shown because of spacing constraints. The 24-month comparison (or illustrated portion thereof) is demonstrated in the context of electric cost and consumption. Reference to FIG. 44A shows a comparison of the electric cost for the Indianapolis Brickyard Suites site. Such report is useful for the purpose of identifying particular months in which resource costs are high. FIG. 44B shows a comparison of electric consumption of the Indianapolis Brickyard Suite in kilowatt hours, Other timeline trend reports can be used.

Production Unit Report

Figures 45, 46A, 46B:
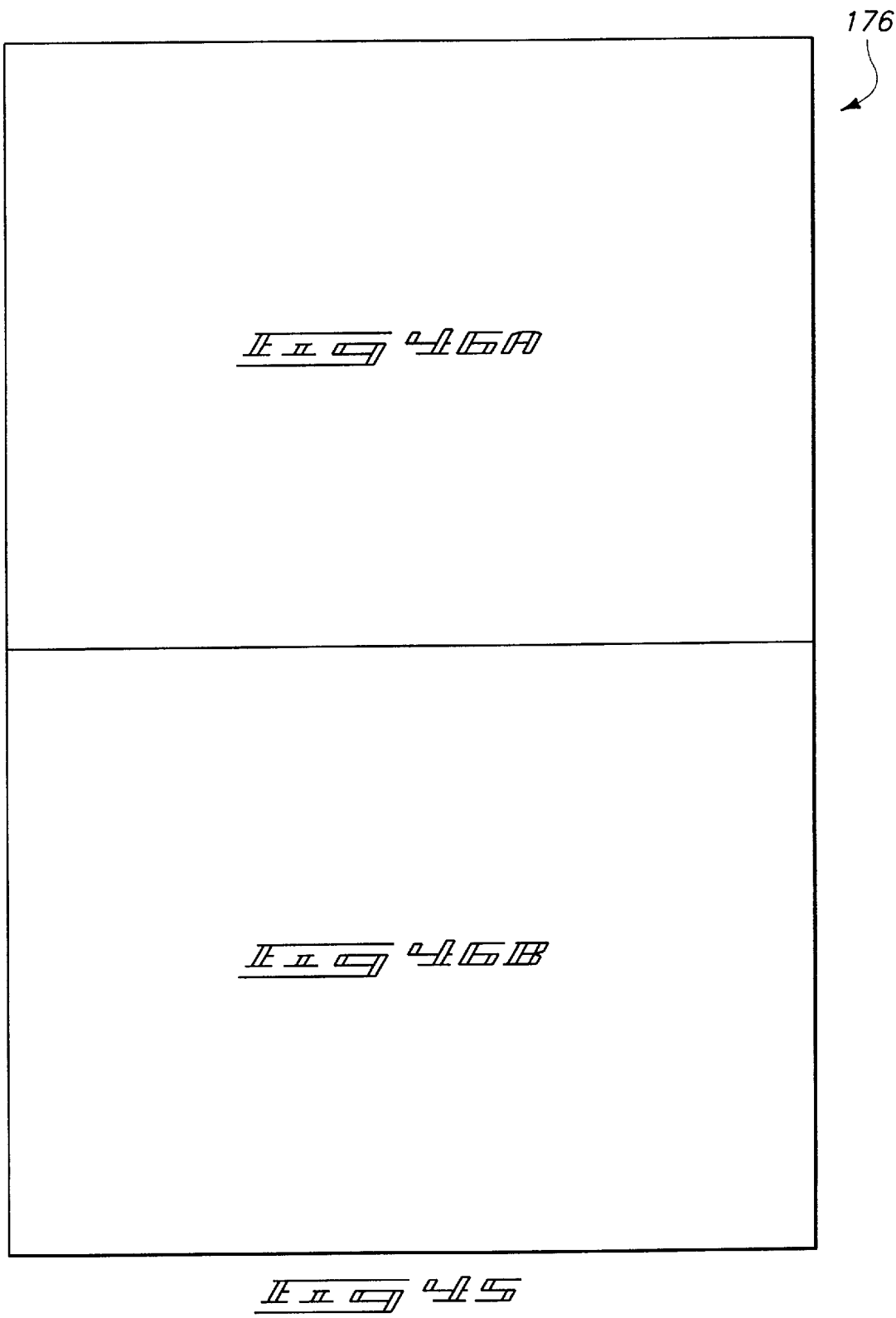
FIGS. 45, 46A–46B are views of one report screen in connection with one aspect of the present invention.

Referring to FIGS. 45 and 46A–46B, a screen 176 is provided and constitutes a Production Unit Report. The Production Unit Report allows energy managers to track all resource costs against fixed production units. This report ranks year-to-date fixed daily production unit costs for each facility or site. The report can be, and preferably is color coded to show sites with 10% reduction or better, 5–9% reduction, 1–4% reduction, and zero or less reduction. Production unit tracking is desirable when there is a direct correlation between production and resource costs. Only sites that have been assigned fixed production units from within the above-described site setup feature will show up on the production report. Specifically, and with reference to FIG. 46A, each site is shown with a ranking of year-to-date production unit costs. Prior year-to-date production unit costs as well as the variance between current and prior year-to-date production unit costs are shown. FIG. 46B shows a legend which describes the percentage of reduction of production unit costs.

Load Profiling or Real Time Meter Reading

Referring to FIG. 47, a block diagram illustrating a utility-resource-consumption-based tracking system is set forth generally at 178. In accordance with a preferred implementation, a plurality of customers 180, 182 and 184 have a plurality of respective sites 180a, 180b, 180N, 182a, 182b, 182N, and 184a, 184b, 184N. Each site comprises a facility site which is a consumer of a utility resource for which it is desired to track and account. Each site will typically have a metering device which measures the amount or quantity of a particular resource being consumed by that site. Accordingly, each metering device measures utility resource usage information for its particular site. Exemplary quantities include kilowatts, kilovars or therms to name a few. Typical metering devices commonly convert measured values into pulses. For example, an electric meter for measuring electrical power consumption may be fitted with a device to produce a contact closure or pulse for every kilowatt of electricity used. Data logging devices, such as devices $D_1$–$D_9$, can be coupled with or integrated with each facility metering device and record the pulses or contacts and store them in a memory location. An exemplary data logging device is a GE Type DR87 or Schlumberger DS101. An exemplary metering device having an integrated recorder is a Vectron, manufactured by Schlumberger. Pulses can be collected in intervals of 5, 15, 30 or 60 minutes. Other intervals can be used. Accordingly, data which is associated with utility usage information measured by the metering device(s) is stored. A host computer 20, such as the one described above, is provided and is preferably linkable, via electronic link, with each data logging device. Data which is stored in the data logging devices is preferably retrieved into the host computer where it is subsequently processed for each facility site. The processing of the retrieved data provides usage-based, computer-viewable data associated with each facility site's usage of a particular utility resource. The retrieval process can be effectuated in any number of ways which are suitable for providing the host computer with the data necessary for its processing. For example, software retrieval programs can interrogate the data logging devices. An exemplary retrieval program is the MV90 which is available through a company called Utility Translation Systems, Inc., located in Raleigh, N.C. Data included in the retrieval process can include the time, interval value, channel identifier, and the number of intervals per hour. A comma delimited flat file can be used to transfer data. Alternately, third party computers or processors can comprise part of the host computer's data link with the data logging devices such that the third party computers or processors can collect or retrieve data and then pass it along to the host computer. For example, one computer or processor might collect data from devices $D_1$–$D_4$, while another might collect data from devices $D_5$–$D_9$. Subsequently, the data collected by each such third party computer or processor could be passed to the host computer for subsequent processing.

In but one aspect of the invention, data which is utilized in the implementation of the load profiling aspect of the present invention is collected from third party data logging devices utilizing third party software retrieval programs. An advantage of this aspect is that data from different third party devices can be collected and processed for display to the customer in a standard, unified format. In some instances, collected data can be output to a flat file and subsequently transferred electronically, as by use of the Internet, to the host system for processing as described above and below.

Computer access to the usage-based, computer-viewable data can be provided to each customer through interface device 30 (FIG. 1) substantially as described above. Thus, a customer can access and view such data from a computer location which is remote from the host computer. Any of the above-described report formats can be utilized. For example, a customer can view a graphical report which describes an individual site, a site-to-site comparison, and/or a data range description. Other formats can, of course, be utilized.

Figure 48B:
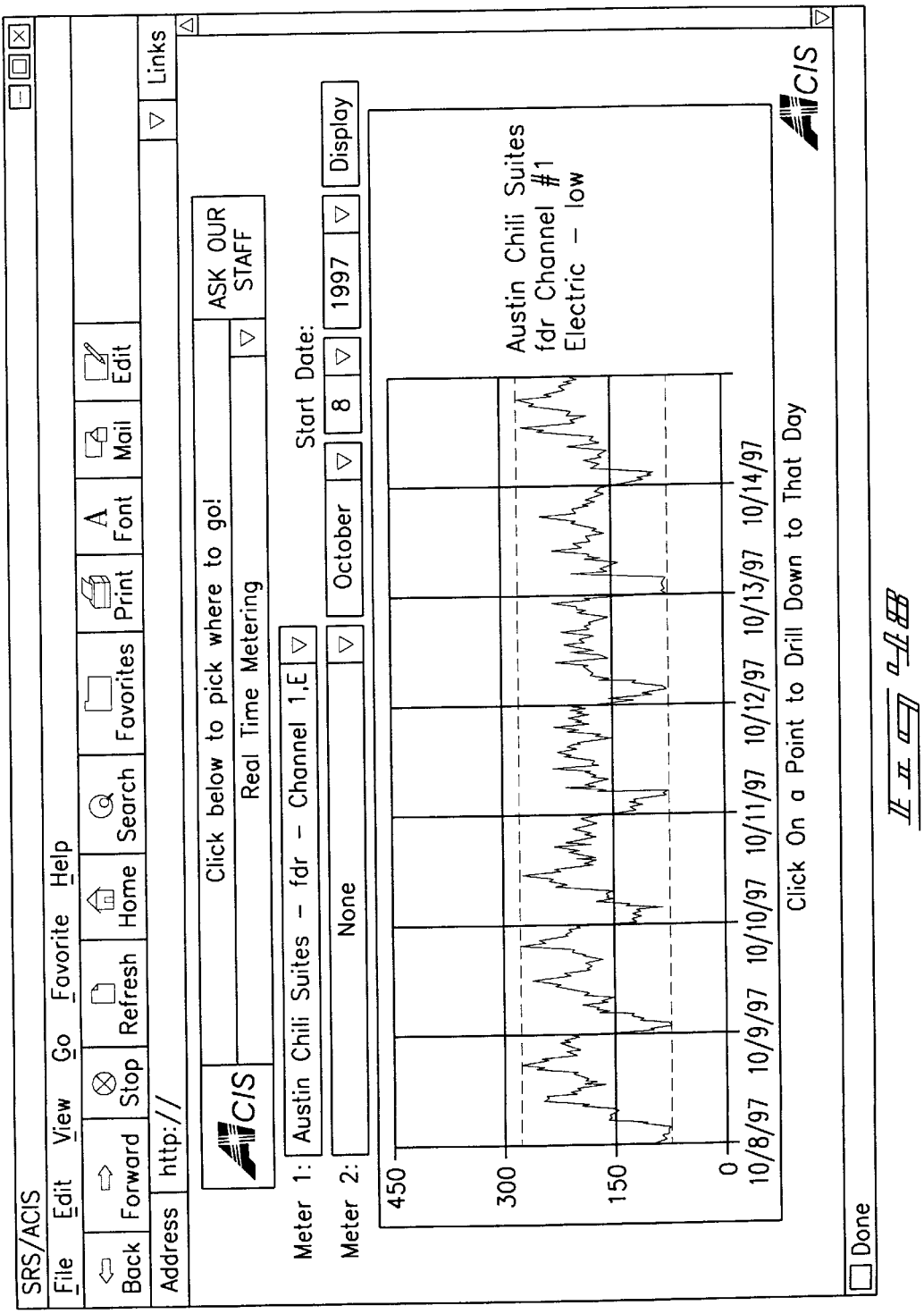
FIG. 48 is a view of another interactive computer screen implemented in connection with the FIG. 47 preferred embodiment of the invention.
Figure 74:
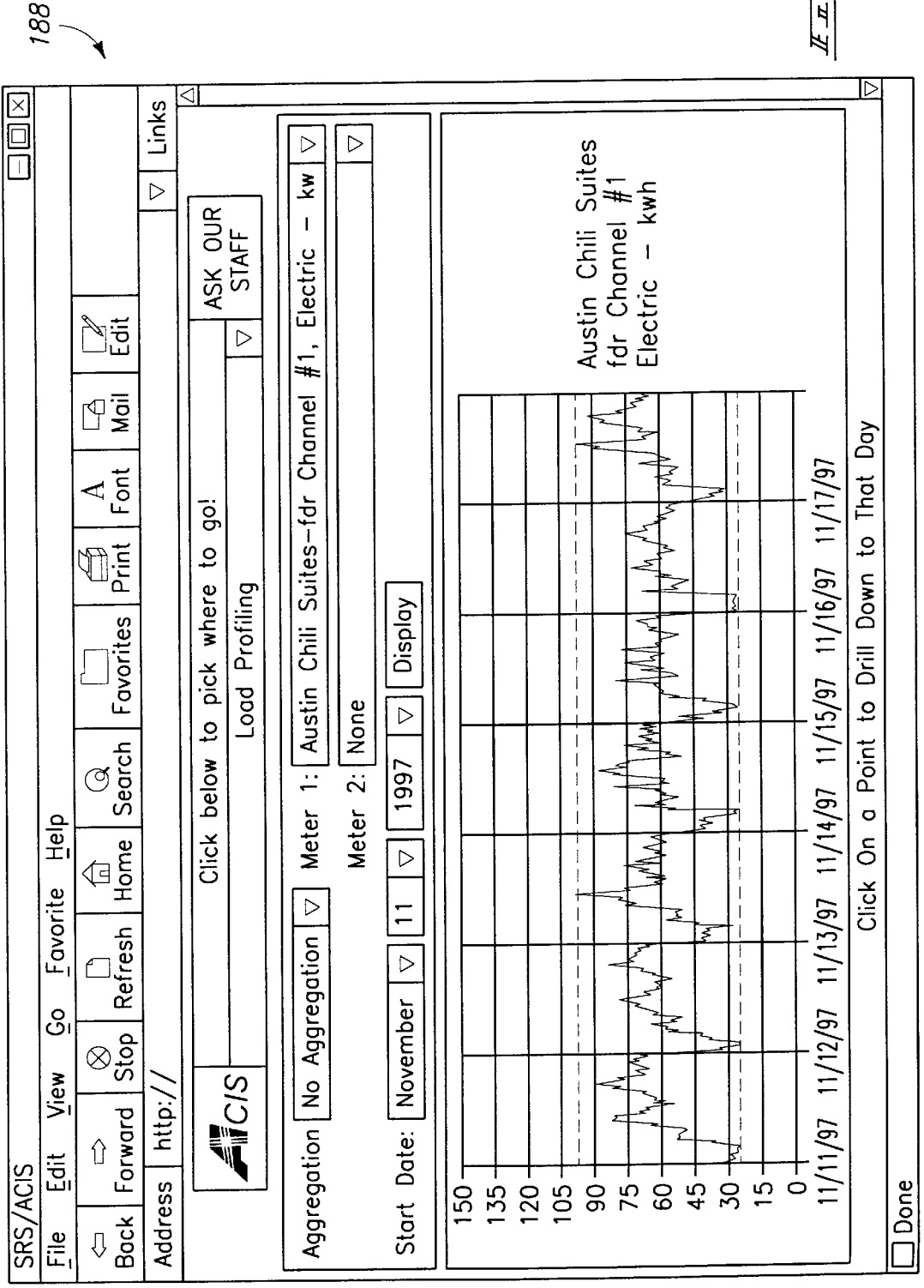

Referring to FIG. 48, an exemplary screen 186 is shown and describes a report for Austin Chili Suites which was developed by processing data retrieved from the above-described data logging devices. The illustrated report shows a so-called load profile for each day during the week of Oct. 8, 1997. Individual load profiles for each day give an indication of energy consumption throughout the day.

Figure 50:
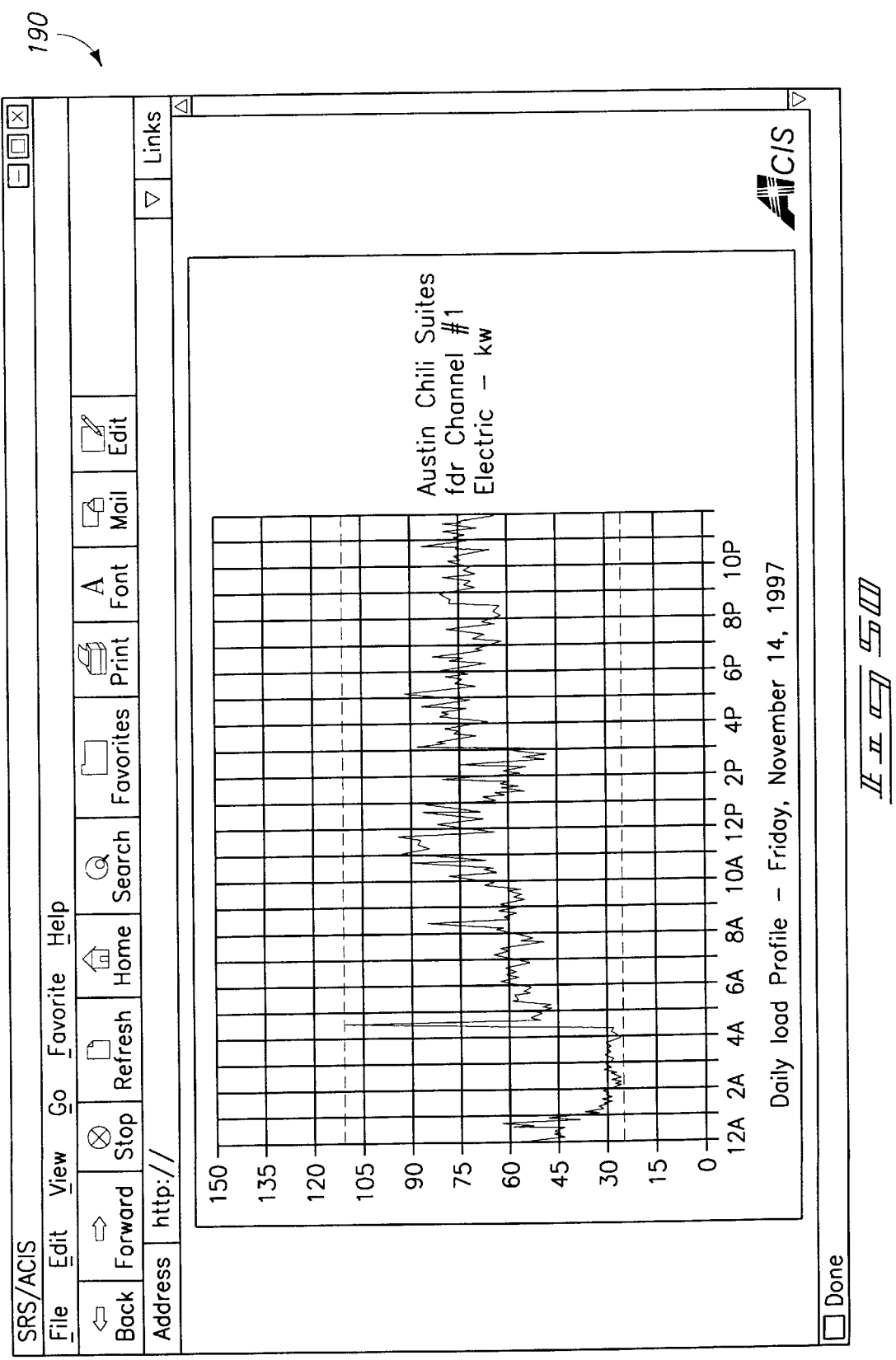
FIG. 50 is a view of another interactive computer screen implemented in connection with the FIG. 47 preferred embodiment of the invention.

Referring to FIG. 49, an exemplary screen 188 is shown and describes a report for Austin Chili Suites which shows a load profile for a week starting Nov. 11, 1997. The selected report indicates that "No Aggregation" has been selected. "Aggregation" allows load profiles for a particular time period to be added together. Such is discussed in more detail below. Additionally, this report screen enables a customer to display data for one or more sites, with the latter options being displayed in a site-to-site comparison, if desired. If a customer desires a more detailed view of the data, the customer can click on the graph and display data on a daily basis. An exemplary screen for such individualized data display is shown in FIG. 50 generally at 190. Such shows a daily load profile for Nov. 14, 1997.

The above reports assist the customer in identifying the time, e.g. hours, of the day, throughout the relevant time period during which resource consumption takes place, and the amount thereof. Customers can, for example, utilize the above reports to confirm operation of HVAC systems, outdoor lighting controls, after-hour lighting consumption associated with janitorial services, and the like. The sensitivity of the system is advantageous because small load usages can be detected and, if necessary, be formatted into a suitable report for customer viewing in close to, if not real time. Load profile reports, such as the ones enabled by the present invention, are extremely useful for identifying and enabling the reduction of, or, the shifting of peak demand, as well as reducing consumption (i.e. giving an indication that consumption needs to be reduced thereby effectuating remedial customer measures). The timeliness of the provision of the computer-viewable data to the customer greatly assists the customer in making time-saving load profile evaluations for not only one, but for each customer site which is incorporated into the system.

Figure 51:
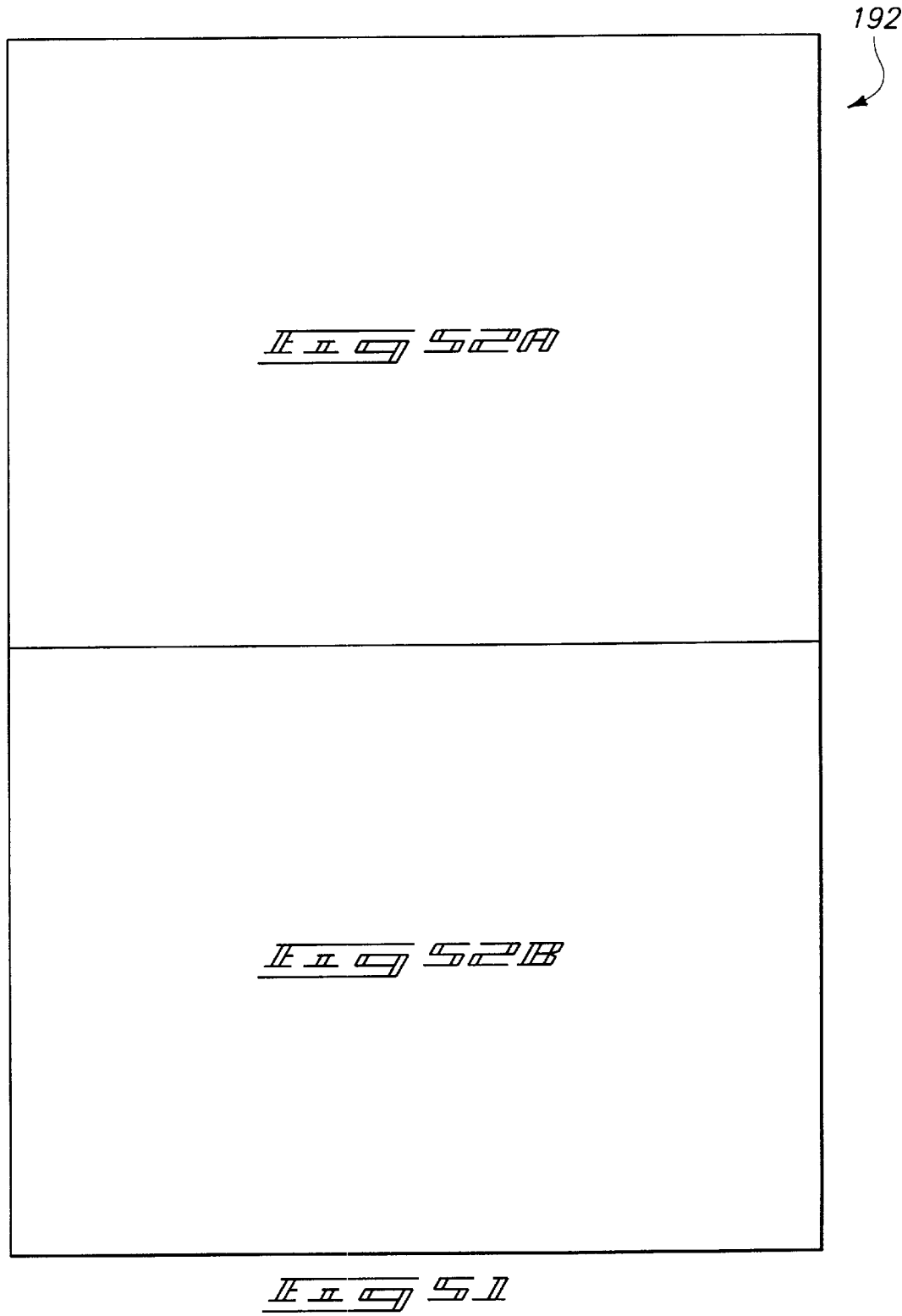
Figure 52A:
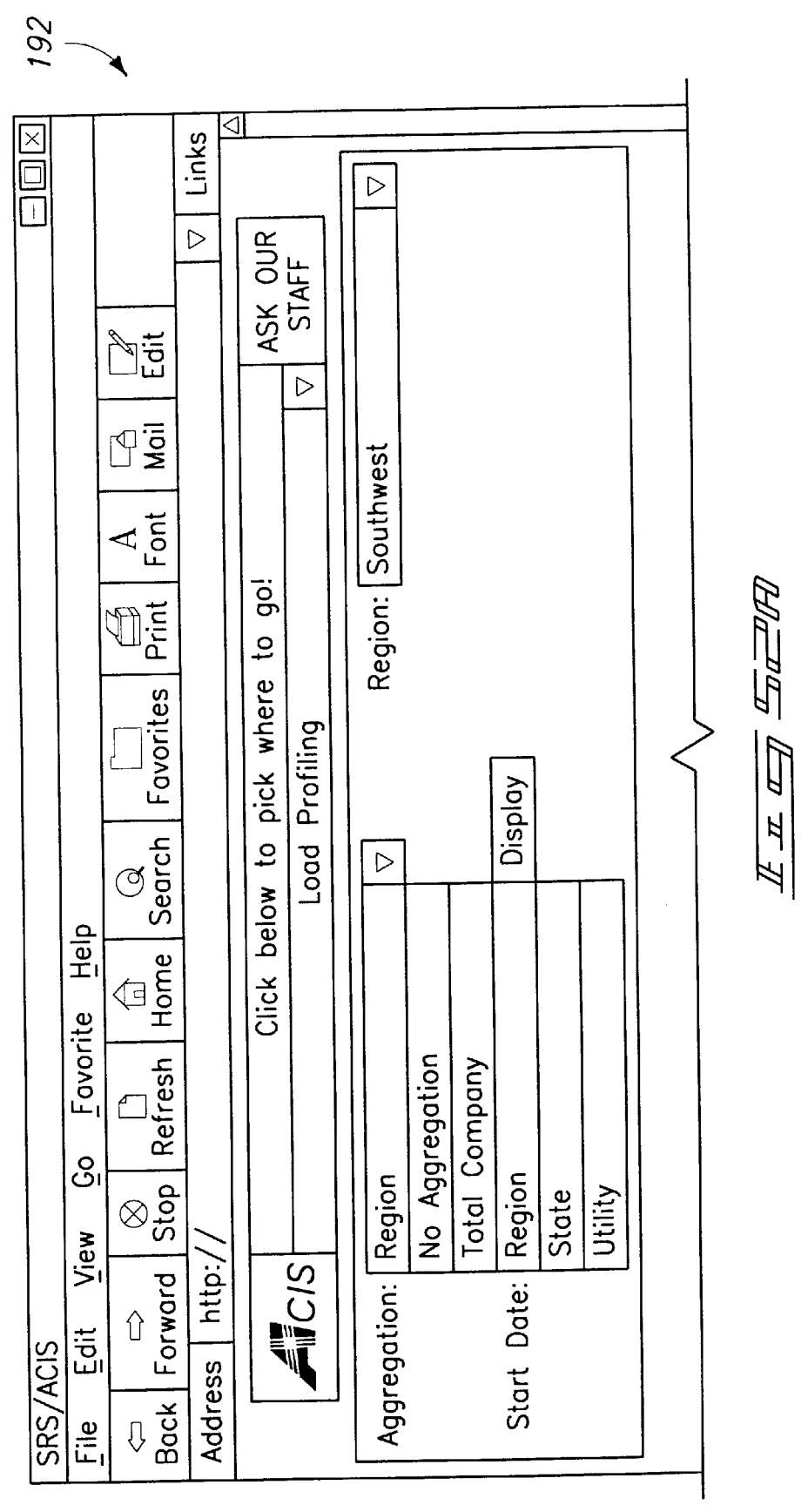
Figure 52B:
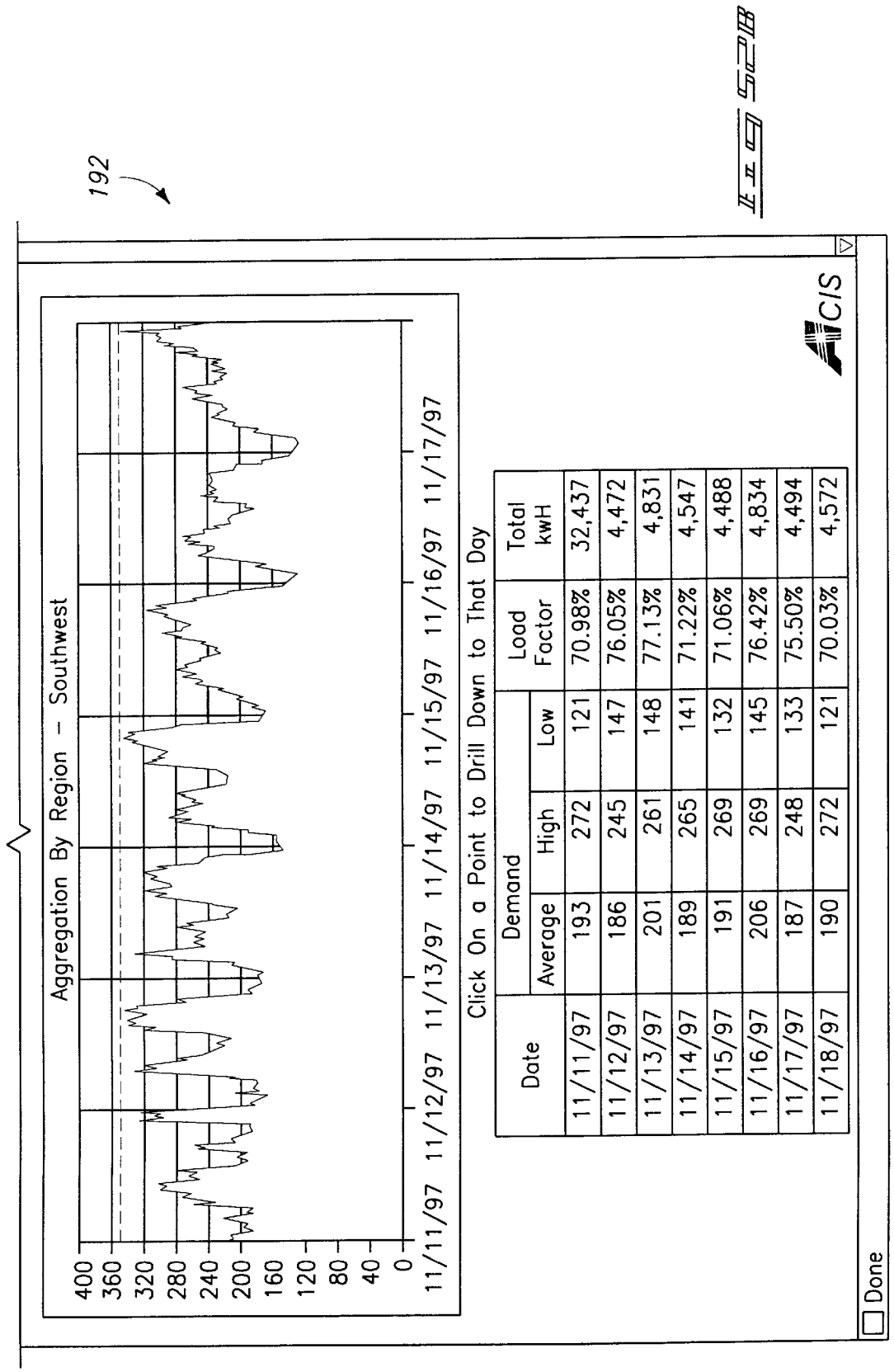

Referring to FIGS. 51, 52A–52B an exemplary screen 192 is shown and describes an aggregated load profile which has been aggregated for the subject time interval. This report gives the customer the added flexibilty to uniquely tailor the aggregation report to suit the customer's needs. For example, a customer can select, for aggregation, a date or date range, how aggregation is to be made (i.e., "Total Company", "Region", "State", or by "Utility" or Utility Resource Provider) as shown in FIG. 52A. A plurality of different regions, such as the illustrated "Southwest" region can be selected. Regions can also be thought of as climate zones, business operations areas, and the like. In addition, a customer can select to include or exclude one or more sites from aggregation. In addition to the load profile aggregation, a tabular summary (FIG. 52B) can be provided to give the customer hard numbers describing the particular aggregated period. For example, a summary describes an average, peak, and low demand figure for each day within the period. The summary also identifies load factor and the total kilowatt hours for the particular period. Such quantities are particularly useful in assisting the customer in quantifying and identifying the characteristics of their loads, and providing invaluable information to energy suppliers, i.e. utility resource providers, that serve the customers in a deregulated environment. A customer can also, through a drill-down option, click on a particular day and see that day's aggregated profile as shown in FIG. 53 as screen 194.

Report Download

Figure 54:
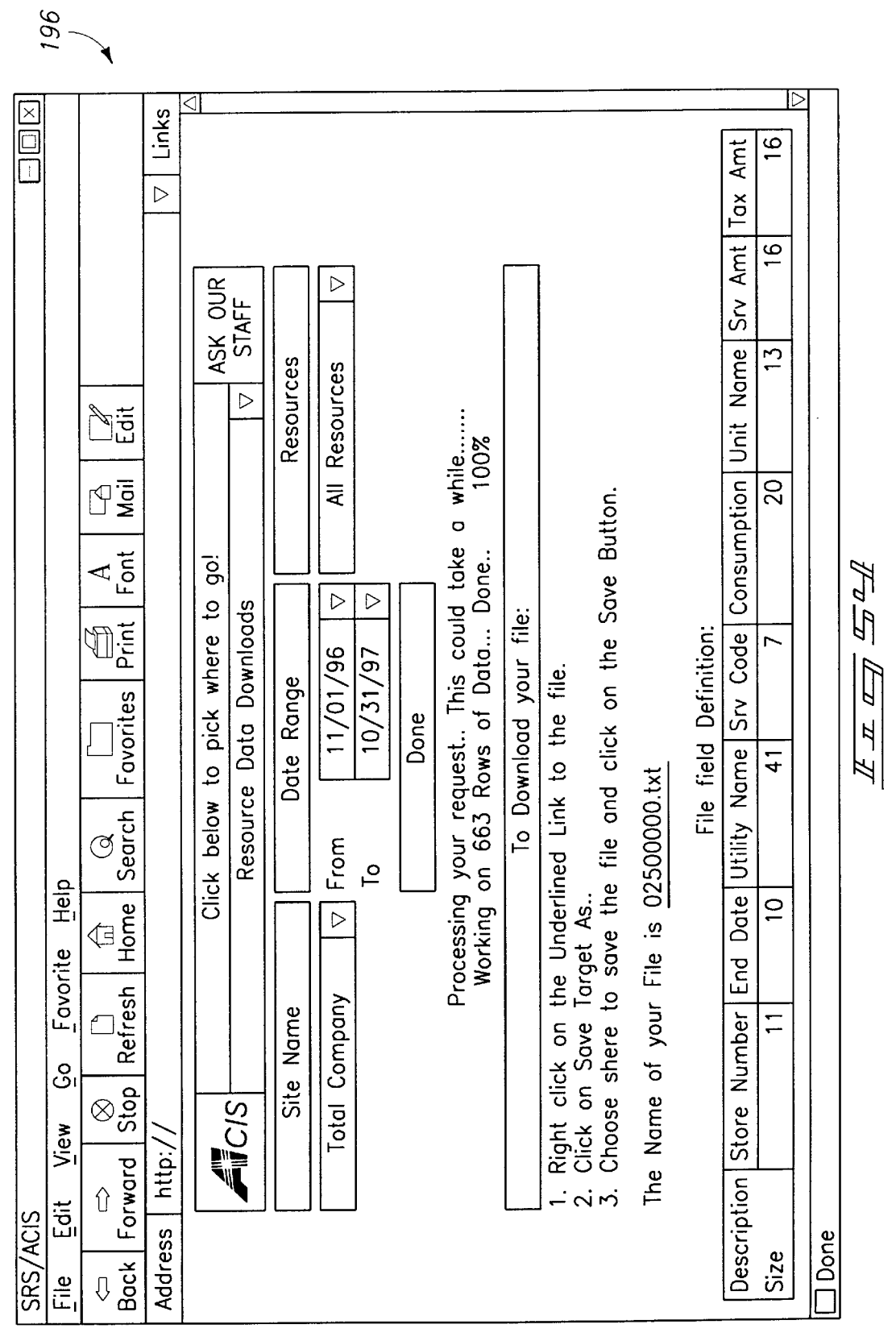

Referring to FIG. 54, a screen 196 is provided and enables a customer at its remote location to download, in an ASCI fixed column flat file, any of the above described reports. By enabling a customer to download such information, an analysis can be effectuated by the customer at its own location and during its own allotted time. Other schemes of providing information contained in any of the reports can, of course, be utilized.

Maintenance and Repair Activities

Various aspects of the invention which are described just below are suitable for use in connection with so-called labor-dependent services. "Labor-dependent services" will be understood to include such things as maintenance and repair activities which are rendered relative to a consumer, and more preferably, relative to a particular site or sites owned or managed by the consumer. Examples of maintenance and repair activities can include such things as infrastructure repair, or any and all other activities associated with maintaining and repairing one or more sites of a consumer. Various aspects of the invention will also be understood to be suitable for use in the context of services or materials which have been either rendered or provided to a consumer thereof. Such will become more clear as the various embodiments of the invention are described below.

Figure 55:
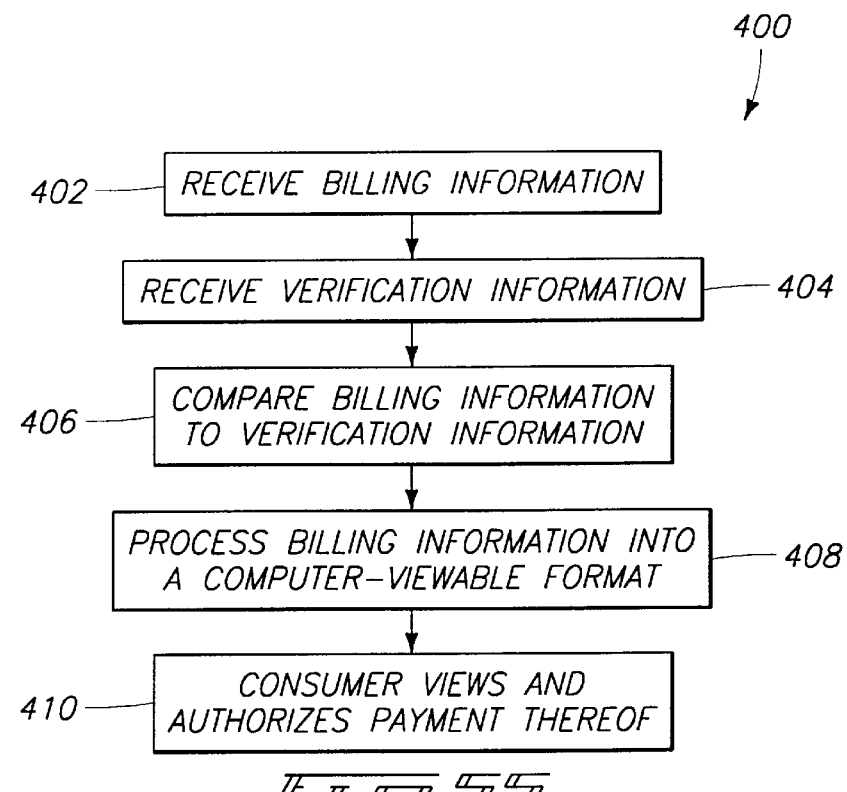
FIG. 55 is a flow diagram which describes a method in accordance with one or more embodiments of the present invention.

Referring to FIG. 55, a flow diagram describing one embodiment of an electronic bill-presenting method is shown generally at 400. At 402, billing information is received into a host computer pertaining to a labor-dependent service which has been rendered to a consumer of such service. The host computer preferably includes a processor for processing the billing information as will be described below. At 404, verification information is received from the consumer pertaining to the labor-dependent service which has been rendered to the consumer. At 406, the billing information and the verification information are compared to ascertain whether the billing information satisfies the verification information. At 408, and with the processor, the billing information is processed to provide processed information into a computer-viewable format. The consumer can preferably view the processed billing information and authorize payment thereof 410.

The verification information referenced above enables a comparison to be made to ensure that the billing information is consistent with the verification information. If the billing information is not consistent with the verification information, measures can be taken to ascertain the cause of any inconsistencies. In one embodiment, the verification information is electronically received, e.g. by transmission of electronic file, and suitably processed as described above. In another embodiment, the verification information includes at least one, and preferably a plurality of work-related parameters. For example, electronic files containing information relating to work requests for a particular time period, can be regularly submitted by each customer. The verification information is used to ensure that the billing information which is received falls within the bounds defined or permitted by the consumer. Examples of work-related parameters can include one or more affiliated sites of the customer at which a labor-dependent service is to be rendered (i.e. the location where the work is going to be done), or any work-specific information as agreed, such as an approved number of hours for the work or an approved maximum billing amount. Of course, other work-related parameters can be provided and these specific parameters are discussed for exemplary purposes only.

In another embodiment, the billing information which is received into the host computer pertains to a plurality of labor-dependent services which have been rendered to the consumer. This provides for different related or unrelated services to be accounted for by the present method. Accordingly, and in a preferred embodiment, the verification information which is received from the consumer pertains to one or more of the plurality of labor-dependent services to which the billing information pertains. As in the embodiment discussed just above, the verification information can be received electronically. Additionally, the verification information can include at least one, and preferably a plurality of work-related parameters, such as those discussed above.

In another embodiment, the billing information which is received into the host computer pertains to a plurality of service providers which have rendered at least one labor-dependent service to the consumer. In this embodiment, various methods of the invention allow for management of services provided by different, and preferably many different related or unrelated service providers. In one embodiment, the verification information is electronically received. In another embodiment, the verification information includes at least one, and preferably a plurality of work related parameters, such as those discussed above.

In another embodiment, the processing of the billing information at 408 comprises consolidating at least some of the billing information pertaining to the plurality of service providers. The billing information can pertain, in preferred embodiments, to services which are provided at one or more sites. This provides a consolidated amount which is owed by the consumer. Doing so permits a quick and convenient amount owed to be ascertained by the consumer when viewed in the computer-viewable format.

Figure 56:
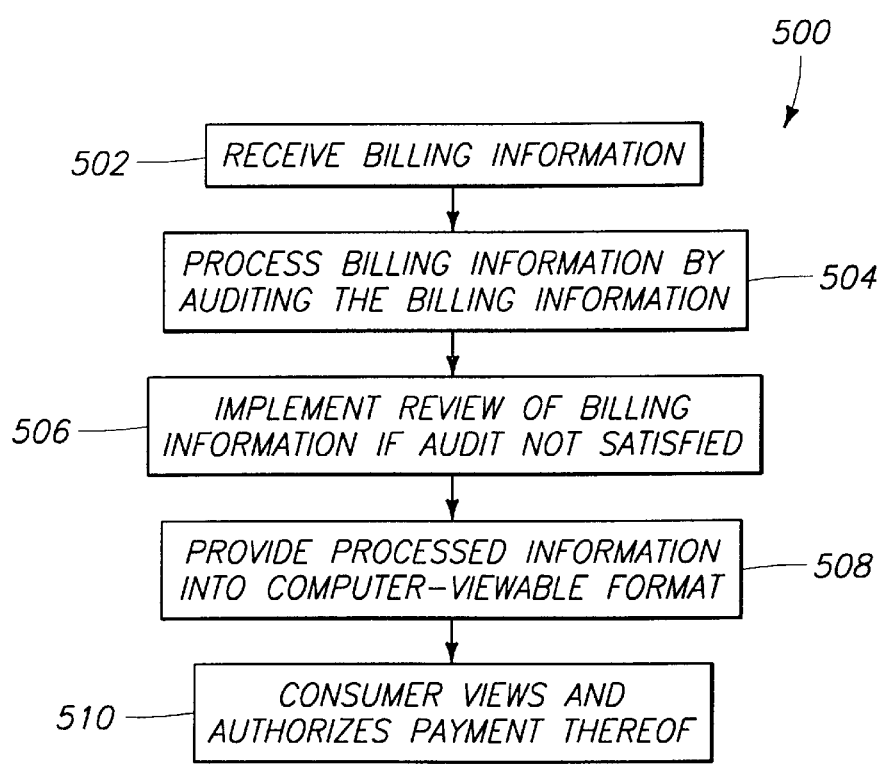
FIG. 56 is a flow diagram which describes a method in accordance with one or more embodiments of the present invention.

Referring to FIG. 56, an electronic bill-presenting method in accordance with another embodiment of the invention is shown generally at 500. At 502, billing information is received into the host computer pertaining to a labor-dependent service which has been rendered to a consumer of the labor-dependent service. The host computer preferably has a processor. At 504, and with the processor, the billing information is processed pertaining to the consumer. The processing preferably includes auditing the billing information against at least one tolerance parameter to determine whether the billing information satisfies the tolerance parameter. The processing of the billing information provides processed billing information. If, as a result of the auditing of the billing information at 504, the billing information does not satisfy at least one tolerance parameter, a review of the billing information is implemented at 506 to ascertain why the billing information does not satisfy the tolerance parameter. At 508, the processed billing information is provided into a computer-viewable format in which the consumer can view the processed billing information and authorize payment thereof 510.

In one embodiment, the consumer has at least one site relative to which the labor-dependent service is rendered. The billing information which is received by the host computer preferably includes site-specific data relative to the consumer's site or sites. Examples of such site-specific data include site number (unique identifier for a particular site), address, region or similar designation, square footage, and/or building classification. This information is useful from the context of allowing a customer with more than one site to perform site-by-site comparisons as described above.

In another embodiment, the labor-dependent service is rendered by a service provider and the billing information which is received by the host computer includes service provider-specific data. Examples of such service provider-specific data include provider or vendor number, remittance address, and standard contract rates, to name just a few. The standard contract rates information allows a comparison to be made between the various service providers. In this way, cost effective services can be purchased by the customer.

In yet another embodiment, the labor-dependent service has at least one cost element associated therewith, and the billing information which is received by the host computer includes at least one of the cost element or elements. Cost elements can be utilized in the auditing process and can provide a basis for filtering of user-requested, electronically deliverable reports. Cost elements can be used to generate viewable reports based upon comparisons between different sites or facilities, service providers, sites in a region, work category and the like. Exemplary cost elements include labor (expressible in both time frame, e.g. hour and dollar amounts), travel labor (expressible in both hour and dollar amounts), materials (expressible in both quantities and dollars), freight (expressible in dollars), and tax (expressible in dollars), to name just a few.

In another embodiment, the consumer has at least one site relative to which the labor-dependent service is rendered. The billing information which is received preferably includes site-specific data relative to at least one, and preferably more or all of the consumer's sites. The labor-dependent service is rendered by a service provider and the billing information which is received includes service provider-specific data. The labor-dependent service preferably has at least one cost element associated therewith. The billing information which is received by the host computer preferably includes at least one of the cost elements. These parameters can, and preferably are used in the auditing which is accomplished at step 504.

In one embodiment, a plurality of tolerance parameters are defined against which the billing information is audited. The tolerance parameters can include one or more of the following: a timeliness parameter, a duplication parameter, a price parameter, a quantity parameter, and a cost conformity parameter. For example, with respect to the timeliness parameter, any suitable timeliness parameter can be used, e.g. service date less than three months from current date. With respect to the duplication parameter, any suitable duplication parameter can be used, e.g. no same or duplicate service date bills submitted for the same site, vendor, or equipment code, or no duplicate invoice numbers for the same vendor. Exemplary equipment codes (also referred to as "site system or equipment classification") can include codes that describe systems such as heating, cooling, refrigeration, or various types of equipment ranging from cooking equipment to motors, to name just a few. Equipment codes can be used in a similar fashion as was described above in connection with cost elements. With respect to a price parameter, such can include any suitable price parameter, e.g. labor unit price is between $25 and $55 (or any other limit). With respect to a quantity parameter, such can include any suitable quantity parameter, e.g. number of items. With respect to a cost-conformity parameter, such can include any suitable cost-conformity parameter, e.g. labor unit pricing is in agreement with a standard service-provider contract. In addition to these tolerance parameters, other tolerance parameters such as a tax parameter can be defined. Tax parameters can be usefull for many things such as ensuring the tax is not charged on labor in states where services are not taxable. Other uses for tax parameters will be apparent to those of skill in the art. In another embodiment, the plurality of tolerance parameters include at least two of the parameters discussed above.

In one embodiment, the billing information which is received at 502 pertains to a plurality of labor-dependent services which are rendered to a consumer. Preferably, and in this embodiment, the processing of the billing information at 504 comprises consolidating at least some of the billing information pertaining to the different labor-dependent services to provide a consolidated amount which is owed by the consumer. In this instance, the consumer is provided with a quick and simple listing of an aggregate of all amounts owed relative to the services it consumed. In one embodiment, the consumer is provided with remote access to the processed billing information via an interface device which is connected with the processor. This permits the consumer to access the processed billing information from a remote location, In one embodiment, the processing of the billing information and 504 comprises consolidating at least some of the billing information pertaining to the labor-dependent services to provide a consolidated amount which is owed by the consumer. In addition, the consumer is provided with remote access to the processed billing information via an interface device connected with the processor.

Referring to FIG. 57, an electronic bill-presenting method in accordance with another embodiment of the invention is shown generally at 600. At 602, billing information is received into a host computer pertaining to a labor-dependent service which has been rendered to a consumer of the labor-dependent service. The host computer has a processor and preferably an interface device. With the processor, at 604, the billing information is processed pertaining to the consumer by auditing the billing information against at least one tolerance parameter to determine whether the billing information satisfies the tolerance parameter. The processing of the billing information provides processed billing information. At 606, the processed billing information is provided into a computer-viewable format. At 608, the consumer is provided with remote access to the processed billing information in the computer-viewable format. Such remote access is preferably provided via the interface device of the host computer. Accordingly, the consumer can view the processed billing information, and authorized payment thereof 610.

In one embodiment, the consumer has at least one site relative to which the labor-dependent service is rendered. The billing information which is received preferably includes site-specific data relative to the consumer's site or sites. Exemplary site-specific data is described above. In another embodiment, the labor-dependent service is rendered by a service provider, and the billing information includes service provider-specific data. Exemplary service provider-specific data is described above. In another embodiment, the labor-dependent service has at least one cost element associated therewith. The billing information preferably include at least one of the cost element or elements. Exemplary cost elements are described above.

In yet another embodiment, the consumer has at least one site relative to which the labor-dependent service is rendered. The billing information preferably includes site-specific data relative to the one site or sites. The labor-dependent service is rendered by a service provider and the billing information preferably includes service provider-specific data. The labor-dependent service also has at least one cost element associated therewith. Preferably, the billing information includes at least one of the cost elements.

In one embodiment, a plurality of tolerance parameters are defined or provided. The tolerance parameters can include one or more of the following parameters: a timeliness parameter, a duplication parameter, a price parameter, and a cost-conformity parameter, to name just a few. In one embodiment, at least two of such parameters are provided. Of course, other tolerance parameters can be provided.

In still another embodiment, the billing information which is received at 602 pertains to a plurality of labor-dependent services. The labor-dependent services can be provided by the same or different service providers. In one embodiment, the processing of the billing information at 604 comprises consolidating at least some of the billing information pertaining to the plurality of labor-dependent services. Such preferably provides a consolidated amount which is owed by the consumer. In another embodiment, the remote access which is provided to the consumer also enables the consumer to authorize payment of the consolidated amount 610.

Referring to FIG. 58, a bill consolidation method in accordance with another embodiment of the invention is shown generally at 700. At 702, billing information is received into a host computer pertaining to a plurality of at least one of a service or material which has been rendered or provided, respectively, to a consumer. The host computer is preferably has a processor and an interface device. At 704, and with the processor, the billing information is processed to provide processed billing information which includes a consolidated amount which is owed by the consumer. At 706, the processed billing information is provided into a computer-viewable format. At 708, the consumer is provided with remote access to the processed billing information in the computer-viewable format via the interface device, The consumer can preferably view the processed billing information which includes the consolidated amount.

In one embodiment, the consumer has at least one site relative to which the service or material has been rendered or provided respectively. The billing information which is received into the host computer includes site-specific data relative to the consumer's site or sites. In another embodiment, the service or material is rendered or provided by a service provider. The billing information preferably includes service provider-specific data. In another embodiment, the service or material has at least one cost element associated therewith. The billing information preferably includes at least one of the cost elements.

In another embodiment, the consumer has at least one site relative to which the service or material is rendered or provided. The billing information preferably includes site-specific data relative to the one site or sites. The service or material is rendered or provided by a service provider, and preferably the billing information includes service provider-specific data. The service or material has at least one cost element associated therewith, and preferably the billing information includes at least one of the cost elements.

In another embodiment, the processing of the billing information at 704 comprises auditing the billing information against at least one tolerance parameter to determine whether the billing information satisfies the tolerance parameter or parameters. In one embodiment, the tolerance parameter(s) includes one or more of the following parameters: a timeliness parameter, a duplication parameter, a price parameter, a quantity parameter, or a cost conformity parameter. In one embodiment, at least two or more tolerance parameters are provided.

In another embodiment, a plurality of graphical formats are provided which are selectable by the consumer for viewing the billing information which is processed at 704. The graphical report can include one or more of the graphical reports discussed above. In another embodiment, the remote access which is provided at 708 enables the consumer to electronically authorize payment of the consolidated amount via the interface 710.

Figure 59:
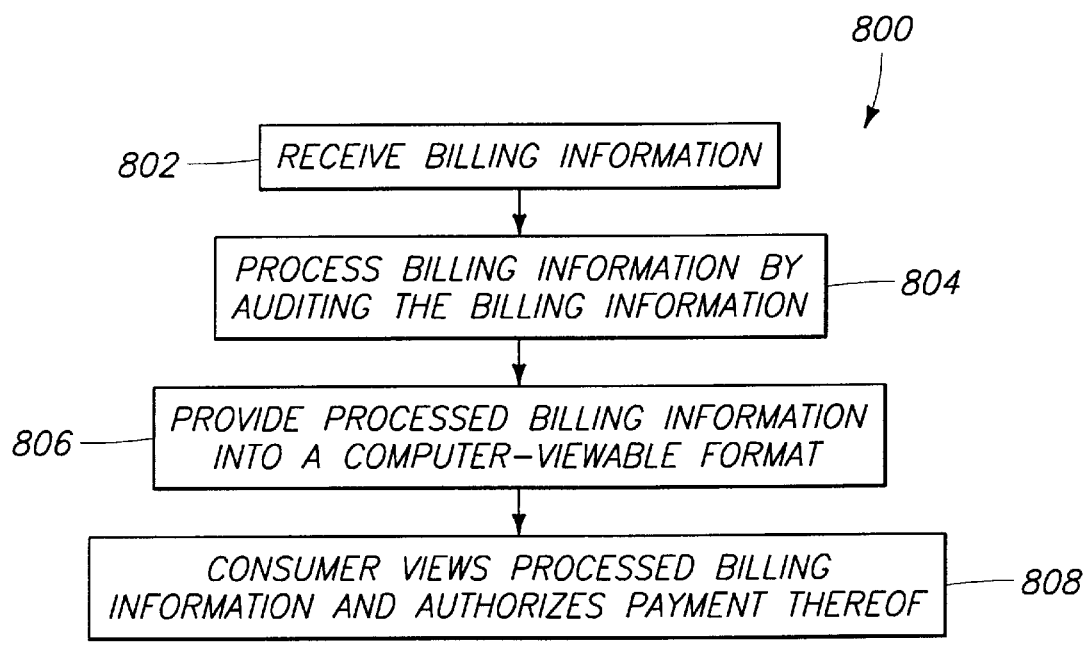
FIG. 59 is a flow diagram which describes a method in accordance with one or more embodiments of the present invention.

Referring to FIG. 59, an electronic bill-presenting method in accordance with another embodiment of the invention is shown generally at 800. At 802, billing information is received into the host computer pertaining to a labor-dependent service which has been rendered to a consumer. Preferably, the host computer has a processor. At 804, and is with the computer's processor, the billing information is processed pertaining to the consumer by auditing the billing information against at least one tolerance parameter to determine whether the billing information satisfies the tolerance parameter. The processing of the billing information provides processed billing information. At 806, the processed billing information is provided into a computer-viewable format, wherein the consumer can view the processed billing information and authorize payment thereof 808.

In one embodiment, the consumer has at least one site relative to which the labor-dependent service is rendered. Preferably, the billing information which is received by the host computer includes site-specific data relative to the consumer's site or sites. In another embodiment, the labor-dependent service is rendered by a service provider, and the billing information includes service provider-specific data. In another embodiment, the labor-dependent service has at least one cost element associated therewith, and the billing information preferably includes at least one cost element or elements.

In another embodiment, the consumer has at least one site relative to which the labor-dependent service is rendered. Preferably, the billing information includes site-specific data relative to the consumer's site or sites. The labor-dependent service is rendered by a service provider, and the billing information preferably includes service provider-specific data. The labor-dependent service preferably has at least one cost element associated therewith. The billing information preferably includes at least one cost element.

In one embodiment, a plurality of tolerance parameters are provided. The tolerance parameters can include one or more of the following parameters: a timeliness parameter, a duplication parameter, a price parameter, and a cost conformity parameter. Preferably, the tolerance parameters include two or more tolerance parameters.

In one embodiment, the billing information which is received pertains to a plurality of labor-dependent services. The labor-dependent services can be provided by one or more service providers. In this embodiment, the processing of the billing information at 804 comprises consolidating at least some of the billing information pertaining to the plurality of labor-dependent services to provide a consolidated amount which is owed by the consumer. In another embodiment, the consumer is provided with remote access to the processed billing information in the computer viewable format via an interface device which is connected with the processor.

In another embodiment, the processing of the billing information comprises consolidating at least some of the billing information pertaining to the plurality of labor-dependent services to provide a consolidated amount which is owed by the consumer. The consumer is preferably provided with remote access to the processed billing information, including the consolidated amount, via an interface device connected with the processor. In this embodiment, at least one tolerance parameter, and preferably a plurality of tolerance parameters are provided. The tolerance parameters can include any of those discussed above.

Summary

The above-described systems and methodologies provide a comprehensive decision-making tool which gives customers or consumers of resources, and in particular utility resources, and service and material resources, the necessary and requisite information to make decisions concerning resource allocation, acquisition, and use. The systems and methodologies make pertinent information available in a quick and convenient manner. The preferred revolutionary utility resource management systems and methods ensure that the relevant decision makers and analytical personnel have information at their disposal which greatly facilitates the ease, timeliness and accuracy with which energy-based, or facility management and procurement decisions can be made.

The various embodiments of the invention described just above also provide various advantages such as the ability to track and manage maintenance and repair bills for one or more sites. In addition, service and materials can be tracked and managed as well. Various embodiments of the invention provide the consumer with the ability to quickly and efficiently access their billing information so that authorization can be made. This access and authorization, in some preferred embodiments, takes place electronically via an in-place network such as the internet. Other inventive embodiments enable bill consolidation so that the consumer need only authorize payment of one amount. The various provided graphical report formats can provide billing data into a quickly and conveniently-viewable format in which the consumer can view the consolidated bill and its constituent parts, if desired. Further, measures are provided by various embodiments to ensure that the information which is presented to the consumer is accurate. Other advantages will be apparent to those of skill in the art.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An electronic bill-presenting method comprising:
   receiving into a host computer billing information pertaining to a labor-dependent service which has been rendered to a consumer of said labor-dependent service, the host computer having a processor;

defining at least one tolerance parameter which relates to the labor dependent service, and wherein the at least one tolerance parameter is derived from an historical analysis of the previous billing information pertaining to the labor dependent service;

with said processor, processing said billing information pertaining to said consumer by auditing said billing information against the at least one tolerance parameter to determine whether said billing information satisfies the at least one tolerance parameter, said processing providing processed billing information; and providing said processed billing information into a real time computer-viewable format, and wherein said consumer can view said processed real time billing information and authorize payment thereof.

2. The electronic bill-presenting method of claim 1, wherein said consumer has at least one site relative to which said labor-dependent service is rendered, and wherein said billing information includes site-specific data relative to said at least one site.

3. The electronic bill-presenting method of claim 1, wherein said labor-dependent service is rendered by a service provider, and wherein said billing information includes service provider-specific data.

4. The electronic bill-presenting method of claim 1, wherein said labor-dependent service has at least one cost element associated therewith, and wherein said billing information includes at least one of said at least one cost elements.

5. The electronic bill-presenting method of claim 1, wherein said labor-dependent service has at least one site system or equipment classification associated therewith, and wherein said billing information includes at least one of said at least one site system or equipment classifications.

6. The electronic bill-presenting method of claim 1, wherein;
   said consumer has at least one site relative to which said labor-dependent service is rendered, and wherein said billing information includes site-specific data relative to said at least one site;
   said labor-dependent service is rendered by a service provider, and wherein said billing information includes service provider-specific data; and
   said labor-dependent service has at least one cost element associated therewith, and wherein said billing information includes at least one of said at least one cost elements.

7. The electronic bill-presenting method of claim 1, wherein said receiving of said billing information pertaining to a labor-dependent service comprises receiving billing information pertaining to a plurality of labor-dependent services.

8. The electronic bill-presenting method of claim 7, wherein said processing of said billing information comprises consolidating at least some of the billing information pertaining to said plurality of labor-dependent services to provide a consolidated amount which is owed by said consumer.

9. The electronic bill-presenting method of claim 7 further comprising providing said consumer with remote access to said processed billing information in said computer-viewable format via an interface device connected with said processor.

10. The electronic bill-presenting method of claim 7, wherein said processing of said billing information comprises consolidating at least some of the billing information pertaining to said plurality of labor-dependent services to provide a consolidated amount which is owed by said consumer; and further comprising providing said consumer with remote access to said processed billing information in said computer-viewable format via an interface device connected with said processor.

11. The electronic bill-presenting method of claim 7, wherein said at least one tolerance parameter comprises a plurality of tolerance parameters.

12. The electronic bill-presenting method of claim 11, wherein said plurality of tolerance parameters comprises at least two of the following parameters: a timeliness parameter, a duplication parameter, a price parameter, a quantity parameter, and a cost conformity parameter.

13. The electronic bill-presenting method of claim 1, wherein said at least one tolerance parameter comprises a plurality of tolerance parameters.

14. The electronic bill-presenting method of claim 13, wherein one of said plurality of tolerance parameters includes a timeliness parameter.

15. The electronic bill-presenting method of claim 13, wherein one of said plurality of tolerance parameters includes a duplication parameter.

16. The electronic bill-presenting method of claim 13, wherein one of said plurality of tolerance parameters includes a price parameter.

17. The electronic bill-presenting method of claim 13, wherein one of said plurality of tolerance parameters includes a cost conformity parameter.

18. The electronic bill-presenting method of claim 13, wherein one of said plurality of tolerance parameters includes a quantity parameter.

19. The electronic bill-presenting method of claim 13, wherein said plurality of tolerance parameters include at least two of the following parameters: a timeliness parameter, a duplication parameter, a price parameter, a quantity parameter, and a cost conformity parameter.

20. An electronic bill-presenting method comprising:
  receiving into a host computer billing information pertaining to a labor-dependent service which has been rendered to a consumer of said labor-dependent service, the host computer having a processor;
  receiving verification information from said consumer pertaining to said labor-dependent service which has been rendered to said consumer;
  comparing said billing information to said verification information to ascertain whether said billing information satisfies said verification information; and
  with said processor, processing said billing information to provide processed billing information into a computer-viewable format, and wherein said consumer can view said processed billing information by way of an interface device in real time and authorize payment thereof.

21. The electronic bill-presenting method of claim 20, wherein the receiving of the verification information comprises electronically receiving said verification information.

22. The electronic bill-presenting method of claim 20, wherein the verification information includes at least one work-related parameter.

23. The electronic bill-presenting method of claim 20, wherein the verification information includes a plurality of work-related parameters.

24. The electronic bill-presenting method of claim 20, wherein said billing information pertains to a plurality of labor-dependent services which have been rendered to said consumer, and said verification information pertains to said plurality of labor-dependent services.

25. The electronic bill-presenting method of claim 24, wherein the receiving of the verification information comprises electronically receiving said verification information.

26. The electronic bill-presenting method of claim 24, wherein the verification information includes at least one work-related parameter.

27. The electronic bill-presenting method of claim 24, wherein the verification information includes a plurality of work-related parameters.

28. The electronic bill-presenting method of claim 20, wherein said billing information pertains to a plurality of service providers which have rendered at least one labor-dependent service to said consumer.

29. The electronic bill-presenting method of claim 28, wherein the receiving of the verification information comprises electronically receiving said verification information.

30. The electronic bill-presenting method of claim 28, wherein the verification information includes at least one work-related parameter.

31. The electronic bill-presenting method of claim 28, wherein the verification information includes a plurality of work-related parameters.

32. The electronic bill-presenting method of claim 28, wherein said processing of said billing information comprises consolidating at least some of the billing information pertaining to said plurality of service providers to provide a consolidated amount which is owed by said consumer.

33. An electronic bill-presenting method comprising:
  receiving into a host computer billing information pertaining to a labor-dependent service which has been rendered to a consumer of said labor-dependent service, the host computer having a processor;
  defining at least one tolerance parameter which relates to a labor dependent service by conducting a historical analysis of previous billing information pertaining to the labor-dependent service, and storing the resulting tolerance parameter in a database;
  with said processor, processing said billing information pertaining to said consumer by auditing said billing information against the at least one tolerance parameter stored in the database to determine whether said billing information satisfies the at least one tolerance parameter, said processing providing processed billing information;
  if, as a result of said auditing of said billing information, said billing information does not satisfy the at least one tolerance parameter, implementing a review of the billing information to ascertain why the billing information does not satisfy said at least one tolerance parameter, and wherein the audited billing information may be viewed and manipulated remotely, and in real time by way of an interface device; and
  providing said processed billing information into a computer-viewable format, and wherein the consumer can view and manipulate said processed billing information and authorize payment thereof in real time.

34. The electronic bill-presenting method of claim 33, wherein said consumer has at least one site relative to which said labor-dependent service is rendered, and wherein said billing information includes site-specific data relative to said at least one site.

35. The electronic bill-presenting method of claim 33, wherein said labor-dependent service is rendered by a service provider, and wherein said billing information includes service provider-specific data.

36. The electronic bill-presenting method of claim 33, wherein said labor-dependent service has at least one cost element associated therewith, and wherein said billing information includes at least one of said at least one cost elements.

37. The electronic bill-presenting method of claim 33, wherein;
   said consumer has at least one site relative to which said labor-dependent service is rendered, and wherein said billing information includes site-specific data relative to said at least one site;
   said labor-dependent service is rendered by a service provider, and wherein said billing information includes service provider-specific data; and
   said labor-dependent service has at least one cost element associated therewith, and wherein said billing information includes at least one of said at least one cost elements.

38. The electronic bill-presenting method of claim 33, wherein said receiving of said billing information pertaining to a labor-dependent service comprises receiving billing information pertaining to a plurality of labor-dependent services.

39. The electronic bill-presenting method of claim 38, wherein said processing of said billing information comprises consolidating at least some of the billing information pertaining to said plurality of labor-dependent services to provide a consolidated amount which is owed by said consumer.

40. The electronic bill-presenting method of claim 38 further comprising providing said consumer with remote access to said processed billing information in said computer-viewable format via an interface device connected with said processor.

41. The electronic bill-presenting method of claim 38, wherein said processing of said billing information comprises consolidating at least some of the billing information pertaining to said plurality of labor-dependent services to provide a consolidated amount which is owed by said consumer; and further comprising providing said consumer with remote access to said processed billing information in said computer-viewable format via an interface device connected with said processor.

42. The electronic bill-presenting method of claim 33, wherein said at least one tolerance parameter comprises a plurality of tolerance parameters.

43. The electronic bill-presenting method of claim 42, wherein one of said plurality of tolerance parameters includes a timeliness parameter.

44. The electronic bill-presenting method of claim 42, wherein one of said plurality of tolerance parameters includes a duplication parameter.

45. The electronic bill-presenting method of claim 42, wherein one of said plurality of tolerance parameters includes a price parameter.

46. The electronic bill-presenting method of claim 42, wherein one of said plurality of tolerance parameters includes a quantity parameter.

47. The electronic bill-presenting method of claim 42, wherein one of said plurality of tolerance parameters includes a cost conformity parameter.

48. The electronic bill-presenting method of claim 42, wherein said plurality of tolerance parameters include at least two of the following parameters: a timeliness parameter, a duplication parameter, a price parameter, a quantity parameter, and a cost conformity parameter.

49. An electronic bill-presenting method comprising:
   receiving into a host computer billing information pertaining to a labor-dependent service which has been rendered to a consumer of said labor-dependent service, the host computer having a processor and an interface device;
   defining a tolerance parameter relating to the labor-dependent service and storing such tolerance parameter in a database, the tolerance parameter derived from previous billing information relating to the labor-dependent service;
   with said processor, processing said billing information pertaining to said consumer by auditing said billing information against at least one tolerance parameter to determine whether said billing information satisfies said at least one tolerance parameter, said processing providing processed billing information;
   providing said processed billing information into a computer-viewable format which can be remotely and selectively manipulated to provide a multiplicity of informational reports which can be generated in real time; and
   providing said consumer with remote access to said processed billing information in said computer-viewable format via said interface device, and wherein said consumer can view said processed billing information in real time, and authorize payment thereof.

50. The electronic bill-presenting method of claim 49, wherein said consumer has at least one site relative to which said labor-dependent service is rendered, and wherein said billing information includes site-specific data relative to said at least one site.

51. The electronic bill-presenting method of claim 49, wherein said labor-dependent service is rendered by a service provider, and wherein said billing information includes service provider-specific data.

52. The electronic bill-presenting method of claim 49, wherein said labor-dependent service has at least one cost element associated therewith, and wherein said billing information includes at least one of said at least one cost elements.

53. The electronic bill-presenting method of claim 49, wherein;
   said consumer has at least one site relative to which said labor-dependent service is rendered, and wherein said billing information includes site-specific data relative to said at least one site;
   said labor-dependent service is rendered by a service provider, and wherein said billing information includes service provider-specific data; and
   said labor-dependent service has at least one cost element associated therewith, and wherein said billing information includes at least one of said at least one cost elements.

54. The electronic bill-presenting method of claim 49, wherein said receiving of said billing information pertaining to a labor-dependent service comprises receiving billing information pertaining to a plurality of labor-dependent services.

55. The electronic bill-presenting method of claim 54, wherein said processing of said billing information comprises consolidating at least some of the billing information pertaining to said plurality of labor-dependent services to provide a consolidated amount which is owed by said consumer.

56. The electronic bill-presenting method of claim 54, wherein said processing of said billing information comprises consolidating at least some of the billing information pertaining to said plurality of labor-dependent services to provide a consolidated amount which is owed by said consumer; and wherein the providing of said consumer with remote access to said processed billing information in said computer-viewable format comprises enabling said consumer to authorize payment of the consolidated amount.

57. The electronic bill-presenting method of claim 49, wherein said at least one tolerance parameter comprises a plurality of tolerance parameters.

58. The electronic bill-presenting method of claim 57, wherein one of said plurality of tolerance parameters includes a timeliness parameter.

59. The electronic bill-presenting method of claim 57, wherein one of said plurality of tolerance parameters includes a duplication parameter.

60. The electronic bill-presenting method of claim 57, wherein one of said plurality of tolerance parameters includes a price parameter.

61. The electronic bill-presenting method of claim 57, wherein one of said plurality of tolerance parameters includes a quantity parameter.

62. The electronic bill-presenting method of claim 57, wherein one of said plurality of tolerance parameters includes a cost conformity parameter.

63. The electronic bill-presenting method of claim 57, wherein said plurality of tolerance parameters include at least two of the following parameters: a timeliness parameter, a duplication parameter, a price parameter, a quantity parameter, and a cost conformity parameter.

64. A bill consolidation method comprising:
  receiving into a host computer billing information pertaining to a plurality of at least one of a service or material which has been rendered or provided, respectively, to a consumer of said service or material, the host computer having a processor and an interface device;
  with said processor, processing said billing information to provide processed billing information which includes a consolidated amount which is owed by said consumer;
  providing said processed billing information into a computer-viewable format having a multiplicity of selectively adjustable reports which can be generated in real time;
  providing said consumer with remote access to said processed billing information in said computer-viewable format via said interface device; and wherein said consumer can view said processed billing information which includes said consolidated amount in real time.

65. The bill consolidation method of claim 64, wherein said consumer has at least one site relative to which said service or material has been rendered or provided respectively, and wherein said billing information includes site-specific data relative to said at least one site.

66. The bill consolidation method of claim 64, wherein said service or material is rendered or provided by a service provider, and wherein said billing information includes service provider-specific data.

67. The bill consolidation method of claim 64, wherein said service or material has at least one cost element associated therewith, and wherein said billing information includes at least one of said at least one cost elements.

68. The bill consolidation method of claim 64, wherein;
  said consumer has at least one site relative to which said service or material is rendered or provided, and wherein said billing information includes site-specific data relative to said at least one site;
  said service or material is rendered or provided by a service provider, and wherein said billing information includes service provider-specific data; and
  said service or material has at least one cost element associated therewith, and wherein said billing information includes at least one of said at least one cost elements.

69. The bill consolidation method of claim 64, wherein the providing of said consumer with remote access to said processed billing information comprises providing a plurality of graphical formats which are selectable by said consumer for viewing said processed billing information.

70. The bill consolidation method of claim 64 further comprising enabling said consumer to electronically authorize payment of said consolidated amount via said interface.

71. The bill consolidation method of claim 64, wherein the processing of the billing information comprises auditing said billing information against at least one tolerance parameter to determine whether said billing information satisfies said at least one tolerance parameter.

72. The bill consolidation method of claim 71, wherein one of said tolerance parameters includes a timeliness parameter.

73. The bill consolidation method of claim 71, wherein one of said tolerance parameters includes a duplication parameter.

74. The bill consolidation method of claim 71, wherein one of said tolerance parameters includes a price parameter.

75. The bill consolidation method of claim 71, wherein one of said tolerance parameters includes a cost conformity parameter.

76. The bill consolidation method of claim 71, wherein one of said tolerance parameters includes a quantity parameter.

77. The bill consolidation method of claim 71, wherein said at least one tolerance parameter includes at least two of the following parameters: a timeliness parameter, a duplication parameter, a price parameter, a quantity parameter, and a cost conformity parameter.

* * * * *

UNITED STATES PATENT AND TRADEMARK OFFICE
CERTIFICATE OF CORRECTION

PATENT NO. : 6,035,285
DATED : March 7, 2000
INVENTOR(S) : Ed Schlect et al.

It is certified that error appears in the above-identified patent and that said Letters Patent is hereby corrected as shown below:

Column 1,
Line 47, delete the word -- is --.

Column 11,
Line 61, delete the numbers "46" and insert -- 46A --.

Column 12,
Line 3, delete the word -- is --.

Column 16,
Line 16, after the word "current", delete the word -- is --.

Column 17,
Line 22, after the word "period", insert -- . --.

Column 18,
Line 7, delete the word -- it --.

Signed and Sealed this

Twenty-eighth Day of August, 2001

*Attest:*

*Nicholas P. Godici*

NICHOLAS P. GODICI
*Attesting Officer*   *Acting Director of the United States Patent and Trademark Office*